(12) United States Patent
Chen et al.

(10) Patent No.: US 8,832,417 B2
(45) Date of Patent: Sep. 9, 2014

(54) PROGRAM FLOW CONTROL FOR MULTIPLE DIVERGENT SIMD THREADS USING A MINIMUM RESUME COUNTER

(75) Inventors: Lin Chen, San Diego, CA (US); David Rigel Garcia Garcia, Ontario, CA (US); Andrew E. Gruber, Arlington, MA (US); Guofang Jiao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 385 days.

(21) Appl. No.: 13/227,274

(22) Filed: Sep. 7, 2011

(65) Prior Publication Data

US 2013/0061027 A1    Mar. 7, 2013

(51) Int. Cl.
G06F 9/38    (2006.01)

(52) U.S. Cl.
CPC .................................... *G06F 9/3887* (2013.01)
USPC ............................................ 712/234; 712/22

(58) Field of Classification Search
None
See application file for complete search history.

(56) References Cited

U.S. PATENT DOCUMENTS

| | | | |
|---|---|---|---|
| 4,435,758 A | 3/1984 | Lorie et al. | |
| 5,555,428 A | 9/1996 | Radigan et al. | |
| 5,689,677 A | 11/1997 | MacMillan | |
| 6,947,047 B1 | 9/2005 | Moy et al. | |
| 7,366,879 B2 | 4/2008 | Rodgers et al. | |
| 7,477,255 B1 | 1/2009 | Lindholm et al. | |
| 7,543,136 B1 | 6/2009 | Coon et al. | |
| 7,617,384 B1 | 11/2009 | Coon et al. | |
| 7,761,697 B1 | 7/2010 | Coon et al. | |
| 7,788,468 B1 | 8/2010 | Nickolls et al. | |
| 7,877,585 B1 | 1/2011 | Coon et al. | |
| 7,890,735 B2 | 2/2011 | Tran | |
| 2005/0050305 A1 | 3/2005 | Kissell | |
| 2007/0234019 A1 | 10/2007 | Terashima | |
| 2009/0240931 A1 | 9/2009 | Coon et al. | |
| 2011/0072248 A1 | 3/2011 | Nickolls et al. | |
| 2011/0078417 A1 | 3/2011 | Fahs et al. | |
| 2011/0078690 A1 | 3/2011 | Fahs et al. | |
| 2014/0047223 A1 | 2/2014 | Chen et al. | |
| 2014/0075165 A1 | 3/2014 | Chen | |

OTHER PUBLICATIONS

Oh et al., "Exploiting Thread-Level Parallelism in Lockstep Execution by Partially Duplicating a Single Pipeline," ETRI Journal., vol. 30, No. 4, pp. 576-586, Aug. 2008.

(Continued)

*Primary Examiner* — Kenneth Kim
(74) *Attorney, Agent, or Firm* — Shumaker & Sieffert, P.A.

(57) ABSTRACT

This disclosure describes techniques for handling divergent thread conditions in a multi-threaded processing system. In some examples, a control flow unit may obtain a control flow instruction identified by a program counter value stored in a program counter register. The control flow instruction may include a target value indicative of a target program counter value for the control flow instruction. The control flow unit may select one of the target program counter value and a minimum resume counter value as a value to load into the program counter register. The minimum resume counter value may be indicative of a smallest resume counter value from a set of one or more resume counter values associated with one or more inactive threads. Each of the one or more resume counter values may be indicative of a program counter value at which a respective inactive thread should be activated.

40 Claims, 30 Drawing Sheets

(56) References Cited

OTHER PUBLICATIONS

Collange, "Une architecture unifiee pour traiter la divergence de controle et la divergence memoire en SIMT," Symposium En Architectures, Saint-Malo, France, May 11, 2011, 12 pp. (The listed information was cited in a Written Opinion from the International Searching Authority which is also submitted herewith.), in French.

International Search Report and Written Opinion—PCT/US2012/050005—ISA/EPO—Oct. 4, 2012, 15 pp.

Reply to Written Opinion dated Oct. 4, 2012, from international application No. PCT/US2012/050005, filed Feb. 19, 2013, 16 pp.

Second Written Opinion of international application No. PCT/US2012/050005, dated Aug. 21, 2013, 7 pp.

Brunie et al., "Simultaneous Branch and Warp Interweaving for Sustained GPU Performance", Computer Architecture (ISCA), 2012 39th Annual International 2012 (Jun. 12, 2012), pp. 49-60, XP032200021, DOI: 10.11 09/ISCA.2012.EI237005, ISBN: 978-1-4673-0475-7, 12 pp.

Diamos et al., "SIMD Re-Convergence at Thread Frontiers", Proceedings of the 44th Annual IEEE/ACM International Symposium on Microarchitecture, Dec. 7, 2011, pp. 477-488, XP055056138, DOI: 10.1145/2155620.2155676, 12 pp.

Meng et al., "Dynamic Warp Subdivision for Integrated Branch and Memory Divergence Tolerance," ACM Sigarch Computer Architecture News, vol. 38, Jul. 8, 2010, pp. 235-246, XP055092509, ISSN: 0163-5964, DOI: 10.1145/1815961.1815992, 12 pp.

Collange S., "Stack-less SIMT reconvergence at low cost", Sep. 12, 2011, XP055038110, 11 pp.

Wu H., et al., "Characterization and Transformation of Unstructured Control Flow in GPU Applications," Proceedings of the First International Workshop on Characterizing Applications for heterogeneous Exascale Systems, CACHES'11, Jun. 4th, 2011, Tucson, Arizona, 8 pp., XP055056141.

| OLD STATE | NEW STATE | EVENT | ACTION |
|---|---|---|---|
| State 0 | State 0 | S | PC+1 |
| | | Jf | Jump to target |
| | | Jb | Jump to target |
| | | BfuT | Branch to target uniformly |
| | | BfuF | PC+1 |
| | | BbuT | Branch to target uniformly |
| | | BbuF | PC+1 |
| State 0 | State 1 | Bbd | Branch to target. Active threads with false condition become inactive. |
| | | Bfd | PC+1. Active threads with true condition become inactive. |
| State 1 | State 0 | n/a | Resume. All inactive threads become active |
| State 1 | State 1 | S | PC+1 |
| | | Jb | Jump to target |
| | | BbuT | PC+1 |
| | | BbuF | Branch to target uniformly |
| | | BfuT | PC+1 |
| | | Bbd | Branch to target. Active threads with false condition become inactive. |
| | | Bfd | PC+1. Active threads with true condition become inactive. |
| | | n/a | Resume. Some inactive threads become active. |
| State 1 | State 2 | Jf | PC+1. All active threads become inactive. |
| | | BfuT | PC+1. All active threads become inactive. |
| State 2 | State 0 | n/a | Resume. All inactive threads become active |
| State 2 | State 1 | n/a | Resume. Some inactive threads become active |
| State 2 | State 2 | Any event | PC+1 |

FIG. 13

| OLD STATE | NEW STATE | Event | ACTION |
|---|---|---|---|
| State 0 | State 0 | S | PC+1 |
| | | Jb | Jump to target |
| | | BfuF | PC+1 |
| | | BbuT | Branch to target uniformly |
| | | BbuF | PC+1 |
| | | JfL | Jump to target |
| | | BfuTL | Branch to target uniformly |
| State 0 | State 1 | Bbd | Branch to target. Active threads with false condition become inactive. |
| | | Bfd | PC+1. Active threads with true condition become inactive. |
| State 1 | State 0 | n/a | Resume. All inactive threads become active |
| State 1 | State 1 | S | PC+1 |
| | | Jb | Jump to target |
| | | BbuT | Branch to target uniformly |
| | | BfuF | PC+1 |
| | | Bbd | Branch to target. Active threads with false condition become inactive. |
| | | Bfd | PC+1. Active threads with true condition become inactive. |
| | | n/a | Resume. Some inactive threads become active. |
| | | JfL | Jump to target |
| | | BfuTL | Branch to target uniformly |
| State 1 | State 2 | JfG | Jump to MINRC. All active threads become inactive. |
| | | BfuTG | Jump to MINRC. All active threads become inactive. |
| State 2 | State 0 | n/a | Resume. All inactive threads become active |
| State 2 | State 1 | n/a | Resume. Some inactive threads become active |
| State 2 | State 2 | JfL | Jump to target |
| | | JfG | Jump to MINRC |
| | | Other event | PC+1 |

FIG. 24

Behavior of resume check before executing each instruction:
{
   for each inactive subthread {
     if(RC == PC) {
       active flag = TRUE;
       RC = MAX;
     }
   }
   Update MINRC;
}

FIG. 25

Behavior of JUMP instruction:
{
   if(backward jump) {// Jb
     if(any subthread is active) // state 0 or state 1
       jump to target; // full range jump
     else // state 2
       PC++;
   }
   else { // jump forward
     if(target <= MINRC) // JfL , state 0, 1, or 2
       jump to target; // full range jump
     else { // JfG, state 1 or 2
       for each active subthread{
         active flag = FALSE;
         RC = target;
       }
       Jump to MINRC;
     }
   }
}

FIG. 26

```
Behavior of BRANCH instruction:
{
  if(backward branching) {
    if(any subthread is active) { // state 0 or state 1
      if(all active subthreads are uniform) {
        if(condition satisfied) // BbuT
          jump to target;
        else // BbuF
          PC++;
      } else { // Bbd
        for each active subthread {
          if(condition not satisfied) {
            active flag = FALSE;
            RC = PC + 1;
          }
        }
        update MINRC;
        jump to target;
      }
    } else // state 2
      PC++;
  } else { // forward branching
    if(all active subthreads are uniform) {
      if(condition satisfied) { // state 0 or state 1
        if(target <= MINRC) // BfuTL
          jump to target; // full range jump
        else { // BfuTG, state 1 only
          for each active subthread {
            active flag = FLASE;
            RC = target;
          }
          jump to MINRC; // partial range jump
        }
      } else // BfuF, state 0, 1, or 2
        PC++; // no jump
    } else { // Bfd, state 0 or state 1
      for each active subthread with condition satisfied {
        active flag = FALSE;
        RC = target;
      }
      update MINRC;
      PC++; // no jump
    }
  }
}
```

FIG. 27

|  | Jump or uniform branch | | Divergent branch |
|---|---|---|---|
|  | Branch with condition not satisfied | Jump or branch with condition satisfied |  |
| Backward | PC + 1 | target | target |
| Forward | PC + 1 | PC + 1 | PC + 1 |

FIG. 28

|  | Jump or uniform branch | | Divergent branch |
|---|---|---|---|
|  | Branch with condition not satisfied | Jump or branch with condition satisfied |  |
| Backward | PC + 1 | target | target |
| Forward Target <= MINRC | PC + 1 | target (improved) | PC + 1 |
| Forward Target > MINRC | PC + 1 | MINRC (improved) | PC + 1 |

FIG. 29

```
Example Program 1:

I-0   Branch to instruction 6 if condition X is satisfied
I-1   Branch to instruction 4 if condition Y is satisfied
I-2   ALU instruction
I-3   ALU instruction
I-4   ALU instruction
I-5   ALU instruction
I-6   ALU instruction
I-7   End
```

FIG. 30

|  | Program | | Thread 0 | | Thread 1 | | Thread 2 | | Thread 3 | |
|---|---|---|---|---|---|---|---|---|---|---|
|  | PC | | Active | RC | Active | RC | Active | RC | Active | RC |
| Initial Value | 0 | | Yes | MAX | Yes | MAX | Yes | MAX | Yes | MAX |
| After I-0 | 1 | | No | 6 | Yes | MAX | Yes | MAX | Yes | MAX |
| After I-1 | 2 | | No | 6 | No | 4 | No | 4 | No | 4 |
| After I-2 | 3 | | No | 6 | No | 4 | No | 4 | No | 4 |
| After I-3 | 4 | | No | 6 | No | 4 | No | 4 | No | 4 |
| After I-4 | 5 | | No | 6 | Yes | MAX | Yes | MAX | Yes | MAX |
| After I-5 | 6 | | No | 6 | Yes | MAX | Yes | MAX | Yes | MAX |
| After I-6 | 7 | | Yes | MAX | Yes | MAX | Yes | MAX | Yes | MAX |

FIG. 31

|  | Program | | Thread 0 | | Thread 1 | | Thread 2 | | Thread 3 | |
|---|---|---|---|---|---|---|---|---|---|---|
|  | PC | MINRC | Active | RC | Active | RC | Active | RC | Active | RC |
| Initial Value | 0 | MAX | Yes | MAX | Yes | MAX | Yes | MAX | Yes | MAX |
| After I-0 | 1 | 6 | No | 6 | Yes | MAX | Yes | MAX | Yes | MAX |
| After I-1 | 4 | 6 | No | 6 | Yes | MAX | Yes | MAX | Yes | MAX |
| After I-4 | 5 | 6 | No | 6 | Yes | MAX | Yes | MAX | Yes | MAX |
| After I-5 | 6 | 6 | No | 6 | Yes | MAX | Yes | MAX | Yes | MAX |
| After I-6 | 7 | MAX | Yes | MAX | Yes | MAX | Yes | MAX | Yes | MAX |

FIG. 32

Example Program 2:

I-0  Branch to instruction 4 if condition X is satisfied
I-1  Jump to instruction 6
I-2  ALU instruction
I-3  ALU instruction
I-4  ALU instruction
I-5  ALU instruction
I-6  ALU instruction
I-7  End

FIG. 33

|  | Program | | Thread 0 | | Thread 1 | | Thread 2 | | Thread 3 | |
|---|---|---|---|---|---|---|---|---|---|---|
|  | PC |  | Active | RC | Active | RC | Active | RC | Active | RC |
| Initial Value | 0 |  | Yes | MAX | Yes | MAX | Yes | MAX | Yes | MAX |
| After I-0 | 1 |  | No | 4 | Yes | MAX | Yes | MAX | Yes | MAX |
| After I-1 | 2 |  | No | 4 | No | 6 | No | 6 | No | 6 |
| After I-2 | 3 |  | No | 4 | No | 6 | No | 6 | No | 6 |
| After I-3 | 4 |  | No | 4 | No | 6 | No | 6 | No | 6 |
| After I-4 | 5 |  | Yes | MAX | No | 6 | No | 6 | No | 6 |
| After I-5 | 6 |  | Yes | MAX | No | 6 | No | 6 | No | 6 |
| After I-6 | 7 |  | Yes | MAX | Yes | MAX | Yes | MAX | Yes | MAX |

FIG. 34

|  | Program | | Thread 0 | | Thread 1 | | Thread 2 | | Thread 3 | |
|---|---|---|---|---|---|---|---|---|---|---|
|  | PC | MINRC | Active | RC | Active | RC | Active | RC | Active | RC |
| Initial Value | 0 | MAX | Yes | MAX | Yes | MAX | Yes | MAX | Yes | MAX |
| After I-0 | 1 | 4 | No | 4 | Yes | MAX | Yes | MAX | Yes | MAX |
| After I-1 | 4 | 4 | No | 4 | No | 6 | No | 6 | No | 6 |
| After I-4 | 5 | 6 | Yes | MAX | No | 6 | No | 6 | No | 6 |
| After I-5 | 6 | 6 | Yes | MAX | No | 6 | No | 6 | No | 6 |
| After I-6 | 7 | MAX | Yes | MAX | Yes | MAX | Yes | MAX | Yes | MAX |

FIG. 35

PROGRAM FLOW CONTROL FOR MULTIPLE DIVERGENT SIMD THREADS USING A MINIMUM RESUME COUNTER

TECHNICAL FIELD

The disclosure relates to multi-threaded processing and, more particularly, to techniques for handling divergent threads in a multi-threaded processing system.

BACKGROUND

A single instruction, multiple data (SIMD) processing system is a class of parallel computing systems that includes multiple processing elements which execute the same instruction on multiple pieces of data. A SIMD system may be a standalone computer or a sub-system of a computing system. For example, one or more SIMD execution units may be used in a graphics processing unit (GPU) to implement a programmable shading unit that supports programmable shading.

A SIMD processing system allows multiple threads of execution for a program to execute synchronously on the multiple processing elements in a parallel manner, thereby increasing the throughput for programs where the same set of operations needs to be performed on multiple pieces of data. However, if the program includes conditional branch instructions, it is possible that the branch condition may be satisfied for some of the threads executing in the system and not satisfied for other threads executing in the system. Such a condition may be referred to as a divergent thread condition and results in the SIMD system not being able to execute all of the threads in a synchronous fashion on the multiple processing elements.

SUMMARY

This disclosure describes techniques for handling divergent thread conditions within a multi-threaded processing system. The techniques may, in some examples, include deactivating one or more threads in response to a divergent branch condition and, for each thread being deactivated, setting a resume counter value for the respective thread to a value indicative of a program counter value at which the respective thread should be reactivated. For a divergent branch condition associated with a backward branch instruction, the techniques of this disclosure may deactivate threads for which the branching condition is not satisfied, set the resume counter value for each thread being deactivated to a value associated with a next sequential instruction that occurs after the branch instruction, and load the program counter with a value associated with a target instruction specified by the branch instruction. For a divergent branch condition associated with a forward branch instruction, the techniques of this disclosure may deactivate threads for which the branching condition is satisfied, set the resume counter value for each thread being deactivated to a value associated with a target instruction specified by the branch instruction, and load the program counter with a value associated with a next sequential instruction that occurs after the branch instruction. Each time the program counter is loaded with a new program counter value, the techniques of this disclosure may reactivate any threads where the resume counter value is equal to the new program counter value.

In further examples, the techniques of this disclosure may include setting a minimum resume counter value to a value indicative of a smallest resume counter value associated with the threads executing in the multi-threaded processing system. When any of the resume counter values is set to a new value, the minimum resume counter value may be updated to reflect the smallest resume counter value. When executing a forward jump instruction or a forward branch instruction that is uniformly satisfied, i.e., all active threads satisfy the branch condition, the techniques of this disclosure may select one of the minimum resume counter value and a target program counter value associated with the forward jump instruction or forward branch instruction to load into the program counter. When the target program counter value is less than or equal to the minimum resume counter value, the techniques of this disclosure may select the target program counter value as the value to load into the program counter. When the target program counter value is not less than or equal to the minimum resume counter value, the techniques of this disclosure may select the minimum resume counter value as the value to load into the program counter.

In one example, this disclosure describes a method that includes obtaining a control flow instruction identified by a program counter value stored in a program counter register. The control flow instruction includes a target value indicative of a target program counter value for the control flow instruction. The method further includes selecting one of the target program counter value and a minimum resume counter value as a value to load into the program counter register. The minimum resume counter value is indicative of a smallest resume counter value from a set of one or more resume counter values associated with one or more inactive threads. Each of the one or more resume counter values is indicative of a program counter value at which a respective inactive thread should be activated.

In another example, this disclosure describes a system that includes a control unit configured to obtain a control flow instruction identified by a program counter value stored in the program counter register. The control flow instruction includes a target value indicative of a target program counter value for the control flow instruction. The control unit is further configured to select one of the target program counter value and a minimum resume counter value as a value to load into the program counter register. The minimum resume counter value is indicative of a smallest resume counter value from a set of one or more resume counter values associated with one or more inactive threads. Each of the one or more resume counter values is indicative of a program counter value at which a respective inactive thread should be activated.

In another example, this disclosure describes an apparatus that includes means for obtaining a control flow instruction identified by a program counter value stored in the program counter register. The control flow instruction includes a target value indicative of a target program counter value for the control flow instruction. The apparatus further includes means for selecting one of the target program counter value and a minimum resume counter value as a value to load into the program counter register. The minimum resume counter value is indicative of a smallest resume counter value from a set of one or more resume counter values associated with one or more inactive threads. Each of the one or more resume counter values is indicative of a program counter value at which a respective inactive thread should be activated.

In another example, this disclosure describes a computer-readable storage medium that includes instructions that cause one or more processor to obtain a control flow instruction identified by a program counter value stored in the program counter register. The control flow instruction includes a target value indicative of a target program counter value for the control flow instruction. The computer-readable storage medium further includes instructions that cause one or more processor to select one of the target program counter value and a minimum resume counter value as a value to load into the program counter register. The minimum resume counter value is indicative of a smallest resume counter value from a set of one or more resume counter values associated with one or more inactive threads. Each of the one or more resume counter values is indicative of a program counter value at which a respective inactive thread should be activated.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 13 is a state transition table that characterizes exemplary operation of the flow control module illustrated in FIG. 11 according to this disclosure.

FIG. 24 is a state transition table that characterizes exemplary operation of the flow control module illustrated in FIG. 22 according to this disclosure.

FIGS. 25-27 illustrate example pseudo-code for implementing the minimum resume counter divergent thread handling techniques of this disclosure.

FIGS. 28 and 29 are tables illustrating differences between the resume counter techniques and the minimum resume counter techniques of this disclosure.

FIG. 30 illustrates an example program that may utilize the divergent thread handling techniques of this disclosure.

FIG. 31 is a table illustrating an example execution sequence for the example program in FIG. 30 using the resume counter divergent thread handling techniques in accordance of this disclosure.

FIG. 32 is a table illustrating an example execution sequence for the example program in FIG. 30 using the minimum resume counter divergent thread handling techniques of this disclosure.

FIG. 33 illustrates another example program that may utilize the divergent thread handling techniques of this disclosure.

FIG. 34 is a table illustrating an example execution sequence for the example program in FIG. 33 using the resume counter divergent thread handling techniques of this disclosure.

FIG. 35 is a table illustrating an example execution sequence for the example program in FIG. 33 using the minimum resume counter divergent thread handling techniques of this disclosure.

DETAILED DESCRIPTION

Figure 1:
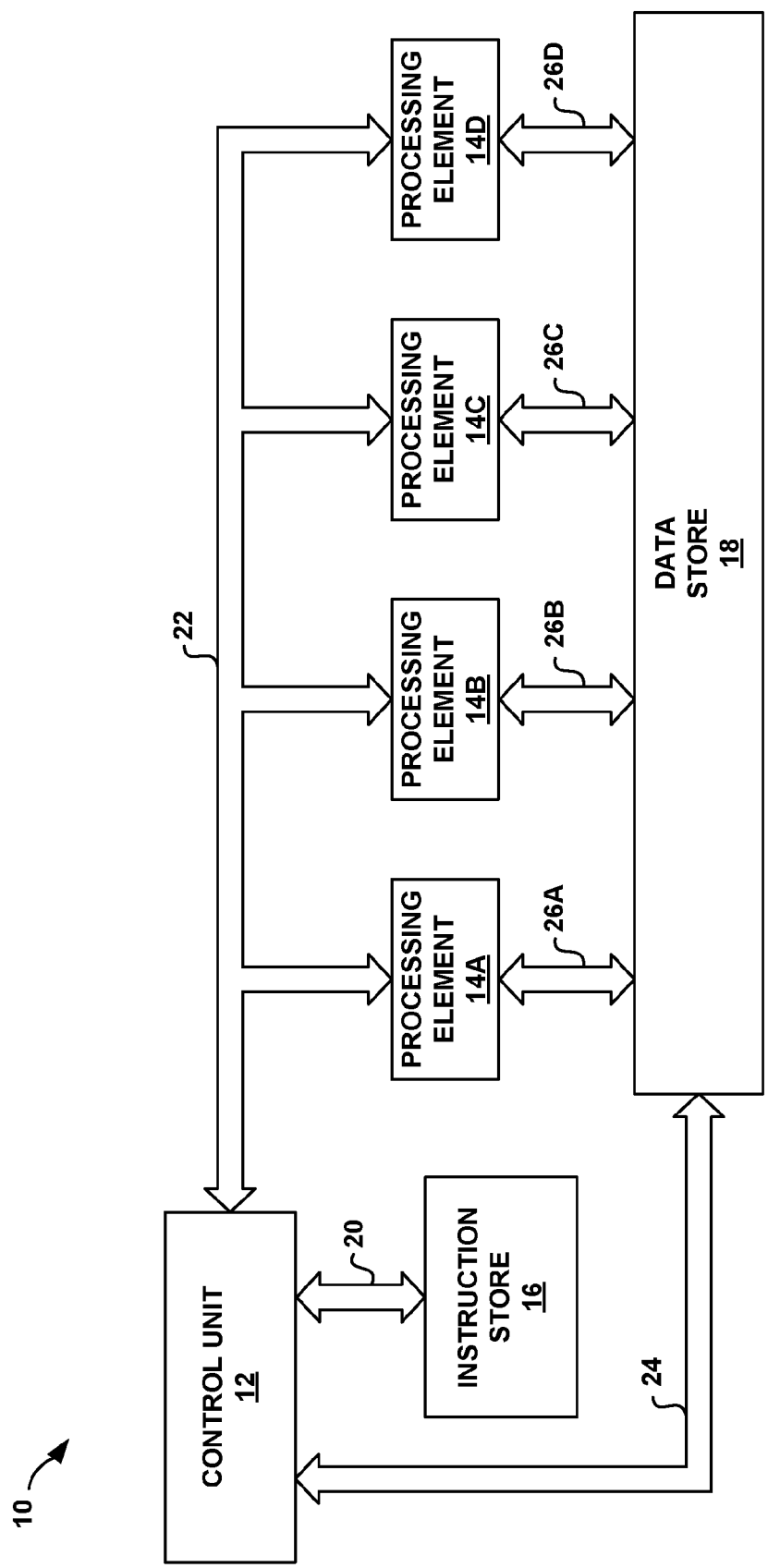
FIG. 1 is a block diagram illustrating an example processing system that may be used to implement the divergent thread handling techniques of this disclosure.

This disclosure describes techniques for handling divergent thread conditions within a multi-threaded processing system. The techniques may, in some examples, include deactivating one or more threads in response to a divergent branch condition and, for each thread being deactivated, setting a resume counter value for the respective thread to a value indicative of a program counter value at which the respective thread should be reactivated. For a divergent branch condition associated with a backward branch instruction, the techniques of this disclosure may deactivate threads for which the branching condition is not satisfied, set the resume counter value for each thread being deactivated to a value associated with a next sequential instruction that occurs after the branch instruction, and load the program counter with a value associated with a target instruction specified by the branch instruction. For a divergent branch condition associated with a forward branch instruction, the techniques of this disclosure may deactivate threads for which the branching condition is satisfied, set the resume counter value for each thread being deactivated to a value associated with a target instruction specified by the branch instruction, and load the program counter with a value associated with a next sequential instruction that occurs after the branch instruction. Each time the program counter is loaded with a new program counter value, the techniques of this disclosure may reactivate any threads where the resume counter value is equal to the new program counter value. In this manner, the techniques of this disclosure may ensure orderly processing and handling of divergent threads.

When using the resume counter divergent thread handling techniques of this disclosure, the orderly processing of divergent threads is maintained by ensuring the following condition: Divergent threads that are scheduled to process instructions at lower-valued addresses execute prior to threads that are scheduled to process instructions at higher-valued addresses. One issue encountered when enforcing this condition arises when a forward jump instruction is encountered after one or more threads have been deactivated. In such a situation, the system cannot jump to the target instruction without the possibility of violating the above-mentioned condition because there may be inactive threads that are scheduled to execute instructions at program counter values between the current program counter value and a target program counter value associated with a target instruction specified by the jump instruction.

One solution to this problem is to, rather than jump to the target program counter value, begin incrementally cycling the program counter through each value between the current program counter value and the target program counter value until either one or more inactive threads are reactivated or the target program counter value is reached. In this way, the system will ensure that any inactive threads that are scheduled to execute instructions between the current program counter value and the target program counter value are executed prior to the threads that have jumped to the target instruction specified the forward jump instruction thereby maintaining the above-mentioned condition. However, cycling through the program counter values has the drawback of increasing the processing time of forward jump instructions, particularly in the case where all inactive threads have a resume counter value greater than or equal to the target program counter value. Issues similar to those discussed above with respect to forward jump instructions also arise when a forward branch instruction is encountered, one or more threads are deactivated, and all active threads satisfy the branch condition, i.e., a forward branch instruction where the branch condition is uniformly satisfied.

This disclosure describes minimum resume counter techniques that may be used to improve the performance of forward jump instructions when one or more threads are deactivated and to improve the performance of forward branch instructions when one or more threads are deactivated and, for the remaining active threads, the branch condition is uniformly satisfied. The minimum resume counter techniques may include setting a minimum resume counter value to a value indicative of a smallest resume counter value associated with the threads executing in the multi-threaded processing system. When any of the resume counter values is set to a new value, the minimum resume counter value may be updated to reflect the smallest resume counter value. When executing a forward jump instruction or a forward branch instruction that is uniformly satisfied, i.e., all active threads satisfy the branch condition, the techniques of this disclosure may select one of the minimum resume counter value and a target program counter value associated with the forward jump instruction or forward branch instruction to load into the program counter. When the target program counter value is less than or equal to the minimum resume counter value, the techniques of this disclosure may select the target program counter value as the value to load into the program counter. When the target program counter value is not less than or equal to the minimum resume counter value, the techniques of this disclosure may select the minimum resume counter value as the value to load into the program counter. In this manner, the techniques of this disclosure may improve the performance of forward jump instructions and forward branch instructions in a system that utilizes resume counters for divergent thread handling.

FIG. 1 is a block diagram illustrating an example processing system 10 that may be used to implement the divergent thread handling techniques of this disclosure. Processing system 10 is configured to execute instructions for a program in a parallel manner. Processing system 10 includes a control unit 12, processing elements 14A-14D (collectively "processing elements 14"), an instruction store 16, a data store 18, and communication paths 20, 22, 24, 26A-26D. Communication paths 26A-26D may be referred to collectively as "communication paths 26." In some examples, processing system 10 may be a single-instruction, multiple-data (SIMD) processing system that is configured to execute a plurality of threads of execution for a program using processing elements 14. In such a SIMD system, processing elements 14 may together process a single instruction at a time with respect to different data items. The program may retire after all of the threads associated with the program complete execution.

Control unit 12 is configured to control processing system 10 to execute instructions for a program stored in instruction store 16. For each instruction of the program, control unit 12 may retrieve the instruction from instruction store 16 via communication path 20, and process the instruction. In some examples, control unit 12 may process the instruction by causing an operation associated with the instruction to execute on one or more of processing elements 14. For example, the instruction retrieved by control unit 12 may be an arithmetic instruction that instructs processing system 10 to perform an arithmetic operation with respect to data items specified by the instruction, and control unit 12 may cause one or more of processing elements 14 to perform the arithmetic operation on the specified data items. In further examples, control unit 12 may process the instruction without causing an operation to be performed on processing elements 14.

Control unit 12 may cause an operation to be performed on one or more of processing elements 14 by providing an instruction to processing elements 14 via communication path 22. The instruction may specify the operation to be performed by processing elements 14. The instruction provided to the one or more of processing elements 14 may be the same as or different than the instruction retrieved from instruction store 16. In some examples, control unit 12 may cause the operation to be performed on a particular subset of processing elements 14 by one or both of activating a particular subset of processing elements 14 upon which the operation should be performed and deactivating another subset of processing elements 14 upon which the operation should not be performed. Control unit 12 may activate and/or deactivate processing elements 14 by providing respective activation and/or deactivation signals to each of processing elements 14 via communication path 22. In some examples, control unit 12 may activate and/or deactivate processing elements 14 by providing activation and/or deactivation signals to processing elements 14 in conjunction with providing an instruction to processing elements 14. In further examples, control unit 12 may activate and/or deactivate processing elements 14 prior to providing an instruction to processing elements 14.

Control unit 12 may execute a plurality of threads of execution for a program using processing elements 14. Each of processing elements 14 may be configured to process instructions of the program for a respective thread of the plurality of threads. For example, control unit 12 may assign each thread of execution to an individual one of processing elements 14 for processing. The different threads of execution for the program may execute the same set of instructions with respect to different data items in a set of data items. For example, processing element 14A may execute a first thread of execution for a program stored in instruction store 16 with respect to a first subset of data items in a plurality of data items, and processing element 14B may execute a second thread of execution for the program stored in instruction store 16 with respect to a second subset of data items in the plurality of data items. The first thread of execution may be different than the second thread of execution, and the first subset of data items may be different than the second subset of data items.

In some examples, control unit 12 may activate and deactivate individual threads in the plurality of threads of execution. When control unit 12 deactivates a thread, control unit 12 may also deactivate and/or disable the processing element 14A-14D that is assigned to execute the thread. Similarly, when control unit 12 activates a thread, control unit 12 may also activate the processing element 14A-14D that is assigned to execute the thread. Control unit 12 may activate and deactivate various combinations of one or more threads to assist in the handling of divergent branch conditions as explained in further detail later in this disclosure.

As used herein, an active thread may refer to a thread that is activated, and an inactive thread may refer to a thread that is deactivated. For a plurality of threads executing in processing system 10 during a given processing cycle, each of the active threads may be configured to process an instruction of the program identified by a global program counter register for the plurality threads during the processing cycle. For example, control unit 12 may activate processing elements 14 that are assigned to active threads in order to configure such processing elements 14 to process the instruction of the program during the processing cycle. On the other hand, for a plurality of threads executing in processing system 10 during a given processing cycle, each of the inactive threads may be configured to not process the instruction of the program during the processing cycle. For example, control unit 12 may deactivate processing elements 14 that are assigned to inactive threads to configure such processing elements 14 to not process the instruction of the program during the processing cycle. In some examples, a processing cycle may refer to the time interval between successive loads of the program counter. For example, a processing cycle may refer to the time between when the program counter is loaded with a first value and when the program counter is loaded with a second value. The first and second values may be the same or different values. In examples where the program counter is loaded in an asynchronous manner due to resume check techniques, as described in further detail later in this disclosure, such asynchronous loads may not, in some examples, serve to differentiate processing cycles. In other words, in such examples, a processing cycle may refer to the time interval between successive synchronous loads of the program counter. A synchronous load of the program counter may, in some examples, refer to a load that is trigged by a clock signal.

Sometime prior to the retrieval of the next instruction, control unit 12 determines a next instruction to be processed by processing system 10. The manner in which control unit 12 determines the next instruction to be processed is different depending on whether the instruction previously retrieved by processing system 10 is a control flow instruction. If the instruction previously retrieved by processing system 10 is not a control flow instruction, then control unit 12 may determine that the next instruction to be processed by processing system 10 corresponds to a next sequential instruction stored in instruction store 16. For example, instruction store 16 may store the instructions for a program in an ordered sequence, and the next sequential instruction may be an instruction that occurs immediately after the previously retrieved instruction.

If the instruction previously retrieved by processing system 10 is a control flow instruction, then control unit 12 may determine the next instruction to be processed by processing system 10 based on information specified in the control flow instruction. For example, the control flow instruction may be an unconditional control flow instruction, e.g., an unconditional branch instruction or a jump instruction, in which case control unit 12 may determine the next instruction to be processed by processing system 10 is a target instruction identified by the control flow instruction. As another example, the control flow instruction may be a conditional control flow instruction, e.g., a conditional branch instruction, in which case control unit 12 may select one of a target instruction identified by the control flow instruction or a next sequential instruction stored in instruction store 16 as the next instruction to process from instruction store 16.

As used herein, a control flow instruction may refer to an instruction that includes information that identifies a target instruction in instruction store 16. For example, the control flow instruction may include a target value indicative of a target program counter value for the control flow instruction. The target program counter value may be indicative of a target address for the target instruction. The target instruction may, in some examples, be different than the next sequential instruction stored in instruction store 16. High-level program code may include control flow statements such as, e.g., if, switch, do, for, while, continue, break, and go to statements. A compiler may translate the high-level control flow statements into low-level, e.g., machine-level, control flow instructions. An instruction that is not a control flow instruction may be referred to herein as a sequential instruction. For example, a sequential instruction may not include information that identifies a target instruction.

For control flow instructions, the information that identifies the target instruction may be a value indicative of a target instruction stored in instruction store 16. In some examples, the value indicative of the target instruction in instruction store 16 may be a value indicative of the instruction address of the target instruction in instruction store 16. The value indicative of the instruction address of the target instruction may, in some cases, be the address of the target instruction in instruction store 16. The value indicative of the instruction address of the target instruction may, in additional cases, be a value used to calculate the address of the target instruction. In further examples, the value indicative of the instruction address of the target instruction may be a value indicative of a target program counter value that corresponds to the target instruction. The value indicative of the target program counter value may, in some cases, be the target program counter value that corresponds to the target instruction. The value indicative of the target program counter value may, in additional cases, be a value used to calculate the target program counter value. The target program counter value that corresponds to the target instruction may, in some examples, be equal to the address of the target instruction.

A control flow instruction may be a forward control flow instruction or a backward control flow instruction. A forward control flow instruction may be a control flow instruction where the target instruction occurs after the control flow instruction in the ordered sequence of instructions stored in instruction store 16. A backward control flow instruction may be a control flow instruction where the target instruction occurs prior to the next sequential instruction in the ordered sequence of instructions stored in instruction store 16. The next sequential instruction may occur immediately after the control flow instruction in the ordered sequence of instructions.

A control flow instruction may be a conditional control flow instruction or an unconditional control flow instruction. A conditional control flow instruction includes information that specifies a condition for jumping to the target instruction associated with the control flow instruction. When processing a conditional control flow instruction, if control unit 12 determines that the condition is satisfied, then control unit 12 may determine that the next instruction to be processed is the target instruction. On the other hand, if control unit 12 determines that the condition is not satisfied, then control unit 12 may determine that the next instruction to be processed is the next sequential instruction stored in instruction store 16. An unconditional control flow instruction does not include information that specifies a condition for jumping to the target instruction associated with the control flow instruction. When processing an unconditional control flow instruction, control unit 12 may unconditionally determine that the next instruction to process is the target instruction identified by the control flow instruction. In other words, the determination in such a case is not conditioned upon any condition specified in the unconditional control flow instruction. As used herein, a condition control flow instruction may be referred to herein as a branch instruction unless the branch instruction is otherwise designated as an unconditional branch instruction. Also, an unconditional control flow instruction may be referred to herein as a jump instruction.

A conditional branch instruction may include conditions that are specified with respect to one or more data item values. For example, one type of condition may be a comparison condition that compares a first data item value to a second data item value for each active thread executing in processing system 10. Comparing the data item values may include, e.g., determining whether the first data item value is greater than, less than, not greater than, not less than, equal to, or not equal to the second data item value. Another type of condition may be a zero check condition that determines whether a data item value for each active thread executing in processing system 10 is equal to or not equal to zero. Because each of processing elements 14 operates on different data items, the result of evaluating the condition may be different for each active thread executing in processing system 10. If either all of the active threads executing in processing system 10 satisfy the branch condition or all of the active threads executing in processing system 10 do not satisfy the branch condition, then a uniform branching condition occurs and the branching divergence for the threads is said to be uniform. On the other hand, if at least one of the active threads executing in processing system 10 satisfies the branch condition and at least one of the active threads executing in processing system 10 does not satisfy the branch condition, then a divergent branching condition occurs and the branching divergence for the threads is said to be divergent.

The threads executing in processing system 10 may execute the same instruction in a lockstep fashion. In other words, each of processing elements 14 may together execute the same instruction for all active threads during a processing cycle. However, when a divergent branch condition occurs, the threads that satisfy that branch condition may be scheduled to execute next instructions that are different than the next instructions scheduled to be executed by the threads that do not satisfy the branch condition. This may hinder the threads in processing system 10 from executing a single instruction in a lockstep fashion.

According to this disclosure, control unit 12 is configured to handle divergent thread conditions by utilizing one or both of the resume counter techniques described herein and the minimum resume counter techniques described herein. The resume counter techniques described in this disclosure are designed to provide orderly processing of divergent threads. The resume counter techniques described in this disclosure may, in some examples, be able to manage divergent threads without needing to use a stack as is sometimes used in other systems. In addition, the resume counter techniques described in this disclosure may, in some examples, be able to achieve greater parallelism than that which is achieved by stack-based divergent thread handling systems because the threads may be reactivated based on hardware-triggered criteria, e.g., program counter values, rather than based on software-triggered criteria, e.g., executing particular software instructions to pop items off of a stack. The minimum resume counter techniques described in this disclosure may improve the performance of the resume counter techniques, particularly in the case of executing forward jump and forward branch instructions when one or more threads have already been deactivated.

Control unit 12 is communicatively coupled to instruction store 16 via communication path 20, to processing elements 14 via communication path 22, and to data store 18 via communication path 24. Control unit 12 may use communication path 20 to send read instructions to instruction store 16. A read instruction may specify an instruction address in instruction store 16 from which an instruction should be retrieved. Control unit 12 may receive one or more program instructions from instruction store 16 in response to sending the read instruction. Control unit 12 may use communication path 22 to provide instructions to processing elements 14, and in some examples, to receive data from processing elements 14, e.g., the result of a comparison instruction for evaluating a branch condition. In some examples, control unit 12 may use communication path 24 to retrieve data items values from data store 18, e.g., to determine a branch condition. Although FIG. 1 illustrates processing system 10 as including a communication path 24, in other examples, processing system 10 may not include a communication path 24.

Each of processing elements 14 may be configured to perform operations to assist processing system 10 in processing instructions for the program stored in instruction store 16. In some examples, each of processing elements 14 may be configured to perform the same set of operations. For example, each of processing elements 14 may implement the same instruction set architecture (ISA). In additional examples, each of processing elements 14 may be an arithmetic logic unit (ALU). In further examples, processing system 10 may be a vector processor, e.g., a graphics processing unit (GPU) vector processor, and each of processing elements 14 may be a processing element within the vector processor. In additional examples, processing system 10 may be a SIMD execution unit, and each of processing elements 14 may be a SIMD processing element within the SIMD execution unit.

The operations performed by processing elements 14 may include arithmetic operations, logic operations, comparison operations, etc. Arithmetic operations may include operations such as, e.g., an addition operation, a subtraction operation, a multiplication operation, a division operation, etc. The arithmetic operations may also include, e.g., integer arithmetic operations and/or floating-point arithmetic operations. The logic operations may include operations, such as, e.g., a bit-wise AND operation, a bit-wise OR operation, a bit-wise XOR operation, etc. The comparison operations may include operations, such as, e.g., a greater than operation, a less than operation, an equal to zero operation, a not equal to zero operation, etc. The greater than and less than operations may determine whether a first data item is greater than or less than a second data item. The equal to zero and not equal to zero operations may determine whether a data item is equal to zero or not equal to zero. The operands used for the operations may be stored in registers contained in data store 18.

Each of processing elements 14 may be configured to perform an operation in response to receiving an instruction from control unit 12 via communication path 22. In some examples, each of processing elements 14 may be configured to be activated and/or deactivated independently of the other processing elements 14. In such examples, each of processing elements 14 may be configured to perform an operation in response to receiving an instruction from control unit 12 when the respective processing element 14A-14D is activated, and to not perform the operation in response to receiving the instruction from control unit 12 when the respective processing element 14A-14D is deactivated, i.e., not activated.

Each of processing element 14A-14D may be communicatively coupled to data store 18 via a respective communication path 26A-26D. Processing elements 14 may be configured to retrieve data from data store 18 and store data to data store 18 via communication paths 26. The data retrieved from data store 18 may, in some examples, be operands for the operations performed by processing elements 14. The data stored to data store 18 may, in some examples, be the result of an operation performed by processing elements 14.

Instruction store 16 is configured to store a program for execution by processing system 10. The program may be stored as a sequence of instructions. In some examples, each instruction may be addressed by a unique instruction address value. In such examples, instruction address values for later instructions in the sequence of instructions are greater than instruction address values for earlier instructions in the sequence of instructions. The program instructions, in some examples, may be machine-level instructions. That is, in such examples, the instructions may be in a format that corresponds to the ISA of processing system 10. Instruction store 16 is configured to receive a read instruction from control unit 12 via communication path 20. The read instruction may specify an instruction address from which an instruction should be retrieved. In response to receiving the read instruction, instruction store 16 may provide an instruction corresponding to the instruction address specified in the read instruction to control unit 12 via communication path 20.

Instruction store 16 may be any type of memory, cache or combination thereof. When instruction store 16 is a cache, instruction store 16 may cache a program that is stored in a program memory external to processing system 10. Although instruction store 16 is illustrated as being within processing system 10, in other examples, instruction store 16 may be external to processing system 10.

Data store 18 is configured to store data items used by processing elements 14. In some examples, data store 18 may comprise a plurality of registers, each register being configured to store a respective data item within a plurality of data items operated on by processing system 10. Data store 18 may be coupled to one or more communication paths (not shown) that are configured to transfer data between the registers in data store 18 and a memory or cache (not shown).

Although FIG. 1 illustrates a single data store 18 for storing data used by processing elements 14, in other examples, a processing system 10 may include separate, dedicated data stores for each of processing elements 14. Processing system 10 illustrates a processing system 10 having four processing elements 14 for exemplary purposes. In other examples, processing system 10 may have the same or a different number of processing elements 14 in the same or a different configuration.

Figure 2:
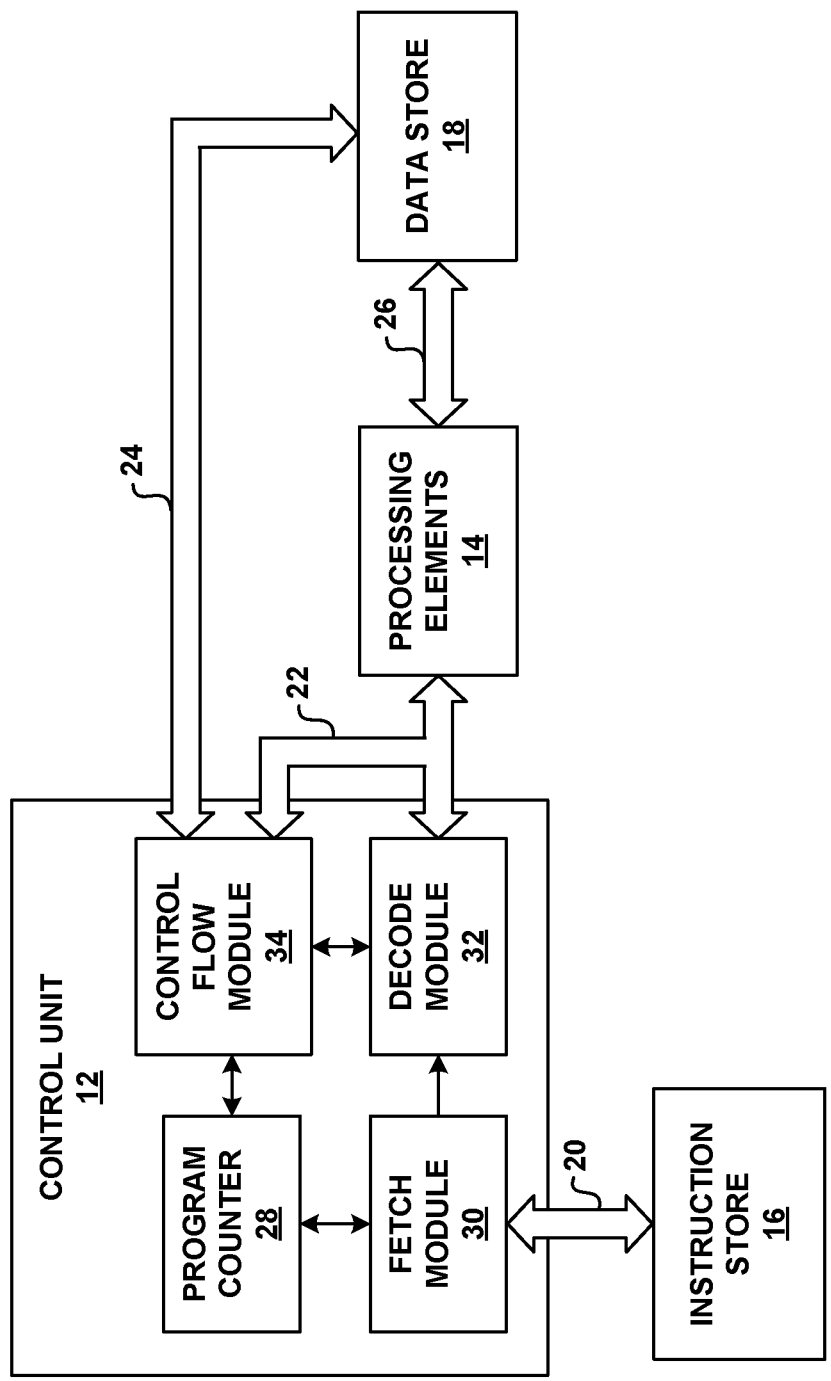
FIG. 2 is a block diagram illustrating the control unit in the example processing system of FIG. 1 in greater detail according to this disclosure.

FIG. 2 is a block diagram illustrating control unit 12 in the example processing system 10 of FIG. 1 in greater detail according to this disclosure. Control unit 12 includes a program counter 28, a fetch module 30, a decode module 32 and a control flow module 34. Control flow module 34 may be alternatively referred to herein as a control flow unit.

Program counter 28 is configured to store a program counter value. In some examples, program counter 28 may be a hardware register, such as, e.g., a program counter register. The program counter value may be indicative of an instruction stored in instruction store 16. The program counter value may, in some cases, be equal to the instruction address of the instruction stored in instruction store 16. In additional cases, the program counter value may be used to compute the instruction address of the instruction stored in instruction store 16. For example, the program counter value may be added to an offset value to generate the instruction address. Program counter 28 may be referred to herein as a "global program counter" or a "global program counter register" because program counter 28 may be used as a single program counter for all of processing elements 14.

Fetch module 30 is configured to fetch, e.g., retrieve, an instruction from control unit 12 based on the program counter value stored in program counter 28. For example, fetch module 30 may fetch an instruction from an instruction address identified by the program counter value stored in program counter 28. Fetch module 30 may provide the fetched instruction to decode module 32 for further processing.

Decode module 32 is configured to decode the instruction received from fetch module 30. Decoding the instruction may involve determining whether the instruction is a type of instruction that can be processed by processing elements 14. If the instruction is a type of instruction that can be processed by processing elements 14, decode module 32 may cause the instruction to execute on one or more of processing elements 14. In some examples, decode module 32 may cause the instruction to execute on all of processing elements 14. In other examples, decode module 32 may cause the instruction to execute on less than all of processing elements 14. Causing the instruction to execute on one or more of processing elements 14 may, in some cases, include issuing the instruction to one or more of processing elements 14 for execution. For example, fetch module 30 may fetch a sequential instruction identified by program counter 28, and issue the sequential instruction to all processing elements 14 that correspond to active threads for processing. If the instruction is not the type of instruction that can be processed by processing elements 14, then control unit 12 may process the instruction without issuing the instruction to any of processing elements 14 for processing. For example, the instruction may be a control flow instruction of the type that does not require processing by processing elements 14, in which case control unit 12 may process the instruction without issuing the instruction any of processing elements 14.

In either case, decode module 32 may forward control information to control flow module 34 for further processing. In some examples, the control information may be the instruction itself. In further examples, the control information may include information, such as, e.g., information indicative of whether the instruction is a control flow instruction or a sequential instruction; if the instruction is a control flow instruction, information indicative of whether the instruction is a branch instruction or a jump instruction; if the instruction is a branch or jump instruction, information indicative of whether the branch or jump instruction is a forward or backward branch or jump instruction, and if the instruction is a branch instruction, information specifying the branch condition.

Instructions that are of a type that can be processed by processing elements 14 may include arithmetic instructions and logic instructions. An arithmetic instruction may refer to an instruction that instructs processing elements 14 to perform an arithmetic operation, and a logic instruction may refer to an instruction that instructs processing elements 14 to perform a logic operation. In some examples, a control flow instruction may be an instruction that can be processed by processing elements 14, e.g., the control flow instruction may include a branch condition that is evaluated by processing elements 14. Instructions that are not of a type that can be processed by processing elements 14 may include control flow instructions where the branch condition is evaluated by control unit 12 and/or control flow instructions that do not have a branch condition.

Control flow module 34 may determine a program counter value associated with a next instruction to be processed by control unit 12, and load the program counter value into program counter 28. If the previously fetched instruction is a sequential instruction, then control flow module 34 may select a program counter value that is indicative of a next sequential instruction stored in instruction store 16 to load into program counter 28. If the previously fetched instruction is a control flow instruction, then control flow module 34 may utilize the resume counter techniques and/or minimum resume counter techniques of this disclosure to select a new program counter value to load into program counter 28. If control flow module 34 utilizes the resume counter techniques of this disclosure without utilizing the minimum resume counter techniques of this disclosure, control flow module 34 may select one of a target program counter value associated with a target instruction identified by the control flow instruction or a program counter value indicative of a next sequential instruction to load into control flow module 34. If control flow module 34 utilizes the minimum resume counter techniques of this disclosure, control flow module 34 may select one of a target program counter value associated with a target instruction identified by the control flow instruction, a program counter value indicative of a next sequential instruction, or a minimum resume counter value to load into control flow module 34. The resume counter techniques and the minimum resume counter techniques are described in further detail later in this disclosure.

Control flow module 34 may store a resume counter value for each thread executing in processing system 10. For example, the number of resume counter values stored in control flow module 34 may be equal to the number of processing elements 14 contained in processing system 10. For each resume counter value, if the thread corresponding to the respective resume counter value is inactive, then the resume counter value may be indicative of a program counter value at which the inactive thread should be activated or reactivated. Otherwise, if the thread corresponding to the respective resume counter value is active, then the resume counter value may be, in some examples, set to a maximum value, i.e., a value that is the largest value that can be represented in the storage slot or register for the resume counter.

In examples that use the minimum resume counter techniques of this disclosure, control flow module 34 may store a single minimum resume counter value for processing system 10. The minimum resume counter value may be indicative of a smallest resume counter value from the set of resume counter values associated with the threads executing in processing system 10. If one or more threads executing in processing system 10 are inactive, then the minimum resume counter value may be indicative of a smallest resume counter value from a set of one or more resume counter values associated with the inactive threads. Otherwise, if all threads are active, the minimum resume counter value may, in some examples, be set to a maximum value, i.e., a value that is the largest value that can be represented in the storage slot for the minimum resume counter.

Control flow module 34 may store an active flag for each thread executing in processing system 10. For example, the number of active flags stored in control flow module 34 may be equal to the number of processing elements 14 contained in processing system 10. Each active flag may indicate whether or not the thread associated with the active flag is active or inactive. In some examples, the active flag may be a single bit that is set to indicate that the thread associated with the active flag is active, and reset to indicate that the thread associated with the active flag is inactive.

In some examples, control flow module 34 may also store a program state. For example, a first program state may indicate that all threads are active, a second program state may indicate that at least on thread is active and at least one thread is inactive and a third program state may indicate that all threads are inactive. The program state may be used in such examples, to select a program counter value to load into program counter 28.

Control flow module 34 may be configured, in some examples, to activate and deactivate one or more of processing elements 14 via communication path 22. In additional examples, control flow module 34 may instruct decode module 32 to activate and deactivate particular processing elements 14. In further examples, control flow module 34 may receive the results of a comparison instruction from one or more of processing elements 14 via communication path 22. The results of the comparison instruction in some examples may be used to evaluate a branch condition. In yet further examples, control flow module 34 may retrieve one or more data items from data store 18, via communication path 24, for purposes of evaluating a branch condition.

In some examples, processing system 10 of FIGS. 1 and 2 may be included in a graphics processing unit (GPU). In such examples, processing system 10 may be used to implement a shader unit contained within the GPU, such as, e.g., a vertex shader unit, a pixel shader unit, a fragment shader unit, a geometry shader unit, a unified shader unit, etc. In such examples, processing system 10 may be configured to execute programs, such as, e.g., vertex shader threads, fragment shader threads, geometry shader threads, etc.

FIGS. 3-10 are flow diagrams illustrating an example resume counter technique for handling divergent threads in the processing system of FIG. 1 according to this disclosure. In some examples, processing system 10 of FIGS. 1 and 2 may be used to implement the example techniques shown in FIGS. 3-10. For ease of explanation, the techniques will be described with respect to components of example processing system 10 shown in FIGS. 1 and 2, but it should be understood that the techniques may be performed on other systems with the same or different components in the same or a different configuration.

Figure 3:
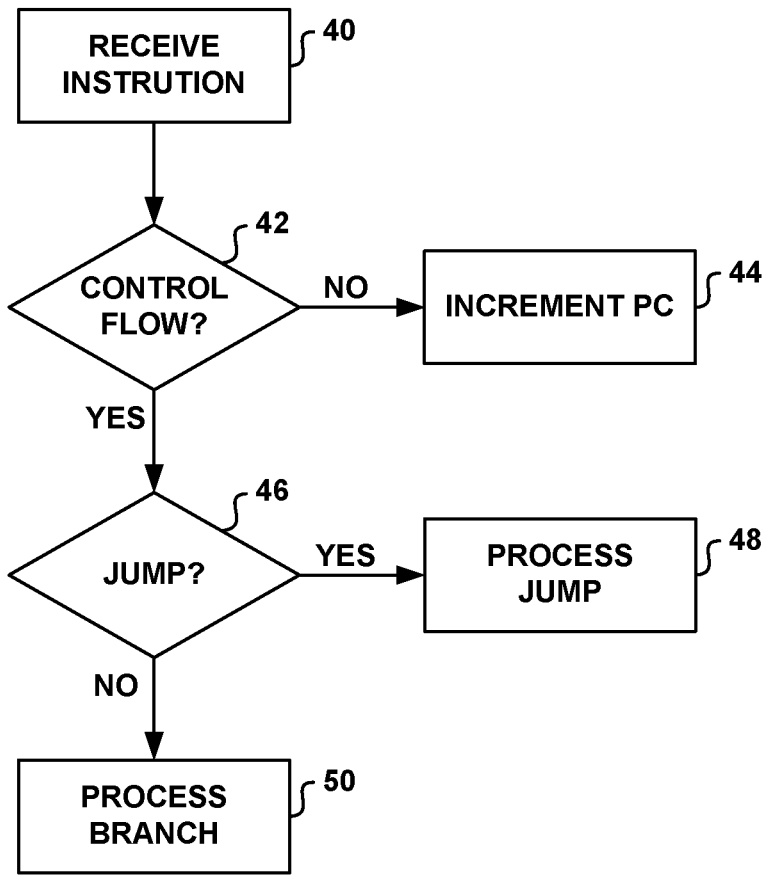
FIGS. 3-10 are flow diagrams illustrating an example resume counter technique for handling divergent threads in the processing system of FIG. 1 according to this disclosure.

FIG. 3 is a flow diagram illustrating an example technique for determining a program counter value to load into program counter 28 according to this disclosure. Control flow module 34 receives an instruction and/or control information associated with an instruction (40). Control flow module 34 determines whether the instruction is a control flow instruction (42). If control flow module 34 determines that the instruction is not a control flow instruction, control flow module 34 increments program counter 28 (44). For example, control flow module 34 may select a program counter value to load into program counter 28 that is indicative of a next sequential instruction. On the other hand, if control flow module 34 determines that the instruction is a control flow instruction, control flow module 34 determines whether the control flow instruction is a jump instruction (46). The jump instruction may be alternatively referred to as an unconditional branch instruction. If control flow module 34 determines that the control flow instruction is a jump instruction, then control flow module 34 processes the jump instruction according to the techniques described in FIG. 4 (48). Otherwise, if control flow module 34 determines that the control flow instruction is a not a jump instruction, i.e., that the control flow instruction is a conditional branch instruction, then control flow module 34 processes the conditional branch instruction according to the techniques described in FIGS. 6 and 7 (50).

Figure 4:
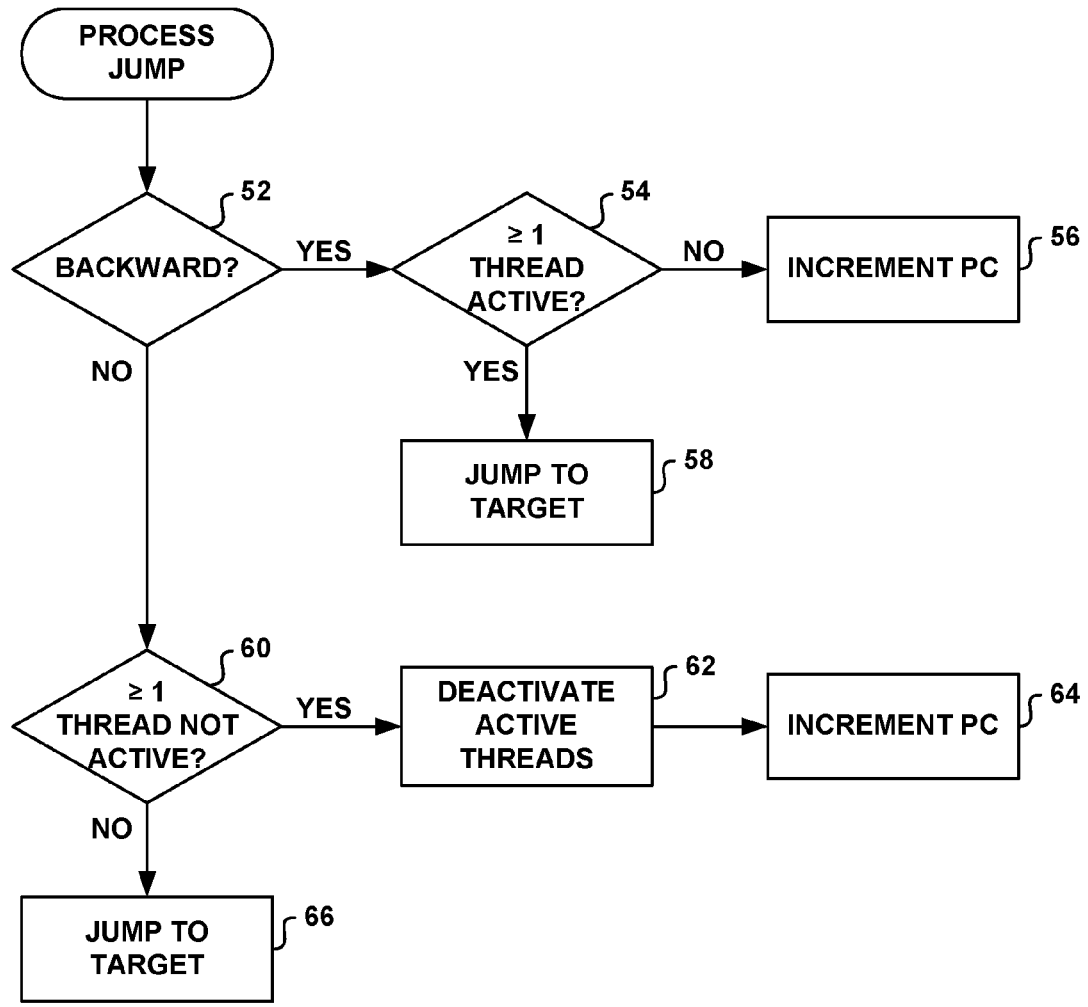

FIG. 4 is a flow diagram illustrating an example technique for processing a jump instruction in accordance with the resume counter techniques of this disclosure. Control flow module 34 determines whether the jump instruction is a backward jump instruction (52). In some examples, control flow module 34 may determine whether the jump instruction is a backward jump instruction by determining whether the target program counter value for the jump instruction is greater than the program counter value that identifies the jump instruction. In such examples, control flow module 34 may determine that the jump instruction is a backward jump instruction in response to determining that the target program counter value for the jump instruction is not greater than the program counter value that identifies the jump instruction. Similarly, control flow module 34 may determine that the jump instruction is a forward jump instruction in response to determining that the target program counter value for the jump instruction is greater than the program counter value that identifies the jump instruction.

In further examples, the target program counter value for the jump instruction may be relative to the program counter value that identifies the jump instruction. In such examples, control flow module 34 may determine whether the jump instruction is a backward jump instruction by determining whether the relative target program counter value for the jump instruction is less than zero. For example, control flow module 34 may determine that the jump instruction is a backward jump instruction in response to determining that the relative target program counter value is less than zero. Similarly, control flow module 34 may determine that the jump instruction is a forward jump instruction in response to determining that the relative target program counter value is greater than zero.

In additional examples, the forward jump and backward jump instructions may include separate operational codes, i.e., opcodes. In such examples, control flow module 34 may use the opcode to determine whether the target program counter value for the jump instruction is greater than the program counter value that identifies the jump instruction.

In any case, if control flow module 34 determines that the jump instruction is a backward jump instruction, then control flow module 34 determines whether at least one thread is active (54). If control flow module 34 determines that no threads are active, then control flow module 34 increments program counter 28 (56). For example, control flow module 34 may select a program counter value to load into program counter 28 that is indicative of a next sequential instruction. In this example, control flow module 34 may sequentially cycle through the program counter values until a lowest-valued resume counter is detected in order to ensure that divergent threads that are scheduled to process instructions at lower-valued addresses execute prior to threads that are scheduled to process instructions at higher-valued addresses. On the other hand, if control flow module 34 determines that at least one thread is active, then control flow module 34 jumps to the target instruction (58). For example, control flow module 34 may select a target program counter value indicative of a target instruction identified by the jump instruction to load into program counter 28.

If control flow module 34 determines that the jump instruction is not a backward jump instruction, i.e., that the jump instruction is a forward jump instruction, then control flow module 34 determines whether at least one thread is not active, i.e., at least one thread is inactive (60). If control flow module 34 determines that at least one thread is not active, then control flow module 34 deactivates all active threads (62). In some examples, control flow module 34 may use the technique illustrated in FIG. 5 to deactivate all of the active threads. In further examples, deactivating the active threads may include, for each thread being deactivated, deactivating and/or disabling a processing element 14 that is assigned to process instructions for the respective thread. Control flow module 34 increments program counter 28 (64). For example, control flow module 34 may select a program counter value to load into program counter 28 that is indicative of a next sequential instruction. In this example, control flow module 34 may sequentially cycle through the program counter values until either a lowest-valued resume counter is detected or the target program counter value is reached in order to ensure that divergent threads that are scheduled to process instructions at lower-valued addresses execute prior to threads that are scheduled to process instructions at higher-valued addresses. On the other hand, if control flow module 34 determines that no threads are inactive, i.e., all threads are active, then control flow module 34 jumps to the target instruction (66). For example, control flow module 34 may select a target program counter value indicative of a target instruction identified by the jump instruction to load into program counter 28.

Figure 5:
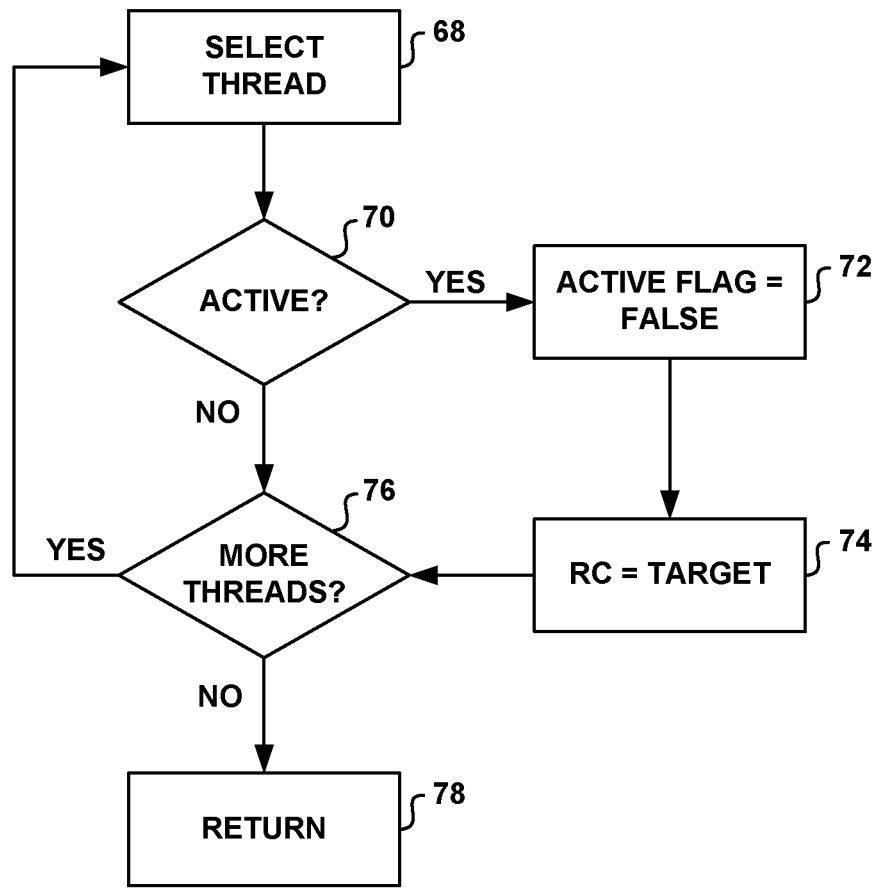

FIG. 5 is a flow diagram illustrating an example technique for deactivating all threads according to this disclosure. In some examples, the technique illustrated in FIG. 5 may be used to implement process box 62 illustrated in FIG. 4 or process box 110 illustrated in FIG. 7. Control flow module 34 selects a thread (68). Control flow module 34 determines whether the selected thread is active (70). If control flow module 34 determines that the selected thread is active, then control flow module 34 resets the active flag associated with the thread to a value of false (72), sets the resume counter associated with the thread to a target program counter value indicative of the target instruction identified by the jump or branch instruction (74), and proceeds to decision box 76. On the other hand, if control flow module 34 determines that the selected thread is not active, then control flow module 34 proceeds to decision box 76 without resetting the active flag for the thread and without setting the resume counter for the thread. In either case, control flow module 34 determines whether there are any more threads to process (76). If control flow module 34 determines that there are more threads to process, then control flow module 34 returns to process box 68 to process another thread. Otherwise, if control flow module 34 determines that there are not any more threads to process, then control flow module 34 ends the deactivation process and returns to the calling process, e.g., process box 64 in FIG. 4 or process box 112 in FIG. 7 (78). Although FIG. 5 illustrates an example technique that deactivates multiple threads by sequentially deactivating each of the threads, in other examples, the multiple threads may be deactivated partially or fully in parallel, e.g., by using a strobe or common control line.

Figure 6:
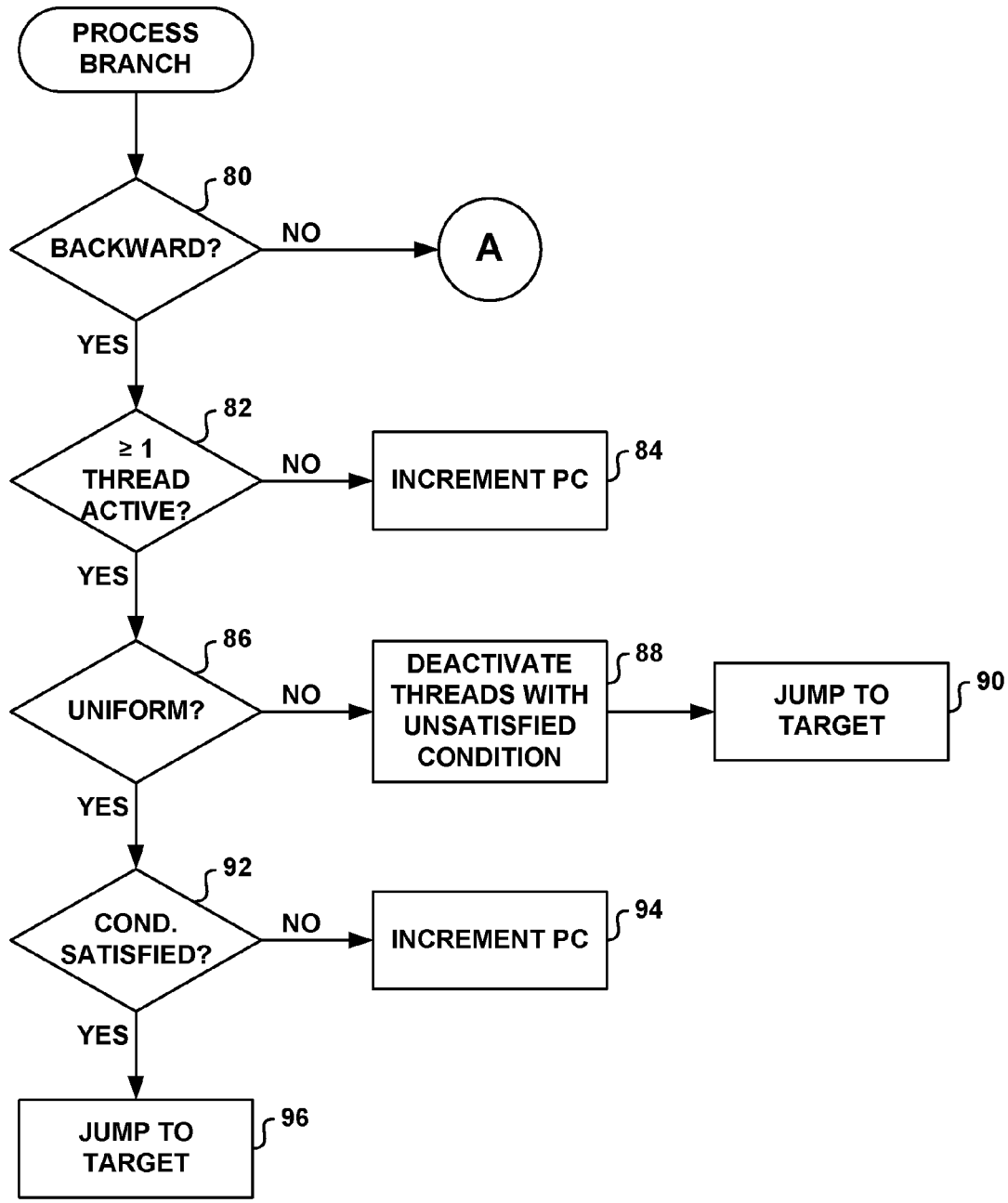
Figure 7:
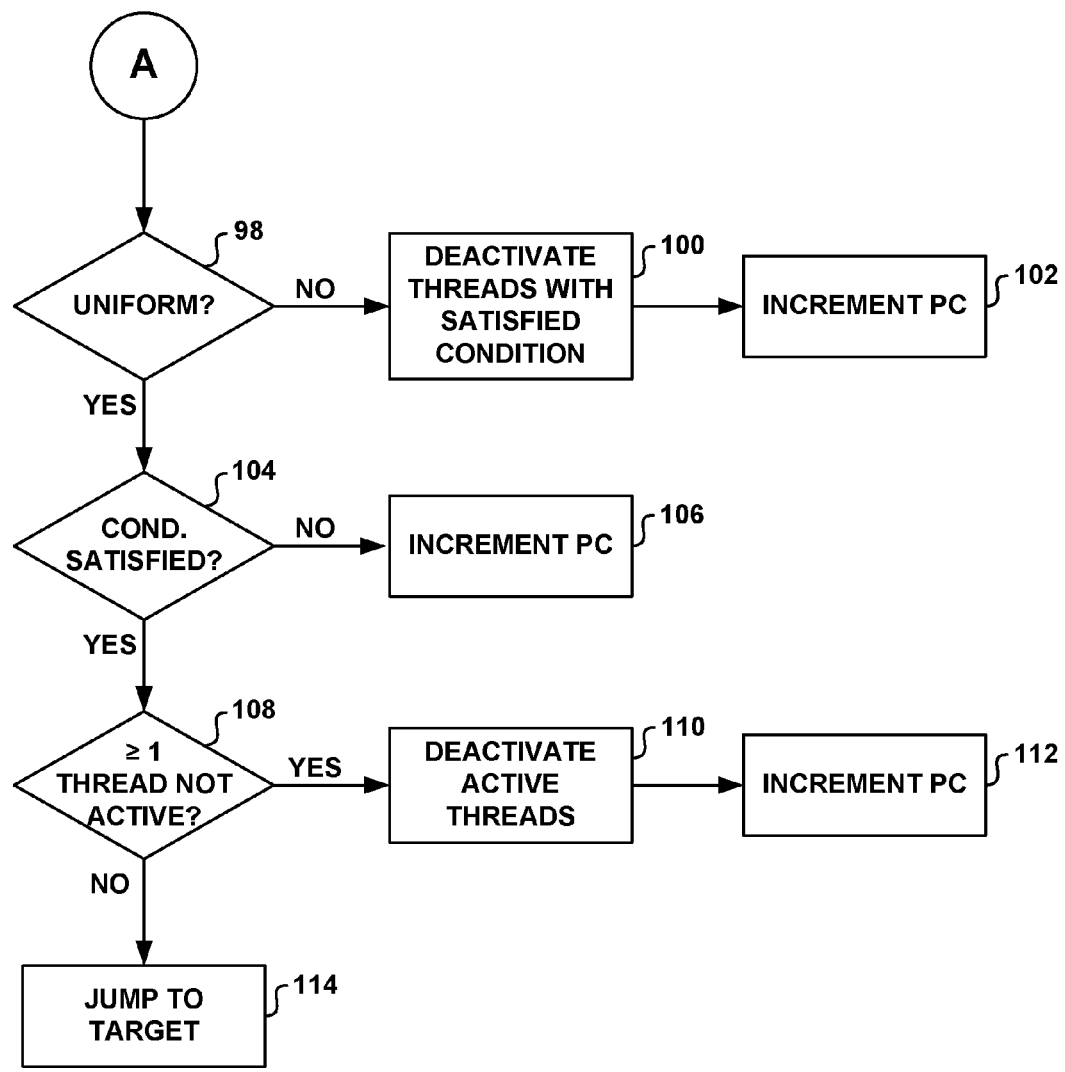

FIGS. 6 and 7 are flow diagrams illustrating an example technique for processing a branch instruction in accordance with the resume counter techniques of this disclosure. Control flow module 34 determines whether the branch instruction is a backward branch instruction (80). In some examples, control flow module 34 may determine whether the branch instruction is a backward branch instruction by determining whether the target program counter value for the branch instruction is greater than the program counter value that identifies the branch instruction. In such examples, control flow module 34 may determine that the branch instruction is a backward branch instruction in response to determining that the target program counter value for the branch instruction is not greater than the program counter value that identifies the branch instruction. Similarly, control flow module 34 may determine that the branch instruction is a forward branch instruction in response to determining that the target program counter value for the branch instruction is greater than the program counter value that identifies the branch instruction.

In further examples, the target program counter value for the branch instruction may be relative to the program counter value that identifies the branch instruction. In such examples, control flow module 34 may determine whether the branch instruction is a backward branch instruction by determining whether the relative target program counter value for the branch instruction is less than zero. For example, control flow module 34 may determine that the branch instruction is a backward branch instruction in response to determining that the relative target program counter value is less than zero. Similarly, control flow module 34 may determine that the branch instruction is a forward branch instruction in response to determining that the relative target program counter value is greater than zero.

In additional examples, the forward branch and backward branch instructions may include separate operational codes, i.e., opcodes. In such examples, control flow module 34 may use the opcode to determine whether the target program counter value for the branch instruction is greater than the program counter value that identifies the branch instruction.

In any case, if control flow module 34 determines that the branch instruction is a backward branch instruction, then control flow module 34 determines whether at least one thread is active (82). If control flow module 34 determines that no threads are active, then control flow module 34 increments program counter 28 (84). For example, control flow module 34 may select a program counter value to load into program counter 28 that is indicative of a next sequential instruction. In this example, control flow module 34 may sequentially cycle through the program counter values until a lowest-valued resume counter is detected in order to ensure that divergent threads that are scheduled to process instructions at lower-valued addresses execute prior to threads that are scheduled to process instructions at higher-valued addresses.

On the other hand, if control flow module 34 determines that at least one thread is active, then control flow module 34 determines whether the divergence condition is uniform, i.e., whether the branching condition is uniformly satisfied or uniformly unsatisfied (86). If control flow module 34 determines that the divergence condition is not uniform, i.e., divergent, then control flow module 34 may deactivate any active threads that do not satisfy the branch condition (88). In some examples, control flow module 34 may use the technique illustrated in FIG. 8 to deactivate the active threads that do not satisfy the branch condition. In further examples, deactivating the active threads that do not satisfy the branch condition may include, for each thread being deactivated, deactivating and/or disabling a processing element 14 that is assigned to process instructions for the respective thread. Control flow module 34 proceeds to jump to the target instruction (90). For example, control flow module 34 may select a target program counter value indicative of a target instruction identified by the branch instruction to load into program counter 28.

In this example, control flow module 34 deactivates threads that do not satisfy the branch condition in order to ensure that divergent threads that are scheduled to process instructions at lower-valued addresses execute prior to threads that are scheduled to process instructions at higher-valued addresses. More specifically, the active threads that do not satisfy the branch condition are scheduled to execute the next sequential instruction, and the program counter value for the next sequential instruction is greater than the target program counter value associated with the target instruction. Thus, in a backward branch instruction, the active threads that do not satisfy the branch condition are scheduled to execute prior to the threads that do not satisfy the branch condition.

Returning to decision box 86, if control flow module 34 determines that the divergence condition is uniform, then control flow module 34 determines whether the branching condition is satisfied (92). If control flow module 34 determines that the branching condition is not satisfied, control flow module 34 increments program counter 28 (94). For example, control flow module 34 may select a program counter value to load into program counter 28 that is indicative of a next sequential instruction. In this case, control flow module 34 increments program counter 28 because all active threads are scheduled to execute the next sequential instruction due to the uniformly unsatisfied branch condition. On the other hand, if control flow module 34 determines that the branching condition is satisfied, then control flow module 34 jumps to the target instruction (96). For example, control flow module 34 may select a target program counter value indicative of a target instruction identified by the branch instruction to load into program counter 28. In this case, control flow module 34 jumps to the target instruction because all active threads are scheduled to execute the target instruction due to the uniformly satisfied branch condition.

Returning to decision box 80, if control flow module 34 determines that the branch instruction is not a backward branch instruction, i.e., that the branch instruction is a forward branch instruction, then control flow module 34 proceeds to decision box 98 in FIG. 7 where control flow module 34 determines whether the divergence condition is uniform, i.e., whether the branching condition is uniformly satisfied or uniformly unsatisfied (98). If control flow module 34 determines that the divergence condition is not uniform, i.e., divergent, then control flow module 34 may deactivate any active threads that satisfy the branch condition (100). In some examples, control flow module 34 may use the technique illustrated in FIG. 9 to deactivate the active threads that satisfy the branch condition. In further examples, deactivating the active threads that satisfy the branch condition may include, for each thread being deactivated, deactivating and/or disabling a processing element 14 that is assigned to process instructions for the respective thread. Control flow module 34 increments program counter 28 (102).

In this example, control flow module 34 deactivates threads that satisfy the branch condition in order to ensure that divergent threads that are scheduled to process instructions at lower-valued addresses execute prior to threads that are scheduled to process instructions at higher-valued addresses. More specifically, the active threads that do not satisfy the branch condition are scheduled to execute the next sequential instruction, and the program counter value for the next sequential instruction is less than the target program counter value associated with the target instruction. Thus, in a forward branch instruction, the active threads that do not satisfy the branch condition are scheduled to execute prior to the threads that satisfy the branch condition.

Returning to decision box 98, if control flow module 34 determines that the divergence condition is uniform, then control flow module 34 determines whether the branching condition is satisfied (104). If control flow module 34 determines that the branching condition is not satisfied, then control flow module 34 increments program counter 28 (106). For example, control flow module 34 may select a program counter value to load into program counter 28 that is indicative of a next sequential instruction. In this case, control flow module 34 increments program counter 28 because all active threads are scheduled to execute the next sequential instruction due to the uniformly unsatisfied branch condition.

On the other hand, if control flow module 34 determines that the branching condition is satisfied, then control flow module 34 determines whether at least one thread is not active, i.e., inactive (108). If control flow module 34 determines that at least one thread is not active, then control flow module 34 deactivates all active threads (110). In some examples, control flow module 34 may use the technique illustrated in FIG. 5 to deactivate all of the active threads. In further examples, deactivating the active threads may include, for each thread being deactivated, deactivating and/or disabling a processing element 14 that is assigned to process instructions for the respective thread. Control flow module 34 increments program counter 28 (112). For example, control flow module 34 may select a program counter value to load into program counter 28 that is indicative of a next sequential instruction. In this example, control flow module 34 may sequentially cycle through the program counter values until either a lowest-valued resume counter is detected or the target program counter value is reached in order to ensure that divergent threads that are scheduled to process instructions at lower-valued addresses execute prior to threads that are scheduled to process instructions at higher-valued addresses. On the other hand, if control flow module 34 determines that no threads are inactive, i.e., all threads are active, then control flow module 34 jumps to the target instruction (114). For example, control flow module 34 may select a target program counter value indicative of a target instruction identified by the branch instruction to load into program counter 28.

Figure 8:
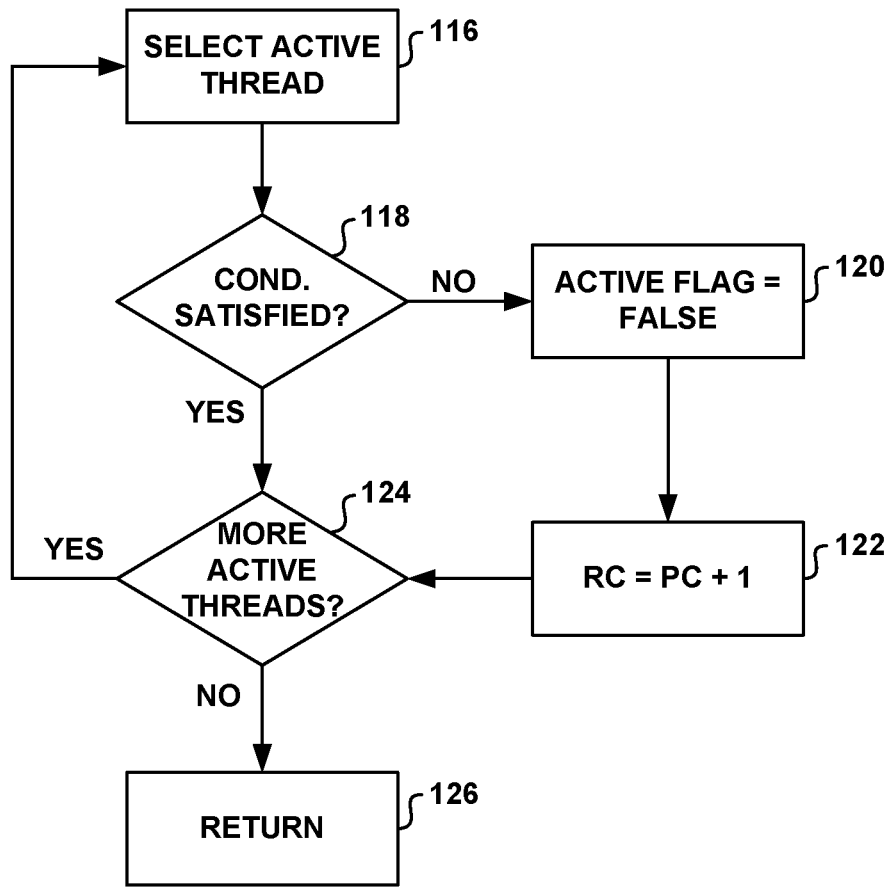

FIG. 8 is a flow diagram illustrating an example technique for deactivating active threads that do not satisfy a branch condition according to this disclosure. In some examples, the technique illustrated in FIG. 8 may be used to implement process box 88 illustrated in FIG. 6. Control flow module 34 selects an active thread (116). Control flow module 34 determines whether the branch condition is satisfied for the selected thread (118). If control flow module 34 determines that the branch condition is not satisfied for the selected thread, then control flow module 34 resets the active flag associated with the thread to a value of false (120), sets the resume counter associated with the thread to a program counter value indicative of the next sequential instruction, e.g., "PC+1" (122), and proceeds to decision box 124. In this case, the resume counter is set to a value indicative of the next sequential instruction because the branch condition was unsatisfied for the thread. On the other hand, if control flow module 34 determines that the branch condition is satisfied for the selected thread, then control flow module 34 proceeds to decision box 124 without resetting the active flag for the thread and without setting the resume counter for the thread. In either case, control flow module 34 determines whether there are any more active threads to process (124). If control flow module 34 determines that there are more active threads to process, then control flow module 34 returns to process box 116 to process another active thread. Otherwise, if control flow module 34 determines that there are not any more active threads to process, then control flow module 34 ends the deactivation process and returns to the calling process, e.g., process box 90 in FIG. 6 (126).

Figure 9:
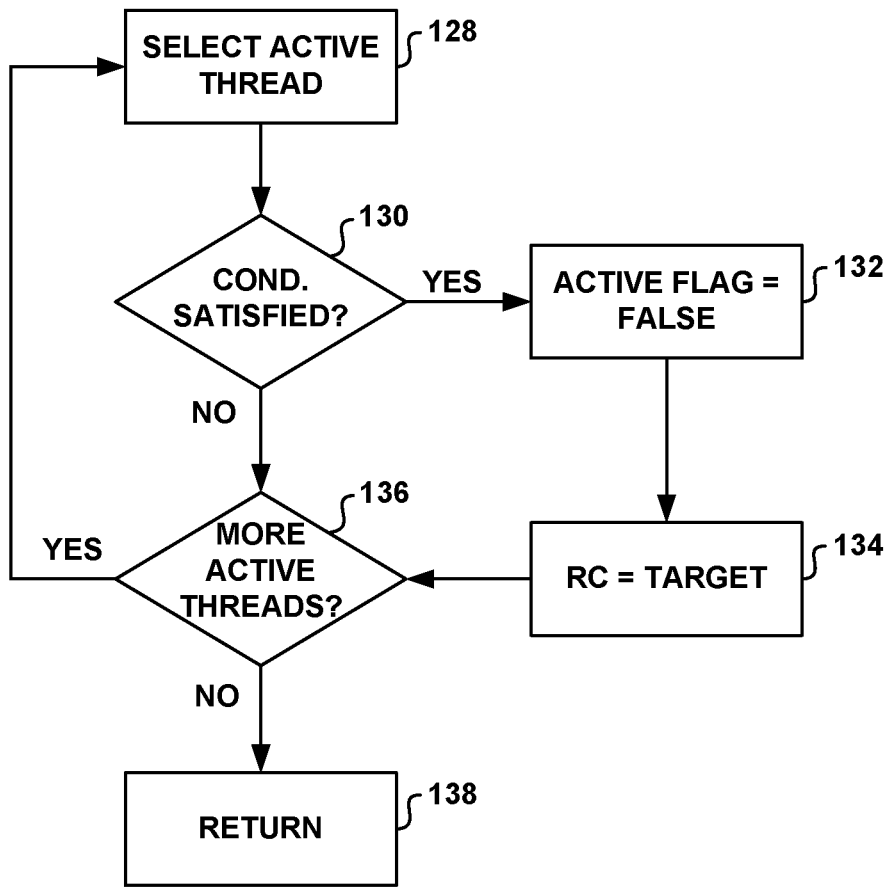

FIG. 9 is a flow diagram illustrating an example technique for deactivating active threads that satisfy a branch condition according to this disclosure. In some examples, the technique illustrated in FIG. 9 may be used to implement process box 100 illustrated in FIG. 7. Control flow module 34 selects an active thread (128). Control flow module 34 determines whether the branch condition is satisfied for the selected thread (130). If control flow module 34 determines that the branch condition is satisfied for the selected thread, then control flow module 34 resets the active flag associated with the thread to a value of false (132), sets the resume counter associated with the thread to a target program counter value indicative of the target instruction identified by the branch instruction (134), and proceeds to decision box 136. In this case, the resume counter is set to a value indicative of the target instruction because the branch condition was satisfied for the thread. On the other hand, if control flow module 34 determines that the branch condition is not satisfied for the selected thread, then control flow module 34 proceeds to decision box 136 without resetting the active flag for the thread and without setting the resume counter for the thread. In either case, control flow module 34 determines whether there are any more active threads to process (136). If control flow module 34 determines that there are more active threads to process, then control flow module 34 returns to process box 128 to process another active thread. Otherwise, if control flow module 34 determines that there are not any more active threads to process, then control flow module 34 ends the deactivation process and returns to the calling process, e.g., process box 102 in FIG. 7 (138).

Figure 10:
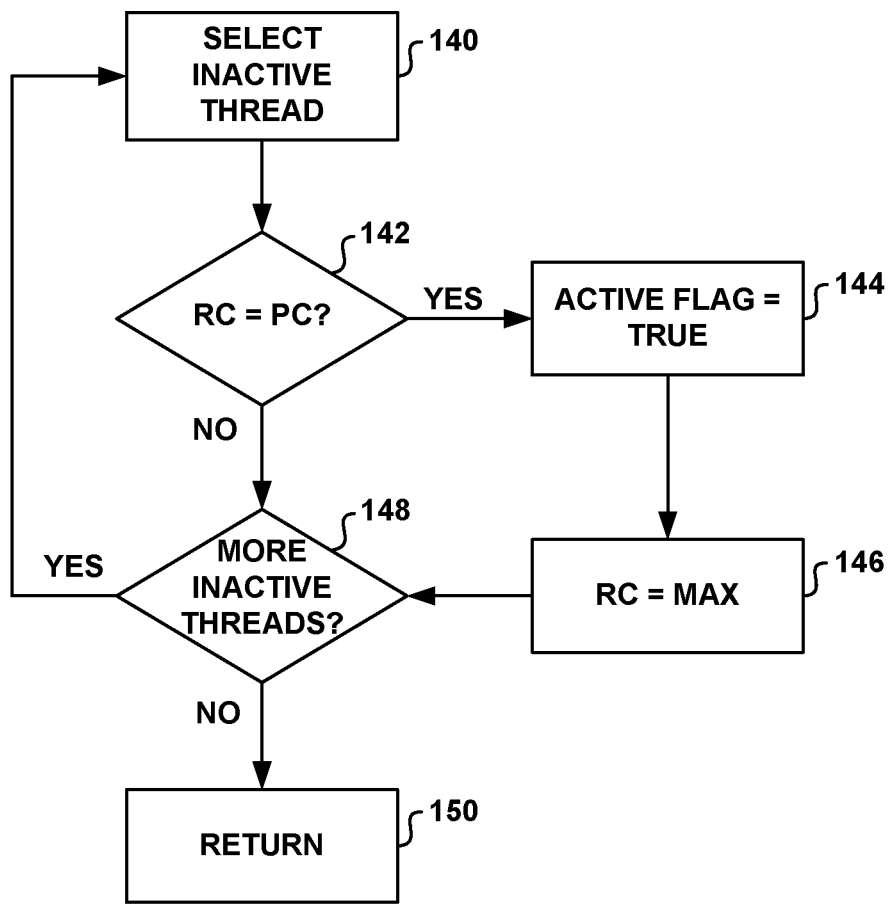

FIG. 10 is a flow diagram illustrating an example resume check technique for reactivating threads in accordance with the resume counter techniques of this disclosure. In some examples, the technique illustrated in FIG. 10 may be performed each time a new instruction is fetched by control unit 12. For example, the technique may be performed in response to loading the program counter with a new value and prior to issuing the instruction, if the instruction is issued, to any of processing elements 14. Control flow module 34 selects an inactive thread (140). Control flow module 34 determines whether the resume counter value for the inactive thread is equal to the program counter value (142). If control flow module 34 determines that the resume counter value for the inactive thread is equal to the program counter value, then control flow module 34 sets the active flag associated with the thread to a value of true (144), sets the resume counter associated with the thread to a maximum value (146), and proceeds to decision box 148. The maximum value, in some examples, may be a value that is the largest value that can be represented in the storage slot or register for the resume counter. On the other hand, if control flow module 34 determines that the resume counter value for the inactive thread is not equal to the program counter value, then control flow module 34 proceeds to decision box 148 without resetting the active flag for the thread and without setting the resume counter for the thread. In either case, control flow module 34 determines whether there are any more inactive threads to process (148). If control flow module 34 determines that there are more inactive threads to process, then control flow module 34 returns to process box 140 to process another inactive thread. Otherwise, if control flow module 34 determines that there are not any more inactive threads to process, then control flow module 34 ends the resume check process (150).

Figure 11:
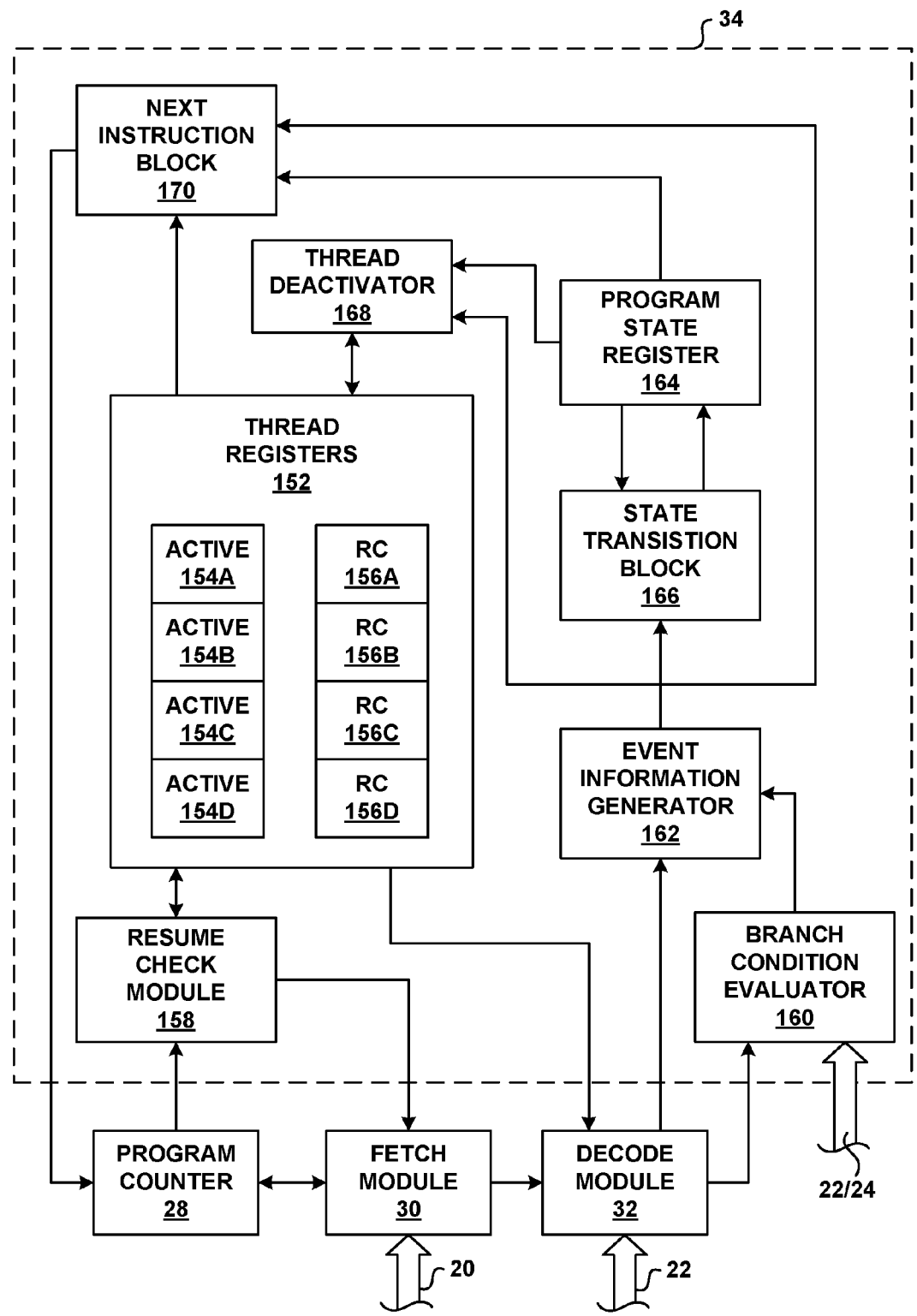
FIG. 11 is a block diagram illustrating an example flow control module that may be used to implement the resume counter divergent thread handling techniques of this disclosure.

FIG. 11 is a block diagram illustrating an example control flow module 34 that may be used to implement the resume counter divergent thread handling techniques of this disclosure. In some examples, the example control flow module 34 illustrated in FIG. 11 may be used to implement the techniques described above with respect to FIGS. 3-10. Control flow module 34 includes thread registers 152, active flags 154A-154D (collectively "active flags 154"), resume counters 156A-156D (collectively "resume counters 156"), a resume check module 158, a branch condition evaluator 160, an event information generator 162, a program state register 164, a state transition block 166, a thread deactivator 168 and a next instruction block 170.

Thread registers 152 are configured to store the thread state for each of the threads executing in processing system 10. As shown in FIG. 11, thread registers 152 include active flags 154 and resume counters 156. Each of active flags 154 stores an active flag indicative of whether the status of a thread corresponding to the respective active flag 154A-154D is active. Each of resume counters 156 stores a resume counter value for a respective thread. In some examples, each thread may be assigned to a respective one of processing elements 14. In such examples, each of active flags 154 and resume counters 156 may correspond to a respective one of processing elements 14. For example, active flag 154A and resume counter 156A may each correspond to processing element 14A illustrated in FIG. 1, and active flag 154B and resume counter 156B may each correspond to processing element 14B illustrated in FIG. 1. Although the example control flow module 34 illustrated in FIG. 11 illustrates a system having four active flags 154 and four resume counters 156, in other examples, control flow module 34 may have the same or different numbers of active flags 154 and resume counters 156.

Resume check module 158 is configured to perform a resume check in response to program counter 28 being loaded with a new program counter value and prior to issuing an instruction associated with the new program counter to processing elements 14 if the instruction is issued. In some examples, resume check module 158 may perform the resume check in accordance with the resume check techniques illustrated in FIG. 10. Resume check module 158 may receive the current program counter value from program counter 28 and the current active flags 154 and resume counter values 156 from thread registers 152 to perform the resume check technique. Resume check module 158 may also modify active flags 154 and resume counters 156 as part of the resume check technique. In addition, resume check module 158 may update program state register 164 based on the outcome of the resume check technique.

After completing the resume check technique, resume check module 158 may send a signal to fetch module 30 indicating that the resume check has completed. When fetch module 30 receives the signal that the resume check has completed, fetch module 30 may forward the fetched instruction to decode module 32 for further processing. In response to receiving the instruction, decode module 32 may check active flags 154 and update the active and inactive status of processing elements 14 based the current state of active flags 154, which may have been modified by the resume check. If the instruction is of a type that is issuable to processing elements 14, decode module 32 may issue the instruction to processing elements 14 in conjunction with or after updating the active and inactive status of processing elements 14. Although the example control flow module 34 illustrates resume check module 158 as signaling fetch module 30 upon completion of the resume check, in other examples, resume check module 158 may send the signal indicating that the resume check has completed to decode module 32. In such examples, when decode module 32 receives the signal, decode module 32 may check active flags 154 and update the active and inactive status of processing elements 14 based the current state of active flags 154.

When decode module 32 decodes instruction, if decode module 32 determines that the instruction is a branch instruction, i.e., a conditional branch instruction, then decode module 32 may send a signal to branch condition evaluator 160 indicating that the current instruction is a conditional branch instruction and provide information indicative of the branch condition to branch condition evaluator 160 for further processing. In some examples, if decode module 32 determines that the instruction is not a branch instruction, e.g., a jump instruction or a sequential instruction, then decode module 32 may send a signal to branch condition evaluator 160 indicating that the current instruction is not a conditional branch instruction.

Decode module 32 provides control information to event information generator 162 for further processing. In some examples, the control information may be the instruction itself. In further examples, the control information may include information, such as, e.g., information indicative of whether the instruction is a control flow instruction or a sequential instruction; if the instruction is a control flow instruction, information indicative of whether the instruction is a branch instruction or a jump instruction; and if the instruction is a branch or jump instruction, information indicative of whether the branch or jump instruction is a forward or backward branch or jump instruction, and if the instruction is a branch instruction, information specifying the branch condition.

If the currently processed instruction is a conditional branch instruction, branch condition evaluator 160 may evaluate the branch condition for each active thread. In some examples, branch condition evaluator 160 may receive the result of a comparison operation or a zero check operation from processing elements 14 via communication path 22. In further examples, branch condition evaluator 160 may access one or more registers in data store 18, via communication path 24, and perform a comparison operation or a zero check operation. In any case, branch condition evaluator 160 may determine whether the branch condition is satisfied or not satisfied for each active thread, and forward branch condition information indicative of whether the branch conditions are satisfied or not satisfied to event information generator 162. In some examples, branch condition evaluator 160 may determine whether the branching divergence for the current instruction is uniform or divergent and forward branching divergence information to event information generator 162.

Event information generator 162 receives control information from decode module 32 and, if the currently processed instruction is a branch instruction, branch condition information from branch condition evaluator 160. In some examples, event information generator 162 may also receive branching divergence information from branch condition evaluator 160 if the currently processed instruction is a branch instruction. If event information generator 162 does not receive branching divergence information from branch condition evaluator 160, then event information generator 162 may determine whether the branching divergence for the current instruction is uniform or divergent. In any case, event information generator 162 generates events based on the received information, and provides the events to state transition block 166, thread deactivator 168 and next instruction block 170.

In some examples, event information generator 162 may generate the following events:

Jb: Jump backward instruction
Jf: Jump forward instruction
BbuT: Branch backward instruction, all threads are uniform, condition is true
BbuF: Branch backward instruction, all threads are uniform, condition is false
BfuT: Branch forward instruction, all threads are uniform, condition is true
BfuF: Branch forward instruction, all threads are uniform, condition is false
Bbd: Branch backward instruction, threads are divergent
Bfd: Branch forward instruction, threads are divergent
S: Sequential instruction According to the above-identified events, an instruction may be a sequential instruction (S), a jump instruction (J), or a branch instruction (B). For jump or branch instructions, the jump or branch direction may be either backward (b) or forward (f). For branch instructions, the branching divergence may be either uniform (u) or divergent (d). For branch instructions, the branching condition may be either true (T) or false (F). A true branch condition may correspond to a satisfied branch condition, and a false branch condition may correspond to an unsatisfied branch condition.

Program state register 164 may store a program state for the program executing in processing system 10. In some examples, program state register 164 may store the following three states:

State 0: All threads are active.
State 1: At least one thread is active and at least one thread is inactive.
State 2: All threads are inactive.

State transition block 166 may receive an event from event information generator 162 and a current program state from program state register 164, generate a new program state based on the received event and the current program state, and store the new program state in program state register 164. State transition block 166 may generate the new program state in accordance with the state transition diagram described in further detail with respect to FIG. 12 and/or in accordance with the state transition table described in further detail with respect to FIG. 13.

Thread deactivator 168 may receive an event from event information generator 162 and a current program state from program state register 164, determine whether to deactivate one or more threads based on the event and the current program state, and deactivate one or more threads in response to certain combinations of events and current program states. When deactivating threads, thread deactivator 168 may update active flags 154 and resume counters 156 for the threads being deactivated. Thread deactivator 168 may deactivate threads in accordance with the state transition table described in further detail with respect to FIG. 13.

Next instruction block 170 may receive an event from event information generator 162 and a current program state from program state register 164, determine a new program counter value to load into program counter 28, and load the new program counter value into program counter 28. The new program counter value may be indicative of a next instruction to be processed by control unit 12. Next instruction block 170 may determine the new program counter value in accordance with the state transition table described in further detail with respect to FIG. 13.

As discussed above, resume check module 158 may update program state register 164 based on the outcome of the resume check. This update may be performed by resume check module 158 in an asynchronous manner. For example, if the program state was State 1 prior to performing the resume check, and all inactive threads are reactivated, program state register 164 may change program state register 164 to State 0 in an asynchronous manner to reflect that all threads are activated. It should be noted that state transition block 166 generates the new program state based on the current program state that is available after any updating by resume check module 158. Similarly, thread deactivator 168 determines whether to deactivate one or more threads based on the current program state that is available after any updating by resume check module 158, and next instruction block 170 determines a new program counter value based on the current program state that is available after any updating by resume check module 158. As such, although the program state may change between two different states during a single processing cycle due to the resume check, the final state for the processing cycle, i.e., the state that occurs after the resume check is complete, is used as the current program state for processing by each of state transition block 166, thread deactivator 168 and next instruction block 170.

Figure 12:
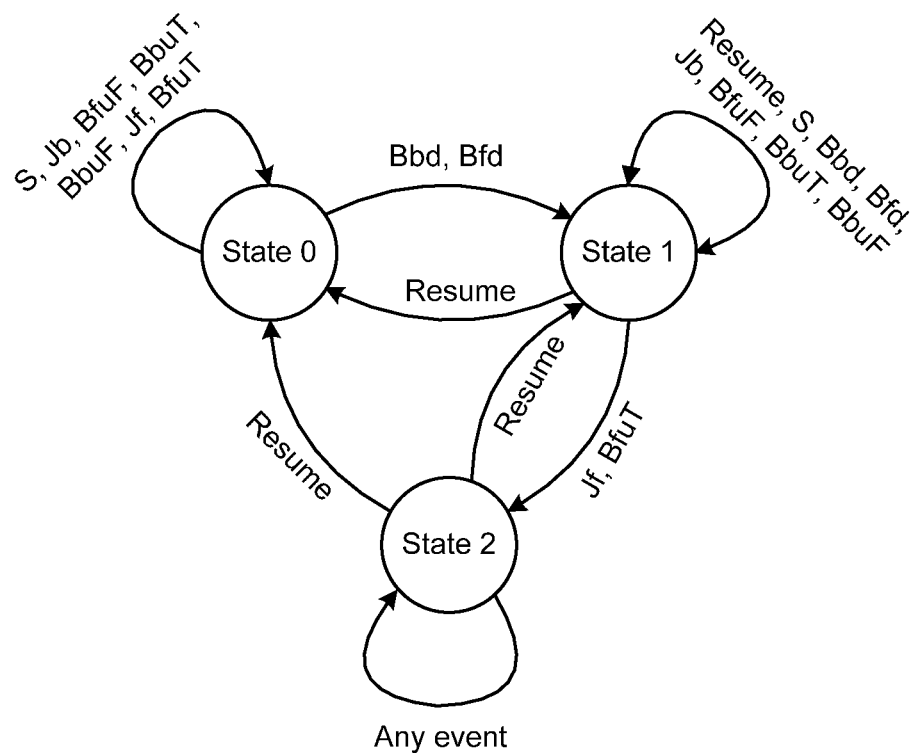
FIG. 12 is a state transition diagram that characterizes exemplary operation of the flow control module illustrated in FIG. 11 according to this disclosure.

FIG. 12 is a state transition diagram that characterizes exemplary operation of control flow module 34 illustrated in FIG. 11 according to this disclosure. The arrows shown in FIG. 12 represent transitions between the different states identified by the circles. The arrows are associated with one or both of events generated by event information generator 162 and a resume event. A resume event may be an asynchronous state transition that occurs as the result of a resume check where one or more threads are reactivated. The state transitions associated with the remaining events generated by event information generator 162 may be synchronous state transitions. A synchronous state transition may occur between processing cycles, and an asynchronous state transition may occur during the processing cycle. If an asynchronous state transition occurs during a processing cycle due to the resume check, then the state that occurs after the asynchronous transition is used to determine the next state for the next processing cycle.

FIG. 13 is a state transition table that characterizes exemplary operation of control flow module 34 illustrated in FIG. 11 according to this disclosure. The state transition table in FIG. 13 includes an "OLD STATE" column, which represents the current program state, and a "NEW STATE" column, which represents either a new program state for a next processing cycle or a program state that occurs after an asynchronous transition due to a resume check. The state transition table also includes an "EVENT" column, which includes events generated by event information generator 162. The indicator "n/a" in the "EVENT" column signifies that the state transition and action occurs due to a resume check and that the event is irrelevant for such a transition. The state transition table also includes an "ACTION" column that indicates what action takes place in response to a particular combination of a current program state and event. The action labeled "Resume" in the "ACTION" column signifies that an asynchronous state transition occurs due to a resume check.

As shown in FIGS. 12 and 13, state transition block 166 selects State 0 as the new state to load into program state register 164 in response to the current state being State 0 and receiving an S event, a Jf event, a Jb event, a BfuT event, a BfuF event, a BbuT event, or a BbuF event. State transition block 166 selects State 1 as the new state to load into program state register 164 in response to the current state being State 0 and receiving a Bbd event or a Bfd event. State transition block 166 also selects State 1 as the new state to load into program state register 164 in response to the current state being State 1 and receiving an S event, a Jb event, a BbuF event, a BbuT event, a BfuF event, a Bbd event or a Bfd event. State transition block 166 selects State 2 as the new state to load into program state register 164 in response to the current state being State 1 and receiving a Jf event or a BfuT event. State transition block 166 also selects State 2 as the new state to load into program state register 164 in response to the current state being State 2 and receiving any event. In response to reactivating one or more threads as part of a resume check, state transition block 166 may transition into State 0 or State 1 in an asynchronous manner.

As shown in FIG. 13, thread deactivator 168 may determine to deactivate one or more threads in response to the current state being either State 0 or State 1 and receiving a Bbd event or a Bfd event. The Bbd event and Bfd events may be referred to as divergence events resulting from the evaluation of a branch condition for a branch instruction. Thread deactivator 168 may determine to deactivate all active threads that do not satisfy the branch condition, i.e., false condition, in response to receiving a Bbd event, and to deactivate all active threads that satisfy the branch condition, i.e., true condition, in response to receiving a Bfd event. Thread deactivator 168 may utilize the technique illustrated in FIG. 8 to deactivate all active threads that do not satisfy the branch condition, and the technique illustrated in FIG. 9 to deactivate all active threads that satisfy the branch condition. Thread deactivator 168 may determine to deactivate all active threads in response to the current state being State 1 and receiving a Jf event or a BfuT event. Thread deactivator 168 may utilize the technique illustrated in FIG. 5 to deactivate all active threads.

As shown in FIG. 13, next instruction block 170 may select one of a program counter value indicative of the next sequential instruction, i.e., "PC+1", or a program counter value indicative of a target instruction, i.e., a target program counter value, to load into program counter 28 in response to various combinations of current program state and events. For example, next instruction block 170 may select a program counter value indicative of the next sequential instruction, i.e., "PC+1", to load into program counter 28 in response to the current state being State 0 and receiving an S event, a BfuF event, a BbuF event, or a Bfd event. Next instruction block 170 may also select a program counter value indicative of the next sequential instruction to load into program counter 28 in response to the current state being State 1 and receiving an S event, a BbuF event, a BfuF event, a Bfd event, a Jf event, or a BfuT event. Next instruction block 170 may also select a program counter value indicative of the next sequential instruction to load into program counter 28 in response to the current state being State 2 and receiving any event. Next instruction block 170 may select a program counter value indicative of a target instruction, i.e., a target program counter value, to load into program counter 28 in response to the current state being State 0 and receiving a Jf event, a Jb event, a BfuT event, a BbuT event, or a Bbd event. Next instruction block 170 may also select a program counter value indicative of a target instruction to load into program counter 28 in response to the current state being State 1 and receiving a Jb event, a BbuT event, or a Bbd event.

FIGS. 14-21 are flow diagrams illustrating an example minimum resume counter technique for handling divergent threads in the processing system of FIG. 1 according to this disclosure. In some examples, processing system 10 of FIGS. 1 and 2 may be used to implement the example techniques shown in FIGS. 14-21. For ease of explanation, the techniques will be described with respect to components of example processing system 10 shown in FIGS. 1 and 2, but it should be understood that the techniques may be performed on other systems with the same or different components in the same or a different configuration.

Figure 14:
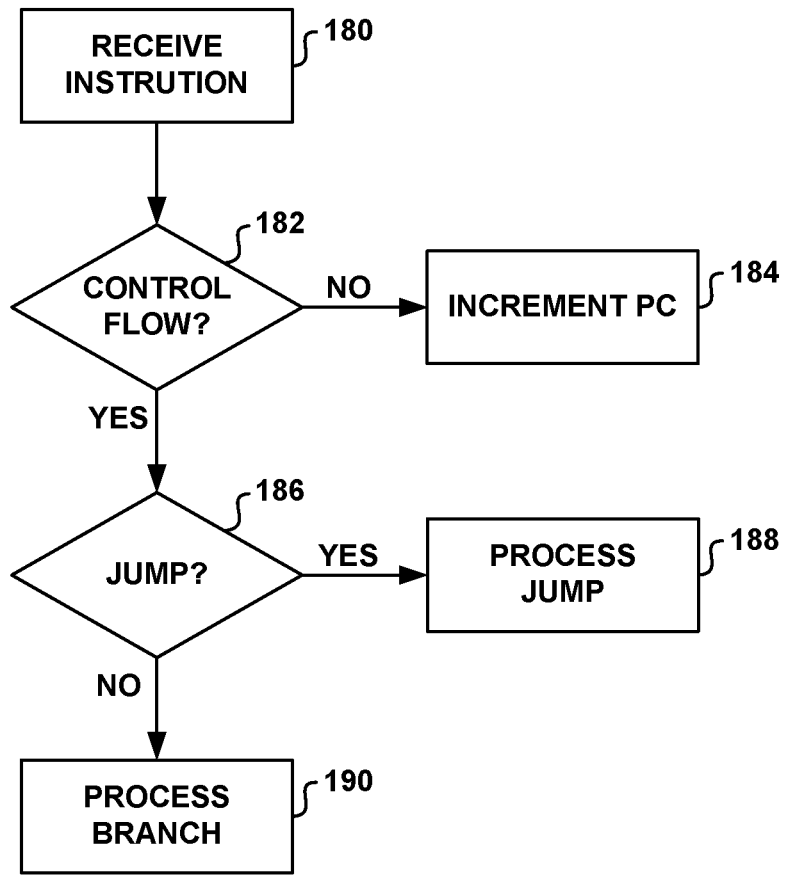
FIGS. 14-21 are flow diagrams illustrating an example minimum resume counter technique for handling divergent threads in the processing system of FIG. 1 according to this disclosure.

FIG. 14 is a flow diagram illustrating an example technique for determining a program counter value to load into program counter 28 according to this disclosure. Control flow module 34 receives an instruction and/or control information associated with an instruction (180). Control flow module 34 determines whether the instruction is a control flow instruction (182). If control flow module 34 determines that the instruction is not a control flow instruction, control flow module 34 increments program counter 28 (184). For example, control flow module 34 may select a program counter value to load into program counter 28 that is indicative of a next sequential instruction. On the other hand, if control flow module 34 determines that the instruction is a control flow instruction, control flow module 34 determines whether the control flow instruction is a jump instruction (186). The jump instruction may be alternatively referred to as an unconditional branch instruction. If control flow module 34 determines that the control flow instruction is a jump instruction, then control flow module 34 processes the jump instruction according to the techniques described in FIG. 15 (188). Otherwise, if control flow module 34 determines that the control flow instruction is a not a jump instruction, i.e., that the control flow instruction is a conditional branch instruction, then control flow module 34 processes the conditional branch instruction according to the techniques described in FIGS. 17 and 18 (190).

Figure 15:
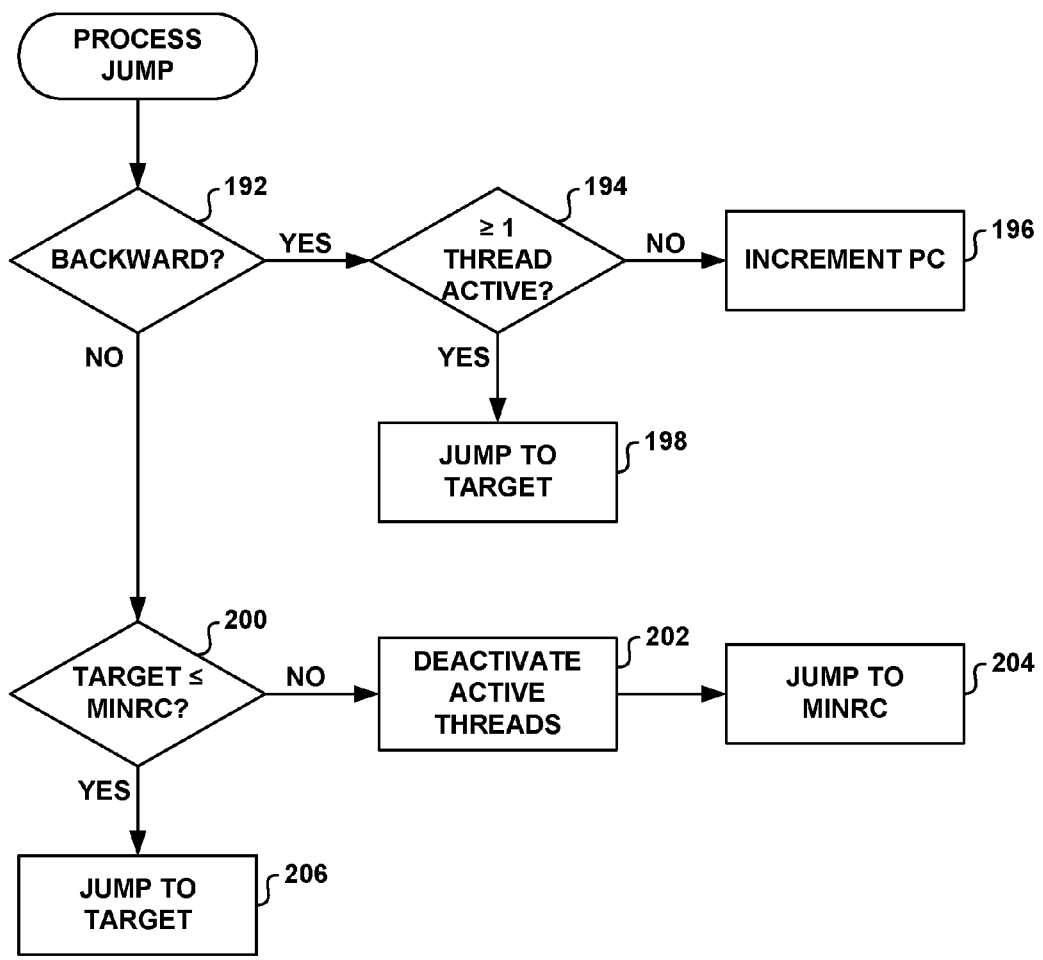

FIG. 15 is a flow diagram illustrating an example technique for processing a jump instruction in accordance with the minimum resume counter techniques of this disclosure. Control flow module 34 determines whether the jump instruction is a backward jump instruction (192). The manner in which control flow module 34 may determine whether the jump instruction is a backward jump instruction may be substantially the same as that which was described above with respect to FIG. 4, and in the interest of brevity, will not be described in further detail. If control flow module 34 determines that the jump instruction is a backward jump instruction, then control flow module 34 determines whether at least one thread is active (194). If control flow module 34 determines that no threads are active, then control flow module 34 increments program counter 28 (196). For example, control flow module 34 may select a program counter value to load into program counter 28 that is indicative of a next sequential instruction. On the other hand, if control flow module 34 determines that at least one thread is active, then control flow module 34 jumps to the target instruction (198). For example, control flow module 34 may select a target program counter value indicative of a target instruction identified by the jump instruction to load into program counter 28.

If control flow module 34 determines that the jump instruction is not a backward jump instruction, i.e., that the jump instruction is a forward jump instruction, then control flow module 34 determines whether target program counter value is less than or equal to the minimum resume counter value (200). If control flow module 34 determines that that the target program counter value is not less than or equal to the minimum resume counter value, then control flow module 34 deactivates all active threads (202). In some examples, control flow module 34 may use the technique illustrated in FIG. 16 to deactivate all of the active threads. In further examples, deactivating the active threads may include, for each thread being deactivated, deactivating and/or disabling a processing element 14 that is assigned to process instructions for the respective thread. Control flow module 34 proceeds to jump to the instruction identified by the minimum resume counter value (204). For example, control flow module 34 may select the minimum resume counter value as a value to load into program counter 28 in response to determining that the target program counter value is not less than or equal to the minimum resume counter value. On the other hand, if control flow module 34 determines that the target program counter value is less than or equal to the minimum resume counter value, then control flow module 34 jumps to the target instruction (206). For example, control flow module 34 may select a target program counter value indicative of a target instruction identified by the jump instruction as a value to load into program counter 28 in response to determining that the target program counter value is less than or equal to the minimum resume counter value.

In this example, control flow module 34 selects the minimum resume counter value to load into program counter 28 when the minimum resume counter is less than the target program counter value in order to ensure that divergent threads that are scheduled to process instructions at lower-valued addresses execute prior to threads that are scheduled to process instructions at higher-valued addresses. In contrast, the resume counter techniques illustrated in FIG. 4 sequentially cycle through the program counter values, in such a situation, until the first of a resume counter value for an inactive thread is reached or the target program counter value is reached. While control flow module 34 is sequentially cycling through program counter values, the processing cycles may essentially be idle cycles. In other words, processing system 10 may not be processing any program instructions during that time period, which can decrease the throughput of processing system 10. The minimum resume counter techniques described in FIG. 15, however, allow processing system 10 to jump directly to either the target program counter value or the minimum resume counter value to begin processing a new instruction in the next processing cycle while still ensuring that divergent threads that are scheduled to process instructions at lower-valued addresses execute prior to threads that are scheduled to process instructions at higher-valued addresses. In this manner, the minimum resume counter techniques may increase system throughput in the case where a forward jump instruction is executed when one or more threads are deactivated.

Figure 16:
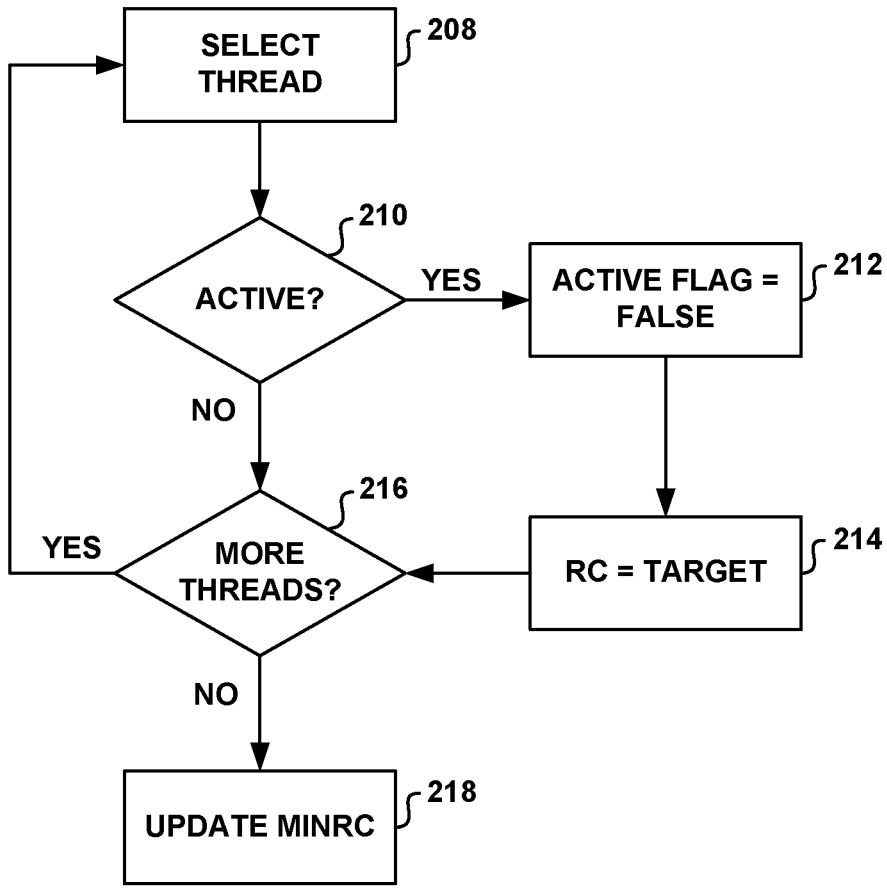

FIG. 16 is a flow diagram illustrating an example technique for deactivating all threads according to this disclosure. In some examples, the technique illustrated in FIG. 16 may be used to implement process box 202 illustrated in FIG. 15 or process box 250 illustrated in FIG. 18. Control flow module 34 selects a thread (208). Control flow module 34 determines whether the selected thread is active (210). If control flow module 34 determines that the selected thread is active, then control flow module 34 resets the active flag associated with the thread to a value of false (212), sets the resume counter associated with the thread to a target program counter value indicative of the target instruction identified by the jump or branch instruction (214), and proceeds to decision box 216. In this example, the target program counter value is indicative of a program counter value at which the respective thread should be reactivated. On the other hand, if control flow module 34 determines that the selected thread is not active, then control flow module 34 proceeds to decision box 216 without resetting the active flag for the thread and without setting the resume counter for the thread. In either case, control flow module 34 determines whether there are any more threads to process (216). If control flow module 34 determines that there are more threads to process, then control flow module 34 returns to process box 208 to process another thread. Otherwise, if control flow module 34 determines that there are not any more active threads to process, then control flow module 34 updates the minimum resume counter (MINRC) (218). For example, control flow module 34 may determine a smallest resume counter value from the set of resume counter values associated with the threads, and set the minimum resume counter value to a value indicative of the smallest resume counter value. As another example, control flow module 34 may determine a smallest resume counter value from the set of resume counter values associated with the inactive threads executing in processing system 10, and set the minimum resume counter value to a value indicative of the smallest resume counter value. After updating the minimum resume counter value, control flow module 34 ends the deactivation process and returns to the calling process, e.g., process box 204 in FIG. 15 or process box 252 in FIG. 18. Although FIG. 16 illustrates an example technique that deactivates multiple threads by sequentially deactivating each of the threads, in other examples, the multiple threads may be deactivated partially or fully in parallel, e.g., by using a strobe or common control line.

Figure 17:
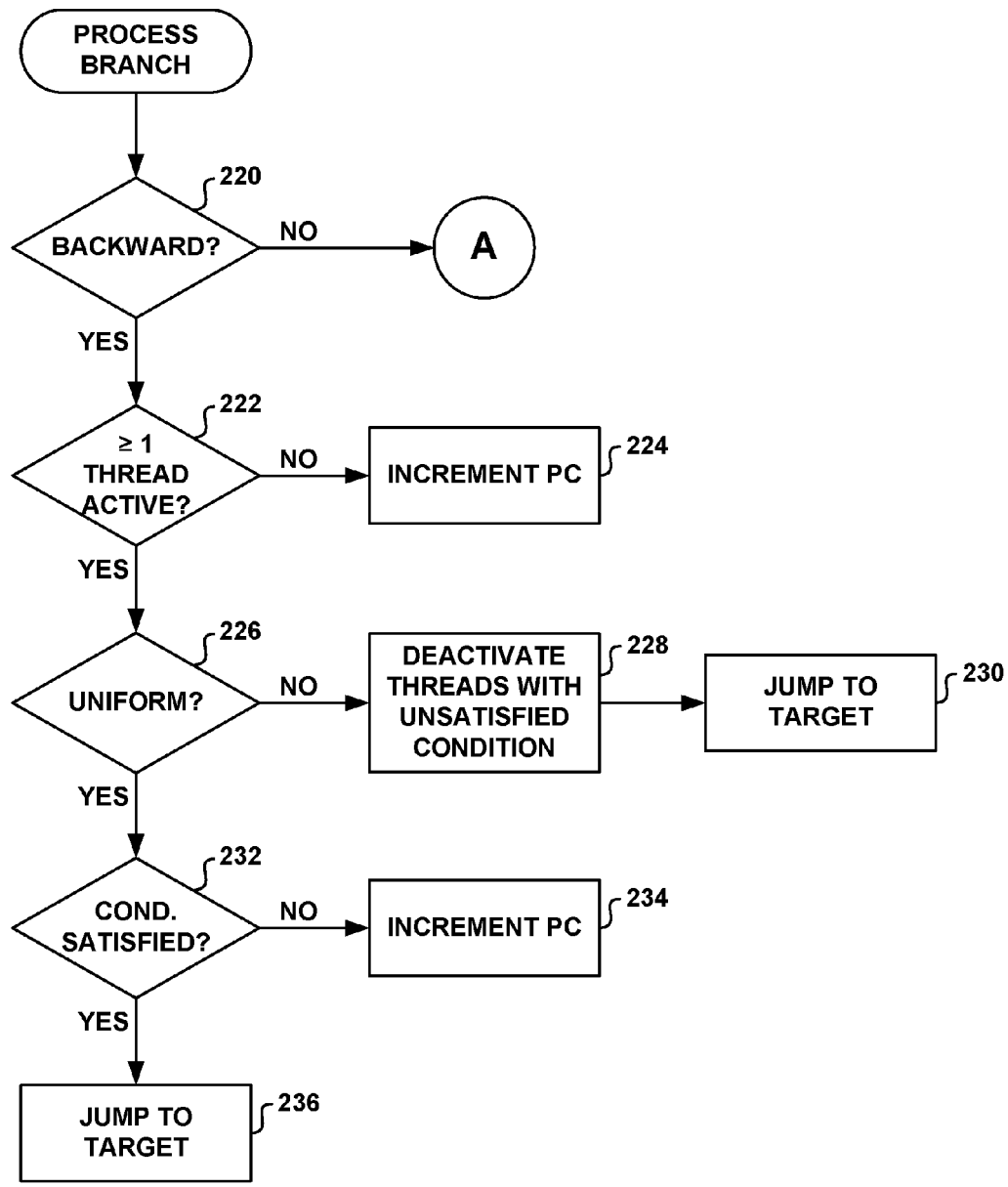
Figure 18:
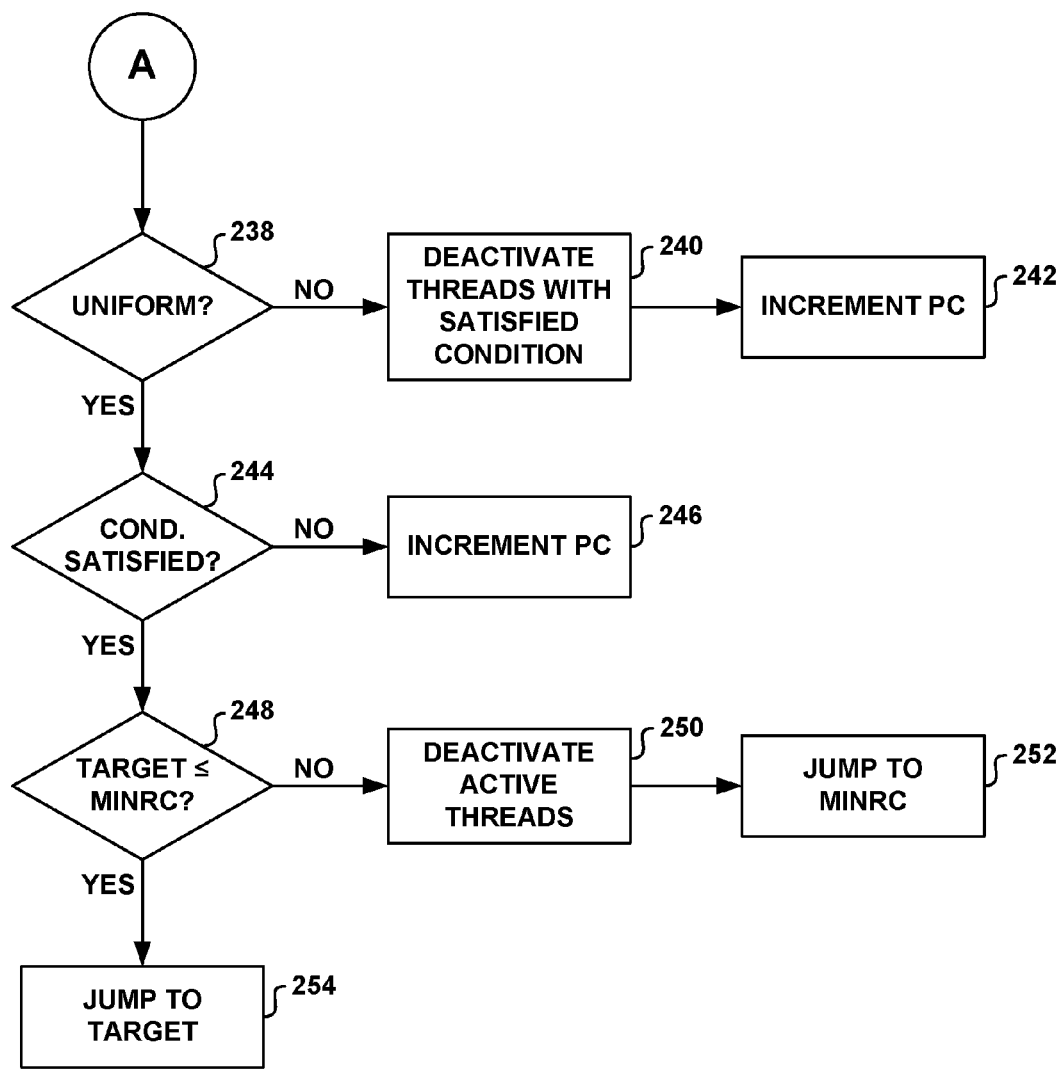

FIGS. 17 and 18 are flow diagrams illustrating an example technique for processing a branch instruction in accordance with the minimum resume counter techniques of this disclosure. Control flow module 34 determines whether the branch instruction is a backward branch instruction (220). The manner in which control flow module 34 may determine whether the branch instruction is a backward branch instruction may be substantially the same as that which was described above with respect to FIG. 6, and in the interest of brevity, will not be described in further detail. If control flow module 34 determines that the branch instruction is a backward branch instruction, then control flow module 34 determines whether at least one thread is active (222). If control flow module 34 determines that no threads are active, then control flow module 34 increments program counter 28 (224). For example, control flow module 34 may select a program counter value to load into program counter 28 that is indicative of a next sequential instruction.

On the other hand, if control flow module 34 determines that at least one thread is active, then control flow module 34 determines whether the divergence condition is uniform, i.e., whether the branching condition is uniformly satisfied or uniformly unsatisfied (226). If control flow module 34 determines that the divergence condition is not uniform, i.e., divergent, then control flow module 34 may deactivate any active threads that do not satisfy the branch condition (228). In some examples, control flow module 34 may use the technique illustrated in FIG. 19 to deactivate the active threads that do not satisfy the branch condition. In further examples, deactivating the active threads that do not satisfy the branch condition may include, for each thread being deactivated, deactivating and/or disabling a processing element 14 that is assigned to process instructions for the respective thread. Control flow module 34 proceeds to jump to the target instruction (230). For example, control flow module 34 may select a target program counter value indicative of a target instruction identified by the branch instruction to load into program counter 28.

In this example, control flow module 34 deactivates threads that do not satisfy the branch condition in order to ensure that divergent threads that are scheduled to process instructions at lower-valued addresses execute prior to threads that are scheduled to process instructions at higher-valued addresses. More specifically, the active threads that do not satisfy the branch condition are scheduled to execute the next sequential instruction, and the program counter value for the next sequential instruction is greater than the target program counter value associated with the target instruction. Thus, in a backward branch instruction, the active threads that do satisfy the branch condition are scheduled to execute prior to the threads that do not satisfy the branch condition.

Returning to decision box 226, if control flow module 34 determines that the divergence condition is uniform, then control flow module 34 determines whether the branching condition is satisfied (232). If control flow module 34 determines that the branching condition is not satisfied, control flow module 34 increments program counter 28 (234). For example, control flow module 34 may select a program counter value to load into program counter 28 that is indicative of a next sequential instruction. In this case, control flow module 34 increments program counter 28 because all active threads are scheduled to execute the next sequential instruction due to the uniformly unsatisfied branch condition. On the other hand, if control flow module 34 determines that the branching condition is satisfied, then control flow module 34 jumps to the target instruction (236). For example, control flow module 34 may select a target program counter value indicative of a target instruction identified by the branch instruction to load into program counter 28. In this case, control flow module 34 jumps to the target instruction because all active threads are scheduled to execute the target instruction due to the uniformly satisfied branch condition.

Returning to decision box 220, if control flow module 34 determines that the branch instruction is not a backward branch instruction, i.e., that the branch instruction is a forward branch instruction, then control flow module 34 proceeds to decision box 238 in FIG. 18 where control flow module 34 determines whether the divergence condition is uniform, i.e., whether the branching condition is uniformly satisfied or uniformly unsatisfied (238). If control flow module 34 determines that the divergence condition is not uniform, i.e., divergent, then control flow module 34 may deactivate any active threads that satisfy the branch condition (240). In some examples, control flow module 34 may use the technique illustrated in FIG. 20 to deactivate the active threads that satisfy the branch condition. In further examples, deactivating the active threads that satisfy the branch condition may include, for each thread being deactivated, deactivating and/or disabling a processing element 14 that is assigned to process instructions for the respective thread. Control flow module 34 increments program counter 28 (242).

In this example, control flow module 34 deactivates threads that satisfy the branch condition in order to ensure that divergent threads that are scheduled to process instructions at lower-valued addresses execute prior to threads that are scheduled to process instructions at higher-valued addresses. More specifically, the active threads that do not satisfy the branch condition are scheduled to execute the next sequential instruction, and the program counter value for the next sequential instruction is less than the target program counter value associated with the target instruction. Thus, in a forward branch instruction, the active threads that do not satisfy the branch condition are scheduled to execute prior to the threads that satisfy the branch condition.

Returning to decision box 238, if control flow module 34 determines that the divergence condition is uniform, then control flow module 34 determines whether the branching condition is satisfied (244). If control flow module 34 determines that the branching condition is not satisfied, then control flow module 34 increments program counter 28 (246). For example, control flow module 34 may select a program counter value to load into program counter 28 that is indicative of a next sequential instruction. In this case, control flow module 34 increments program counter 28 because all active threads are scheduled to execute the next sequential instruction due to the uniformly unsatisfied branch condition.

On the other hand, if control flow module 34 determines that the branching condition is satisfied, then control flow module 34 determines whether target program counter value is less than or equal to the minimum resume counter value (248). If control flow module 34 determines that that the target program counter value is not less than or equal to the minimum resume counter value, then control flow module 34 deactivates all active threads (250). In some examples, control flow module 34 may use the technique illustrated in FIG. 16 to deactivate all of the active threads. In further examples, deactivating the active threads may include, for each thread being deactivated, deactivating and/or disabling a processing element 14 that is assigned to process instructions for the respective thread. Control flow module 34 proceeds to jump to the instruction identified by the minimum resume counter value (252). For example, control flow module 34 may select the minimum resume counter value as a value to load into program counter 28 in response to determining that the target program counter value is not less than or equal to the minimum resume counter value. On the other hand, if control flow module 34 determines that the target program counter value is less than or equal to the minimum resume counter value, then control flow module 34 jumps to the target instruction (254). For example, control flow module 34 may select a target program counter value indicative of a target instruction identified by the branch instruction as a value to load into program counter 28 in response to determining that the target program counter value is less than or equal to the minimum resume counter value.

In this example, control flow module 34 selects the minimum resume counter value to load into program counter 28 when the minimum resume counter is less than the target program counter value in order to ensure that divergent threads that are scheduled to process instructions at lower-valued addresses execute prior to threads that are scheduled to process instructions at higher-valued addresses. In contrast, the resume counter techniques illustrated in FIG. 7 sequentially cycle through the program counter values until the first of a resume counter value for an inactive thread is reached or the target program counter value is reached. While control flow module 34 is sequentially cycling through program counter values, the processing cycles may be essentially be idle cycles. In other words, processing system 10 may not be processing any program instructions during that time period, which can decrease the throughput of processing system 10. The minimum resume counter techniques described in FIG. 18, however, allow processing system 10 to branch directly to either the target program counter value or the minimum resume counter value to begin processing a new instruction in the next processing cycle while still ensuring that divergent threads that are scheduled to process instructions at lower-valued addresses execute prior to threads that are scheduled to process instructions at higher-valued addresses. In this manner, the minimum resume counter techniques may increase system throughput in the case where a forward branch instruction that is uniformly satisfied is executed when one or more threads are deactivated.

Figure 19:
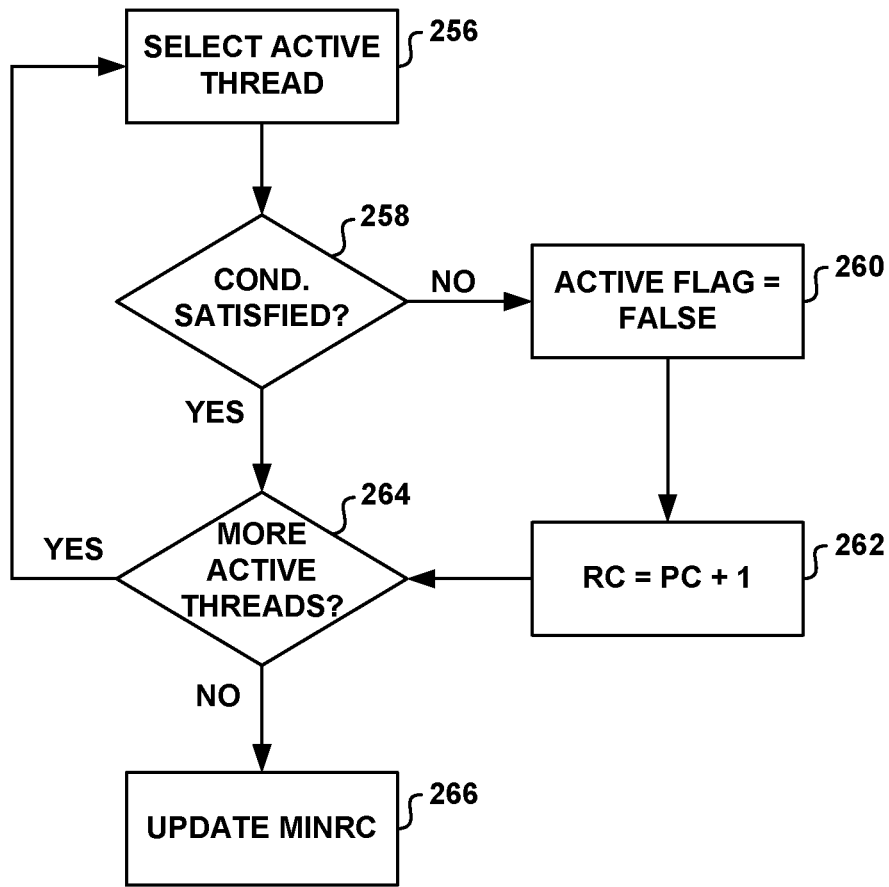

FIG. 19 is a flow diagram illustrating an example technique for deactivating active threads that do not satisfy a branch condition according to this disclosure. In some examples, the technique illustrated in FIG. 19 may be used to implement process box 228 illustrated in FIG. 17. Control flow module 34 selects an active thread (256). Control flow module 34 determines whether the branch condition is satisfied for the selected thread (258). If control flow module 34 determines that the branch condition is not satisfied for the selected thread, then control flow module 34 resets the active flag associated with the thread to a value of false (260), sets the resume counter associated with the thread to a program counter value indicative of the next sequential instruction, e.g., "PC+1" (262), and proceeds to decision box 264. In this case, the resume counter is set to a value indicative of the next sequential instruction because the branch condition was unsatisfied for the thread. The value indicative of the next sequential instruction, in this example, is a value indicative of a program counter value at which the respective thread should be reactivated. On the other hand, if control flow module 34 determines that the branch condition is satisfied for the selected thread, then control flow module 34 proceeds to decision box 264 without resetting the active flag for the thread and without setting the resume counter for the thread.

In either case, control flow module 34 determines whether there are any more active threads to process (264). If control flow module 34 determines that there are more active threads to process, then control flow module 34 returns to process box 256 to process another active thread. Otherwise, if control flow module 34 determines that there are not any more active threads to process, then control flow module 34 updates the minimum resume counter (MINRC) (266). Control flow module 34 may update the resume counter in a manner similar to that which is described above with respect to process box 218 in FIG. 16. After updating the minimum resume counter value, control flow module 34 ends the deactivation process and returns to the calling process, e.g., process box 230 in FIG. 17.

Figure 20:
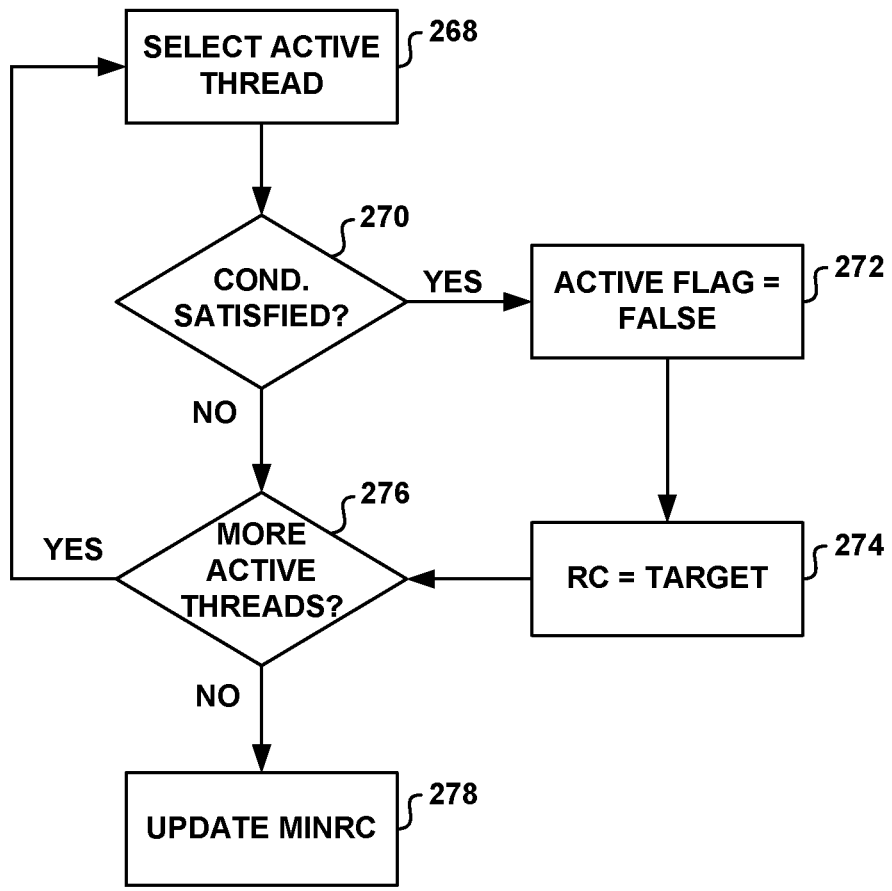

FIG. 20 is a flow diagram illustrating an example technique for deactivating active threads that satisfy a branch condition according to this disclosure. In some examples, the technique illustrated in FIG. 20 may be used to implement process box 240 illustrated in FIG. 18. Control flow module 34 selects an active thread (268). Control flow module 34 determines whether the branch condition is satisfied for the selected thread (270). If control flow module 34 determines that the branch condition is satisfied for the selected thread, then control flow module 34 resets the active flag associated with the thread to a value of false (272), sets the resume counter associated with the thread to a target program counter value indicative of the target instruction identified by the branch instruction (274), and proceeds to decision box 276. In this case, the resume counter is set to a value indicative of the target instruction because the branch condition was satisfied for the thread. The target program counter value, in this example, is a value indicative of a program counter value at which the respective thread should be reactivated. On the other hand, if control flow module 34 determines that the branch condition is not satisfied for the selected thread, then control flow module 34 proceeds to decision box 276 without resetting the active flag for the thread and without setting the resume counter for the thread. In either case, control flow module 34 determines whether there are any more active threads to process (276). If control flow module 34 determines that there are more active threads to process, then control flow module 34 returns to process box 268 to process another active thread. Otherwise, if control flow module 34 determines that there are not any more active threads to process, then control flow module 34 updates the minimum resume counter (MINRC) (278). Control flow module 34 may update the resume counter in a manner similar to that which is described above with respect to process box 218 in FIG. 16. After updating the minimum resume counter value, control flow module 34 ends the deactivation process and returns to the calling process, e.g., process box 242 in FIG. 18.

Figure 21:
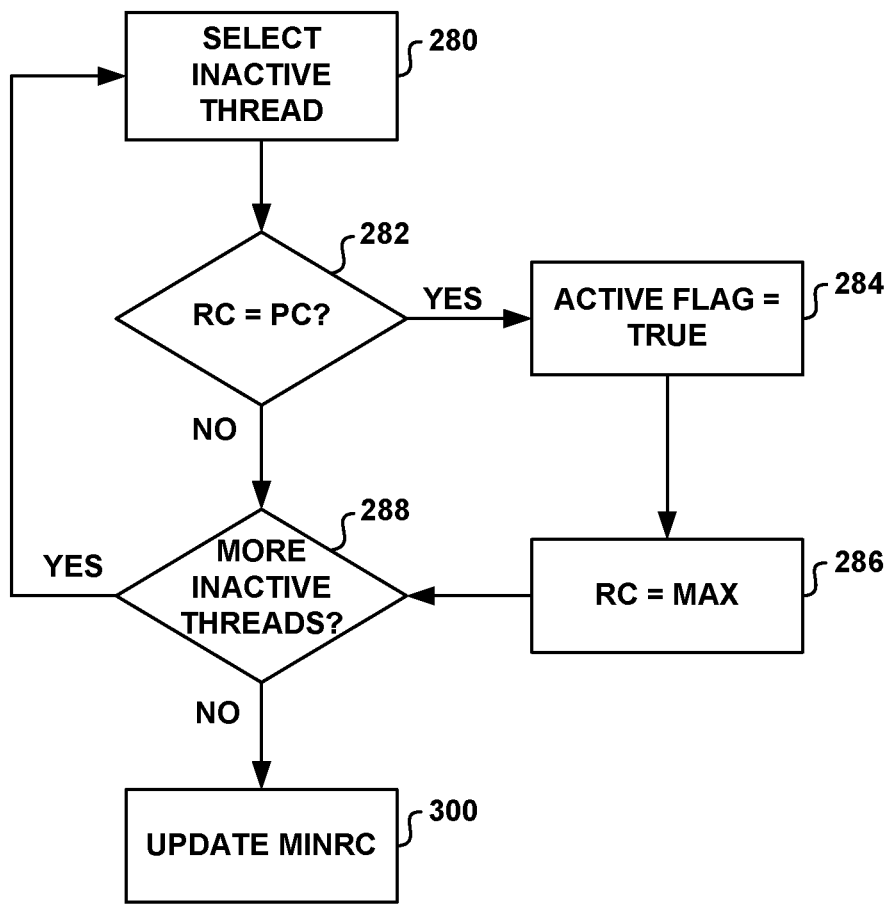

FIG. 21 is a flow diagram illustrating an example resume check technique for reactivating threads in accordance with the minimum resume counter techniques of this disclosure. In some examples, the technique illustrated in FIG. 21 may be performed each time a new instruction is fetched by control unit 12. For example, the technique may be performed in response to loading the program counter with a new value and prior to issuing the instruction, if the instruction is issued, to any of processing elements 14. Control flow module 34 selects an inactive thread (280). Control flow module 34 determines whether the resume counter value for the inactive thread is equal to the program counter value (282). If control flow module 34 determines that the resume counter value for the inactive thread is equal to the program counter value, then control flow module 34 sets the active flag associated with the thread to a value of true (284), sets the resume counter associated with the thread to a maximum value (286), and proceeds to decision box 288. The maximum value, in some examples, may be a value that is the largest value that can be represented in the storage slot or register for the resume counter. On the other hand, if control flow module 34 determines that the resume counter value for the inactive thread is not equal to the program counter value, then control flow module 34 proceeds to decision box 288 without resetting the active flag for the thread and without setting the resume counter for the thread. In either case, control flow module 34 determines whether there are any more inactive threads to process (288). If control flow module 34 determines that there are more inactive threads to process, then control flow module 34 returns to process box 280 to process another inactive thread. Otherwise, if control flow module 34 determines that there are not any more active threads to process, then control flow module 34 updates the minimum resume counter (MINRC) (300). Control flow module 34 may update the resume counter in a manner similar to that which is described above with respect to process box 218 in FIG. 16. After updating the minimum resume counter value, control flow module 34 ends the resume check process.

Figure 22:
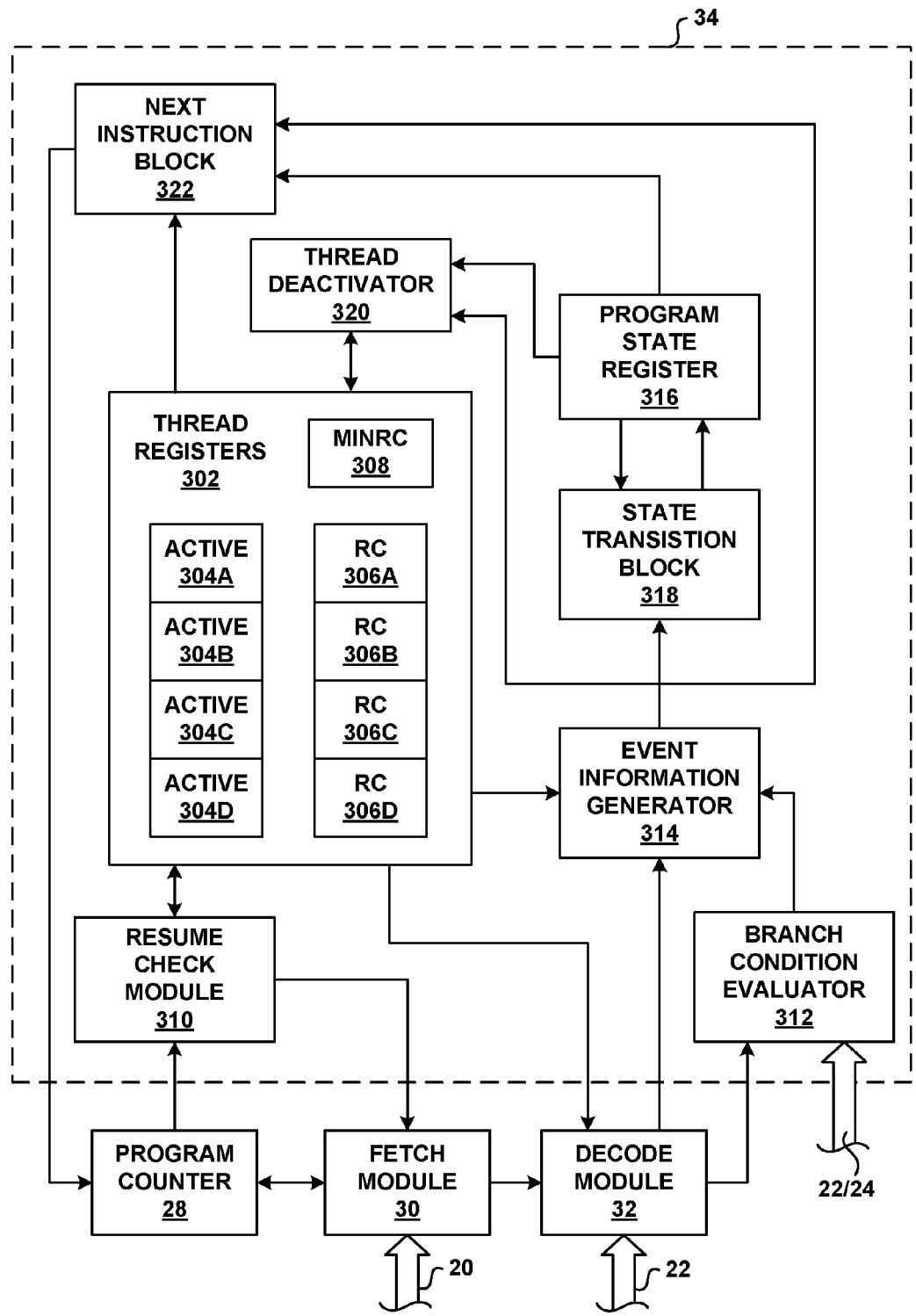
FIG. 22 is a block diagram illustrating an example flow control module that may be used to implement the minimum resume counter divergent thread handling techniques of this disclosure.

FIG. 22 is a block diagram illustrating an example control flow module 34 that may be used to implement the minimum resume counter divergent thread handling techniques of this disclosure. In some examples, the example control flow module 34 illustrated in FIG. 22 may be used to implement the techniques described above with respect to FIGS. 14-21. Control flow module 34 includes thread registers 302, active flags 304A-304D (collectively "active flags 304"), resume counters 306A-306D (collectively "resume counters 306"), a minimum resume counter (MINRC), a resume check module 310, a branch condition evaluator 312, a event information generator 314, a program state register 316, a state transition block 318, a thread deactivator 320 and a next instruction block 322. The architecture of control flow module 34 illustrated in FIG. 22 is similar to the architecture of control flow module 34 illustrated in FIG. 11, but with the addition of MINRC 308 in thread registers 302. However, several of the identically named components operate in a different fashion as described in further detail below.

Thread registers 302 are configured to store the thread state for each of the threads executing in processing system 10. As shown in FIG. 22, thread registers 302 include active flags 304 and resume counters 306, which are constructed and operate in a similar fashion to active flags 154 and resume counters 156, respectively, as illustrated in FIG. 11. Accordingly, in the interest of brevity and to avoid redundancy, the construction and operation of these shared components is not described in further detail. Although the example control flow module 34 illustrated in FIG. 22 illustrates a system having four active flags 304 and four resume counters 306, in other examples, control flow module 34 may have the same or different numbers of active flags 304 and resume counters 306. Thread registers 302 also includes a MINRC 308. MINRC 308 is configured to store a value indicative of a smallest value from the set of active flags 304.

Resume check module 310 is configured to perform a resume check in response to program counter 28 being loaded with a new program counter value and prior to issuing an instruction associated with the new program counter to processing elements 14 if the instruction is issued. In some examples, resume check module 158 may perform the resume check in accordance with the resume check techniques illustrated in FIG. 21. Resume check module 310 may receive the current program counter value from program counter 28 and the current active flags 304 and resume counter values 306 from thread registers 302 to perform the resume check technique. Resume check module 310 may also modify active flags 304, resume counters 306 and MINRC 308 as part of the resume check technique. In addition, resume check module 310 may update program state register 316 based on the outcome of the resume check technique.

After completing the resume check technique, resume check module 310 may send a signal to one or both of fetch module 30 and decode module 32 indicating that the resume check has completed. The response of fetch module 30 and/or decode module 32 to the signal may be substantially similar to that which was described above with respect to resume check module 158 sending the signal to one or both of fetch module 30 and decode module 32 in FIG. 11. Accordingly, in the interest of brevity and to avoid redundancy, these features will not be described in further detail.

The general operation of decode module 32 illustrated in FIG. 22 may also be substantially similar to the general operation of decode module 32 illustrated in FIG. 11 except that decode module 32 updates the active and inactive status of processing elements 14 based on the current state of active flags 304 rather than active flags 154. In addition, general operation of branch condition evaluator 312 illustrated in FIG. 22 may be substantially similar to the general operation of branch condition evaluator 160 illustrated in FIG. 11. Accordingly, in the interest of brevity and to avoid redundancy, these features will not be described in further detail.

Event information generator 314 receives control information from decode module 32 and, if the currently processed instruction is a branch instruction, branch condition information from branch condition evaluator 312. In some examples, event information generator 314 may also receive branching divergence information from branch condition evaluator 312 if the currently processed instruction is a branch instruction. If event information generator 314 does not receive branching divergence information from branch condition evaluator 312, then event information generator 314 may determine whether the branching divergence for the current instruction is uniform or divergent. Event information generator 314 may also determine whether the target program counter value for the currently processed instruction is less than or equal to the MINRC 308. Event information generator 314 generates events based on the received information, and provides the events to state transition block 318, thread deactivator 320 and next instruction block 322.

In some examples, event information generator 314 may generate the following events:
Jb: Jump backward instruction
JfL: Jump forward instruction, target is less than or equal to MINRC.
JfG: Jump forward instruction, target is greater than MINRC.
BbuT: Branch backward instruction, all threads are uniform, condition is true
BbuF: Branch backward instruction, all threads are uniform, condition is false
BfuTL: Branch forward instruction, all threads are uniform, condition is true, Target is less than or equal to MINRC.
BfuTG: Branch forward instruction, all threads are uniform, condition is true, Target is greater than MINRC.
BfuF: Branch forward instruction, all threads are uniform, condition is false
Bbd: Branch backward instruction, threads are divergent
Bfd: Branch forward instruction, threads are divergent
S: Sequential instruction According to the above-identified events, an instruction may be a sequential instruction (S), a jump instruction (J), or a branch instruction (B). For jump or branch instructions, the jump or branch direction may be either backward (b) or forward (f). For branch instructions, the branching divergence may be either uniform (u) or divergent (d). For branch instructions, the branching condition may be either true (T) or false (F). A true branch condition may correspond to a satisfied branch condition, and a false branch condition may correspond to an unsatisfied branch condition. The forward jump range may depend on whether the target is greater than the MINRC. Thus, a comparison result may be defined to indicate that the target is less than or equal to the MINRC (L) or that the target is greater than the MINRC (G). In comparison to the events generated by event information generator 162 in FIG. 11, event Jf is replaced by JfL and JfG, and event BfuT is replaced by BfuTL and BfuTG.

Program state register 316 may store a program state for the program executing in processing system 10. In some examples, program state register 316 may store the following three states:
State 0: All threads are active.
State 1: At least one thread is active and at least one thread is inactive.
State 2: All threads are inactive.

State transition block 318 may receive an event from event information generator 314 and a current program state from program state register 316, generate a new program state based on the received events and the current program state, and store the new program state in program state register 316. State transition block 318 may generate the new program state in accordance with the state transition diagram described in further detail with respect to FIG. 23 and/or in accordance with the state transition table described in further detail with respect to FIG. 24.

Thread deactivator 320 may receive an event from event information generator 314 and a current program state from program state register 316, determine whether to deactivate one or more threads based on the event and the current program state, and deactivate one or more threads in response to certain combinations of events and current program states. When deactivating threads, thread deactivator 320 may update active flags 304 and resume counters 306 for the threads being deactivated. Thread deactivator 320 may deactivate threads in accordance with the state transition table described in further detail with respect to FIG. 24.

Next instruction block 322 may receive an event from event information generator 314 and a current program state from program state register 316, determine a new program counter value to load into program counter 28, and load the new program counter value into program counter 28. The new program counter value may be indicative of a next instruction to be processed by control unit 12. Next instruction block 322 may determine the new program counter value in accordance with the state transition table described in further detail with respect to FIG. 24.

As discussed above, resume check module 310 may update program state register 316 based on the outcome of the resume check. This update may be performed by resume check module 310 in an asynchronous manner. For example, if the program state was State 1 prior to performing the resume check, and all inactive threads are reactivated, program state register 316 may change program state register 316 to State 0 in an asynchronous manner to reflect that all threads are activated. It should be noted that state transition block 318 generates the new program state based on the current program state that is available after any updating by resume check module 310. Similarly, thread deactivator 320 determines whether to deactivate one or more threads based on the current program state that is available after any updating by resume check module 310, and next instruction block 322 determines a new program counter value based on the current program state that is available after any updating by resume check module 310. As such, although the program state may change between two different states during a single processing cycle due to a resume check, the final state for the processing cycle, i.e., the state that occurs after the resume check is complete, is used as the current program state for processing by each of state transition block 318, thread deactivator 320 and next instruction block 322.

Figure 23:
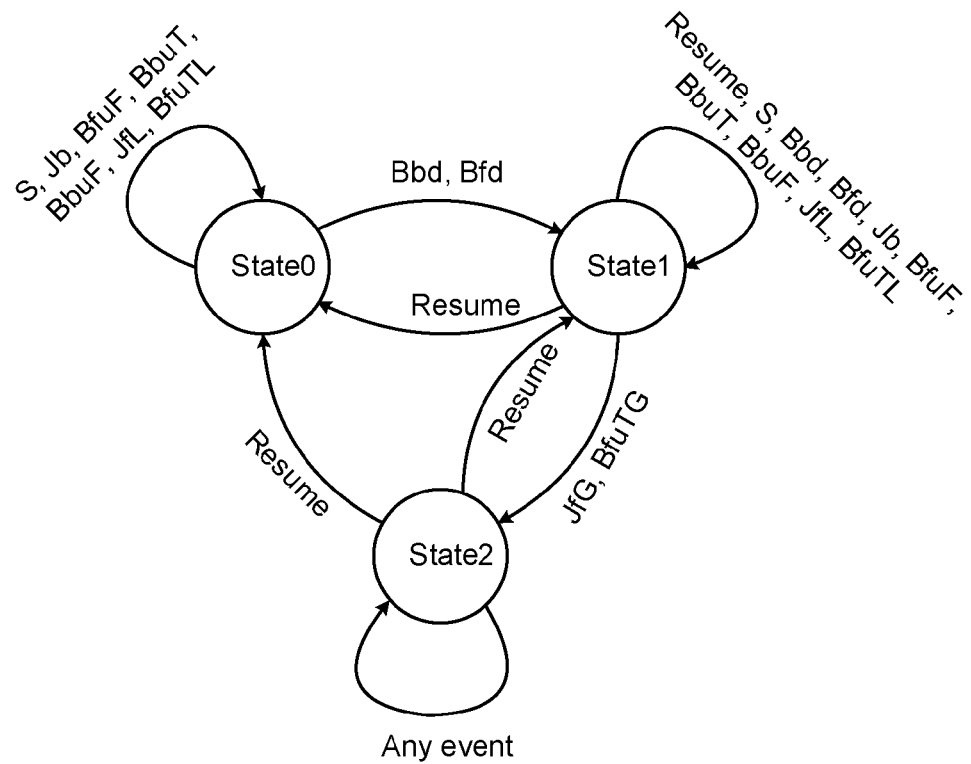
FIG. 23 is a state transition diagram that characterizes exemplary operation of the flow control module illustrated in FIG. 22 according to this disclosure.

FIG. 23 is a state transition diagram that characterizes exemplary operation of the flow control module illustrated in FIG. 22 according to this disclosure. The arrows shown in FIG. 23 represent transitions between the different states identified by the circles. The arrows are associated with one or both of events generated by event information generator 314 and a resume event. A resume event may be an asynchronous state transition that occurs as the result of a resume check where one or more threads are reactivated. The state transitions associated with the remaining events generated by event information generator 314 may be synchronous state transitions. A synchronous state transition may occur between processing cycles, and an asynchronous state transition may occur during the processing cycle. If an asynchronous state transition occurs during a processing cycle due to the resume check, then the state that occurs after the asynchronous transition is used to determine the next state for the next processing cycle.

FIG. 24 is a state transition table that characterizes exemplary operation of the flow control module illustrated in FIG. 22 according to this disclosure. The state transition table in FIG. 24 includes an "OLD STATE" column, which represents the current program state, and a "NEW STATE" column, which represents either a new program state for a next processing cycle or a program state that occurs after an asynchronous transition due to a resume check. The state transition table also includes an "EVENT" column, which includes the events generated by event information generator 162. The indicator "n/a" in the "EVENT" column signifies that the state transition and action occurs due to a resume check and that the event is irrelevant for such a transition. The state transition table also includes an "ACTION" column that indicates what action takes place in response to a particular combination of a current program state and event. The action labeled "Resume" in the "ACTION" column signifies that an asynchronous state transition occurs due to a resume check.

As shown in FIGS. 23 and 24, state transition block 318 selects State 0 as the new state to load into program state register 316 in response to the current state being State 0 and receiving an S event, a Jb event, a BfuF event, a BbuT event, a BbuF event, a JfL event, or a BfuTL event. State transition block 318 selects State 1 as the new state to load into program state register 316 in response to the current state being State 0 and receiving a Bbd event or a Bfd event. State transition block 318 also selects State 1 as the new state to load into program state register 316 in response to the current state being State 1 and receiving an S event, a Jb event, a BbuF event, a BbuT event, a BfuF event, a Bbd event, a Bfd event, a JfL event, or a BfuTL event. State transition block 318 selects State 2 as the new state to load into program state register 316 in response to the current state being State 1 and receiving a JfG event or a BfuTG event. State transition block 318 also selects State 2 as the new state to load into program state register 316 in response to the current state being State 2 and receiving any event. In response to reactivating one or more threads as part of a resume check, state transition block 318 may transition into State 0 or State 1 in an asynchronous manner.

As shown in FIG. 24, thread deactivator 320 may determine to deactivate one or more threads in response to the current state being either State 0 or State 1 and receiving a Bbd event or a Bfd event. The Bbd event and Bfd events may be referred to as divergence events resulting from the evaluation of a branch condition for a branch instruction. Thread deactivator 320 may determine to deactivate all active threads that do not satisfy the branch condition, i.e., false condition, in response to receiving a Bbd event, and to deactivate all active threads that satisfy the branch condition, i.e., true condition, in response to receiving a Bfd event. Thread deactivator 320 may utilize the technique illustrated in FIG. 19 to deactivate all active threads that do not satisfy the branch condition, and the technique illustrated in FIG. 20 to deactivate all active threads that satisfy the branch condition. Thread deactivator 320 may determine to deactivate all active threads in response to the current state being State 1 and receiving a JfG event or a BfuTG event. Thread deactivator 320 may utilize the technique illustrated in FIG. 16 to deactivate all active threads.

As shown in FIG. 24, next instruction block 322 may select one of the following to load into program counter 28 in response to various combinations of current program state and events: (1) a program counter value indicative of the next sequential instruction, i.e., "PC+1": (2) a program counter value indicative of a target instruction, i.e., a target program counter value; or (3) a minimum resume counter value (MINRC). For example, next instruction block 322 may select a program counter value indicative of the next sequential instruction, i.e., "PC+1", to load into program counter 28 in response to the current state being State 0 and receiving an S event, a BfuF event, a BbuF event, or a Bfd event. Next instruction block 322 may also select a program counter value indicative of the next sequential instruction to load into program counter 28 in response to the current state being State 1 and receiving an S event, a BbuF event, a BfuF event, or a Bfd event. Next instruction block 322 may also select a program counter value indicative of the next sequential instruction to load into program counter 28 in response to the current state being State 2 and receiving any event other than a JfL event or a JfG event.

Next instruction block 322 may select a program counter value indicative of a target instruction, i.e., a target program counter value, to load into program counter 28 in response to the current state being State 0 and receiving a Jb event, a BbuT event, a JfL event, a BfuTL event, or a Bbd event. Next instruction block 322 may also select a program counter value indicative of a target instruction to load into program counter 28 in response to the current state being State 1 and receiving a Jb event, a BbuT event, a Bbd event, a JfL event, or a BfuTL event. Next instruction block 322 may also select a program counter value indicative of a target instruction to load into program counter 28 in response to the current state being State 2 and receiving a JfL event.

Next instruction block 322 may select the MINRC value to load into program counter 28 in response to the current state being State 1 and receiving a JfG event or a BfuTG event. Next instruction block 322 may also select the MINRC value to load into program counter 28 in response to the current state being State 2 and receiving a JfG event.

FIGS. 25-27 illustrate example pseudo-code for implementing the minimum resume counter divergent thread handling techniques according to this disclosure. In particular, FIG. 25 illustrates example pseudo-code for implementing a resume check process in accordance with the minimum resume counter techniques of this disclosure. In some examples, the pseudo-code illustrated in FIG. 25 may correspond to the flow diagram illustrated in FIG. 21. FIG. 26 illustrates example pseudo-code for implementing jump instruction processing in accordance with the minimum resume counter techniques of this disclosure. In some examples, the pseudo-code illustrated in FIG. 26 may correspond to the flow diagrams illustrated in FIGS. 15 and 16. FIG. 27 illustrates example pseudo-code for implementing branch instruction processing in accordance with the minimum resume counter techniques of this disclosure. In some examples, the pseudo-code illustrated in FIG. 27 may correspond to the flow diagrams illustrated in FIGS. 17-20. The minimum resume counter techniques of this disclosure are described in FIGS. 1, 2 and 14-24 with respect to a plurality of threads of execution for a program, each of the threads executing on a processing element. It should be noted that the example pseudo-code provided in FIGS. 25-27 refers to the threads executing on the processing elements as subthreads and the program executing on processing system 10 as a thread. The program may be referred to as a thread because the program may be considered to be a thread of execution of the program. For example, a system may have multiple SIMD processing systems and each of the SIMD processing systems may execute an execution instance of the program. As such, the program may be referred to as a thread, and the execution instances of the program executing on each of the processing elements may be referred to as subthreads.

FIGS. 28 and 29 are tables illustrating differences between the resume counter techniques and the minimum resume counter techniques of this disclosure. In particular, FIG. 28 illustrates the behavior of the resume counter techniques of this disclosure when at least one thread is deactivated, and FIG. 29 illustrates the behavior of the minimum resume counter techniques of this disclosure when at least one thread is deactivated. As shown in FIG. 28, for a backward jump instruction or a backward uniform branch instruction, the resume counter techniques proceed to the next sequential instruction, i.e., PC+1, when the branch condition is not satisfied, and proceed to the target instruction when the branch condition is satisfied. For a divergent backward branch or jump instruction, the resume counter techniques proceed to the target instruction. For all forward jump instructions and forward uniform branch instructions, the resume counter techniques proceed to the next sequential instruction when one or more threads are deactivated. This causes the system to sequentially cycle through the program counter values until the first of a resume counter value for an inactive thread is reached or the target program counter value is reached.

As shown in FIG. 29, the behavior for a backward jump instruction and a backward uniform branch instruction is identical to that of FIG. 28. In addition, the behavior of a forward jump instruction and a forward uniform branch instruction when the condition is not satisfied is identical to that of FIG. 28. However, for a forward jump instruction and a forward uniform branch instruction, the behavior is different. If the target program counter is less than or equal to the minimum resume counter value, then the minimum resume counter techniques jump to the target address. Otherwise, if the target program counter is greater than the minimum resume counter value, then the minimum resume counter techniques jump to the minimum resume counter value. In contrast to the resume counter techniques shown in FIG. 28, which sequentially cycle through program counter values in such a case, the minimum resume counter techniques described in FIG. 29 allow the system to branch directly to either the target program counter value or the minimum resume counter value to begin processing a new instruction in the next processing cycle while still ensuring that divergent threads that are scheduled to process instructions at lower-valued addresses execute prior to threads that are scheduled to process instructions at higher-valued addresses. In this manner, the minimum resume counter techniques may increase the throughput of the system in the case where, when one or more threads are deactivated, a forward jump instruction is encountered or a forward branch instruction that is uniformly satisfied is encountered.

FIG. 30 illustrates an example program that may utilize the divergent thread handling techniques of this disclosure. As shown in FIG. 30, the example program includes eight instructions, i.e., I-0, I-1, etc. The instructions are listed in sequential order, i.e., the order in which they are stored in an instruction store.

FIG. 31 is a table illustrating an example execution sequence for the example program in FIG. 30 using the resume counter divergent thread handling techniques of this disclosure. The example execution sequence shown in FIG. 31 illustrates the results of executing the example program in FIG. 30 on a SIMD system having four processing elements, such as, e.g., processing system 10 illustrated in FIG. 1. The example execution sequence shown in FIG. 31 assumes that condition X in instruction I-0 is satisfied for Thread 0, but not satisfied for Threads 1, 2 and 3. The example execution sequence shown in FIG. 31 also assumes that condition Y in instruction I-1 is satisfied for Threads 1, 2 and 3.

As is shown in FIG. 31, all threads are initialized to an active state, i.e., Active="Yes." In addition, the resume counters for all threads are initialized to a maximum value, i.e., "MAX." At instruction I-0, which is a forward branch instruction that is divergent, control unit 12 deactivates Thread 0, which satisfied the branch condition. As part of the deactivation, control unit 12 sets the active flag for Thread 0 to "No" and sets the resume counter for Thread 0 to the address of the target instruction, i.e., "6." At instruction I-1, which is a forward branch instruction that is uniformly satisfied for all active threads, control unit 12 deactivates all active threads, and sets the resume counter for each of Threads 1, 2 and 3 to the address of the target instruction, i.e., "4." Control unit 12 proceeds to process instructions I-2 and I-3, but all threads are inactive and the resume check does not detect any resume counter values that are equal to the program counter values. At instruction I-4, the resume check determines that the resume counters for Threads 1, 2 and 3 equal the program counter, and reactivates Threads 1, 2 and 3. As part of the reactivation, control unit 12 sets the active flags for Threads 1, 2 and 3 to "Yes" and the resume counters for Threads 1, 2 and 3 to "MAX." Control unit 12 processes instructions I-4 and I-5 with respect to active Threads 1, 2 and 3. At instruction I-6, the resume check determines that the resume counter for Thread 0 equals the program counter, and reactivates Thread 0. As part of the reactivation, control unit 12 sets the active flag for Thread 0 to "Yes" and the resume counter for Thread 0 to "MAX." Control unit 12 processes instruction I-6 with respect to Threads 1, 2, 3 and 4 and proceeds to instruction I-7, which is the end of the program.

FIG. 32 is a table illustrating an example execution sequence for the example program in FIG. 30 using the minimum resume counter divergent thread handling techniques of this disclosure. The example execution sequence shown in FIG. 31 illustrates the results of executing the example program in FIG. 30 on a SIMD system having four processing elements, such as, e.g., processing system 10 illustrated in FIG. 1. The example execution sequence shown in FIG. 32 assumes that condition X in instruction I-0 is satisfied for Thread 0, but not satisfied for Threads 1, 2 and 3. The example execution sequence shown in FIG. 32 also assumes that condition Y in instruction I-1 is satisfied for Threads 1, 2 and 3.

As is shown in FIG. 32, all threads are initialized to an active state, i.e., Active="Yes." In addition, the resume counters for all threads and the minimum resume counter are all initialized to a maximum value, i.e., "MAX." At instruction I-0, which is a forward branch instruction that is divergent, control unit 12 deactivates Thread 0, which satisfied the branch condition. As part of the deactivation, control unit 12 sets the active flag for Thread 0 to "No," sets the resume counter for Thread 0 to the address of the target instruction, i.e., "6," and sets the minimum resume counter to a value of "6." At instruction I-1, which is a forward branch instruction that is uniformly satisfied for all active threads, control unit 12 determines that the target address, i.e., 4, is less than or equal to the minimum resume counter, i.e., 6. Therefore, control unit 12 jumps to instruction I-4 without deactivating any of Threads 1, 2 and 3. Control unit 12 processes instructions I-4 and I-5 with respect to active Threads 1, 2 and 3. At instruction I-6, the resume check determines that the resume counter for Thread 0 equals the program counter, and reactivates Thread 0. As part of the reactivation, control unit 12 sets the active flag for Thread 0 to "Yes" and the resume counter for Thread 0 to "MAX." Control unit 12 processes instruction I-6 with respect to Threads 1, 2, 3 and 4 and proceeds to instruction I-7, which is the end of the program.

By comparing the execution sequences in FIGS. 31 and 32, it can be seen that the minimum resume counter techniques of this disclosure provide improved throughput for the execution of Program 1 compared to that which is achieved by the resume counter techniques used without the minimum resume counter. In particular, six processing cycles occur when Program 1 is executed using the minimum resume counter techniques (FIG. 32) while eight processing cycles occur when Program 1 is executed without using the minimum resume counter techniques (FIG. 31). When using the minimum resume counter techniques, jumping from I-1 to I-4 is allowed because the branch target is less than the MINRC. Without the MINRC, jumping from I-1 to I-4 is not allowed. In this manner, the resume counter techniques may provide increased throughput for the processing of a forward branch instruction that is uniformly satisfied in the case where one or more threads are deactivated.

FIG. 33 illustrates another example program that may utilize the divergent thread handling techniques of this disclosure. As shown in FIG. 33, the example program includes eight instructions, i.e., I-0, I-1, etc. The instructions are listed in sequential order, i.e., the order in which they are stored in an instruction store.

FIG. 34 is a table illustrating an example execution sequence for the example program in FIG. 33 using the resume counter divergent thread handling techniques of this disclosure. The example execution sequence shown in FIG. 34 illustrates the results of executing the example program in FIG. 33 on a SIMD system having four processing elements, such as, e.g., processing system 10 illustrated in FIG. 1. The example execution sequence shown in FIG. 34 assumes that condition X in instruction I-0 is satisfied for Thread 0, but not satisfied for Threads 1, 2 and 3.

As is shown in FIG. 34, all threads are initialized to an active state, i.e., Active="Yes." In addition, the resume counters for all threads are initialized to a maximum value, i.e., "MAX." At instruction I-0, which is a forward branch instruction that is divergent, control unit 12 deactivates Thread 0, which satisfied the branch condition. As part of the deactivation, control unit 12 sets the active flag for Thread 0 to "No" and sets the resume counter for Thread 0 to the address of the target instruction, i.e., "4." At instruction I-1, which is a forward jump instruction, control unit 12 deactivates all active threads, and sets the resume counter for each of Threads 1, 2 and 3 to the address of the target instruction, i.e., "6." Control unit 12 proceeds to process instructions I-2 and I-3, but all threads are inactive and the resume check does not detect any resume counter values that are equal to the program counter values. At instruction I-4, the resume check determines that the resume counters for Thread 0 equals the program counter, and reactivates Thread 0. As part of the reactivation, control unit 12 sets the active flag for Thread 0 to "Yes" and the resume counter for Thread 0 to "MAX." Control unit 12 processes instructions I-4 and I-5 with respect to active Thread 0. At instruction I-6, the resume check determines that the resume counter for Threads 1, 2 and 3 equal the program counter, and reactivates Threads 1, 2 and 3. As part of the reactivation, control unit 12 sets the active flags for Threads 1, 2 and 3 to "Yes" and the resume counter for Threads 1, 2 and 3 to "MAX." Control unit 12 also sets the minimum resume counter to a value of "MAX." Control unit 12 processes instruction I-6 with respect to Threads 1, 2, 3 and 4 and proceeds to instruction I-7, which is the end of the program.

FIG. 35 is a table illustrating an example execution sequence for the example program in FIG. 30 using the minimum resume counter divergent thread handling techniques of this disclosure. The example execution sequence shown in FIG. 35 illustrates the results of executing the example program in FIG. 33 on a SIMD system having four processing elements, such as, e.g., processing system 10 illustrated in FIG. 1. The example execution sequence shown in FIG. 34 assumes that condition X in instruction I-0 is satisfied for Thread 0, but not satisfied for Threads 1, 2 and 3.

As is shown in FIG. 35, all threads are initialized to an active state, i.e., Active="Yes." In addition, the resume counters for all threads are initialized to a maximum value, i.e., "MAX." At instruction I-0, which is a forward branch instruction that is divergent, control unit 12 deactivates Thread 0, which satisfied the branch condition. As part of the deactivation, control unit 12 sets the active flag for Thread 0 to "No," and sets the resume counter for Thread 0 to the address of the target instruction, i.e., "4," and sets the minimum resume counter to a value of "4." At instruction I-1, which is a forward jump instruction, control unit 12 determines that the target address, i.e., 6, is greater than the minimum resume counter, i.e., 4. Therefore, control unit 12 jumps to instruction I-4, which corresponds to the minimum resume counter, and deactivates Threads 1, 2 and 3. As part of the deactivation process, control unit 12 sets the active flag for Threads 1, 2 and 3 to "No," sets the resume counter for Threads 1, 2 and 3 to the target instruction, i.e., "6," and keeps the minimum resume counter at a value of "4." At instruction I-4, the resume check determines that the resume counter for Thread 0 equals the program counter, and reactivates Thread 0. As part of the reactivation, control unit 12 sets the active flag for Thread 0 to "Yes" and the resume counter for Thread 0 to "MAX." Control unit 12 also updates the minimum resume counter to a value of "6." Control unit 12 proceeds to process instructions I-4 and I-5 for active Thread 0. At instruction I-6, the resume check determines that the resume counter for Threads 1, 2 and 3 equal the program counter, and reactivates Threads 1, 2 and 3. As part of the reactivation, control unit 12 sets the active flags for Threads 1, 2 and 3 to "Yes" and the resume counter for Threads 1, 2 and 3 to "MAX." Control unit 12 also sets the minimum resume counter to a value of "MAX." Control unit 12 processes instruction I-6 with respect to Threads 1, 2, 3 and 4 and proceeds to instruction I-7, which is the end of the program.

By comparing the execution sequences in FIGS. 34 and 35, it can be seen that the minimum resume counter techniques of this disclosure provide improved throughput for the execution of Program 2 compared to that which is achieved by the resume counter techniques used without the minimum resume counter. In particular, six processing cycles occur when Program 1 is executed using the minimum resume counter techniques (FIG. 34) while eight processing cycles occur when Program 1 is executed without using the minimum resume counter techniques (FIG. 35). When using the minimum resume counter techniques, jumping from I-1 to I-4 is allowed because the MINRC is less than the branch target. Without the MINRC, jumping from I-1 to I-4 is not allowed. In this manner, the resume counter techniques may provide increased throughput for the processing of a forward branch instruction that is uniformly satisfied in the case where one or more threads are deactivated.

Figure 36:
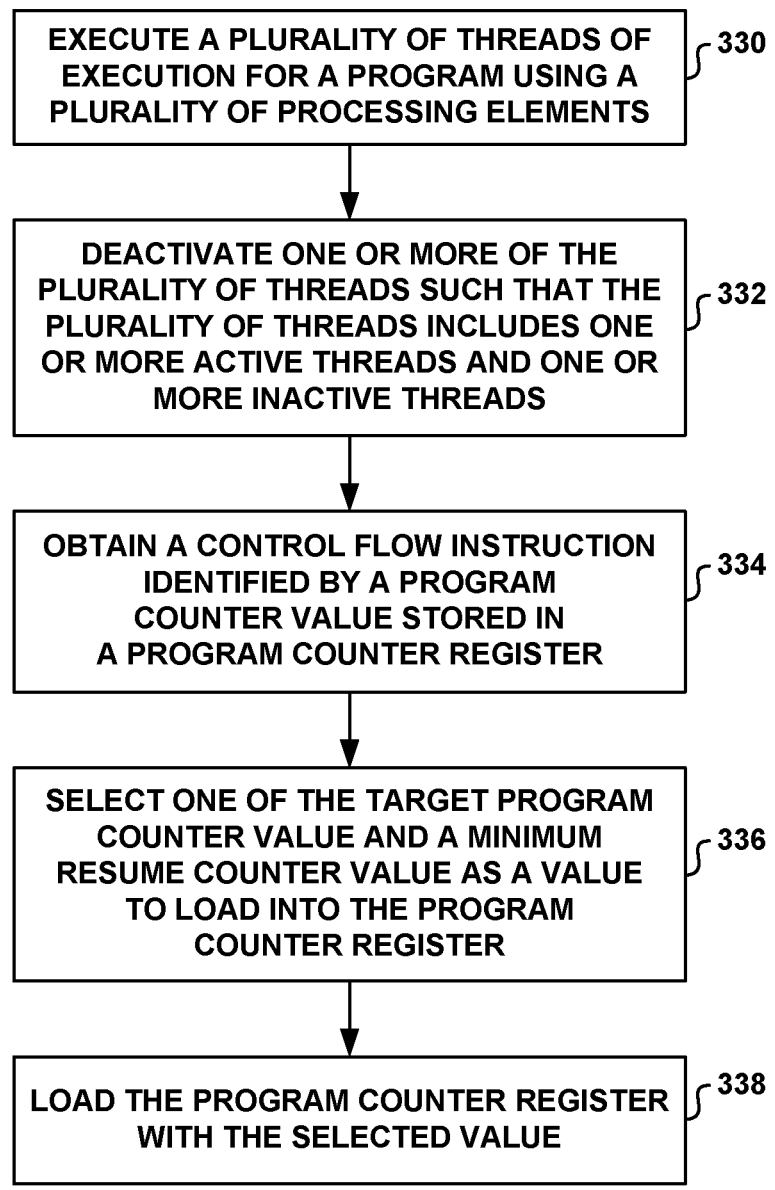
FIG. 36 is a flow diagram illustrating an example technique for handling divergent thread conditions in accordance with this disclosure.

FIG. 36 is a flow diagram illustrating an example technique for handling divergent thread conditions in accordance with this disclosure. Control unit 12 executes a plurality of threads of execution for a program using a plurality of processing elements (330). Each of the processing elements may be configured to process instructions of the program for a respective thread. Control unit 12 deactivates one or more of the plurality of threads such that the plurality of threads includes one or more active threads and one or more inactive threads (332). Each of the one or more active threads may be configured to process an instruction of the program identified by a program counter register, e.g., program counter 28, for the plurality threads during a processing cycle. Each of the one or more inactive threads may be configured to not process the instruction of the program during the processing cycle. Control unit 12 obtains a control flow instruction identified by a program counter value stored in a program counter register (334). For example, control unit may fetch or retrieve the instruction from instruction store 16. The control flow instruction includes a value indicative of a target program counter value for the control flow instruction. Control unit 12 selects one of the target program counter value and a minimum resume counter value as a value to load into the program counter register (336). The minimum resume counter value may be indicative of a smallest resume counter value from a set of one or more resume counter values associated with the one or more inactive threads. In some examples, the minimum resume counter value may be indicative of a smallest resume counter value from a set of two or more resume counter values associated with the one or more inactive threads. Each of the one or more resume counter values may be indicative of a program counter value at which a respective inactive thread should be activated. Control unit 12 loads the program counter register with the selected value (338). In some examples, the program counter register may be a global program counter register that identifies the program counter for each of the processing elements.

In some examples, control unit 12 may use the techniques described above with respect to FIGS. 15-27 to select the one of the target program counter value and a minimum resume counter value as a value to load into the global program counter register. For example, boxes 200, 204 and 206 in FIG. 15 may select one of the target program counter value and a minimum resume counter value as a value to load into the global program counter register. As is shown in FIG. 15, this selection may occur in response to determining that the fetched instruction is a forward jump instruction, e.g., decision box 192. As another example, boxes 248, 252 and 254 in FIG. 18 may select one of the target program counter value and a minimum resume counter value as a value to load into the global program counter register. As is shown in FIGS. 17 and 18, this selection may occur in response to determining that the fetched instruction is a forward branch instruction, e.g., decision box 220. As shown in FIG. 18, this selection may also occur in response to determining that all active threads satisfy the branch condition, e.g., decision boxes 238 and 244.

As a further example, the actions specified in the "ACTIONS" column of the state transition table of FIG. 24 may select one of the target program counter value and a minimum resume counter value as a value to load into the global program counter register. As yet another example, next instruction block 322 may operate in accordance with the state transition table of FIG. 24 to select one of the target program counter value and a minimum resume counter value as a value to load into the global program counter register. In further examples, a device that implements the pseudo-code of FIG. 26 and/or FIG. 27 may select one of the target program counter value and a minimum resume counter value as a value to load into the global program counter register.

In some examples, control flow module 34 may deactivate one or more threads in response to a divergent forward branch instruction, i.e., a forward branch instruction where the branching divergence is divergent. In such examples, the program counter value at which the each of the inactive threads should be activated, i.e., the resume counter value, is one of a value indicative of a next sequential instruction following the divergent forward branch instruction that caused the inactive thread to be deactivated and a target program counter value of the divergent backward branch instruction that caused the inactive thread to be deactivated.

In some examples, control flow module 34 may perform a resume check after loading the program counter for an instruction, but prior to the execution of each instruction. In such examples, control flow module 34 may, for each inactive thread, determine whether a resume counter value for the respective inactive thread equals the second program counter value, and activate the respective inactive thread in response to determining that the resume counter value for the respective inactive thread equals the second program counter value Certain types of stack-based divergent thread handling systems may reactivate threads in response to various types of software events. Such systems may be referred to as event-based thread reactivation systems and/or software-triggered thread reactivation systems. For example, software-triggered thread reactivation systems may reactivate threads in response to particular types of instructions and/or flags contained within the executable code for the program. In such systems, the programmer and/or compiler may need to generate the executable code for a program to include the specific instructions and/or flags that are configured to trigger the reactivation of a thread. Unlike such event-based, software-triggered thread reactivation techniques, the resume counter techniques described in this disclosure may provide non-event-based, hardware-triggered thread reactivation. For example, a thread reactivation check may be performed by the hardware at regular periodic intervals rather than in response to irregular events that are software-triggered. For example, each time a new program counter value is loaded into the program counter, the hardware may determine whether each of the inactive threads should be reactivated. Such hardware-triggered reactivation techniques may allow for the effective handling of divergent threads without needing to use a specialized software instruction set for divergent thread handling. In other words, the manner in which divergent threads are handled and reactivated may be hidden from the programmer and/or compiler such that the programmer and/or compiler does not necessarily need to generate specialized code for systems that allow divergent threads to execute. This may allow, in some examples, a programmer and/or compiler to generate a single set of executable code that can be executed on both a parallel system designed to process divergent threads and a non-parallel system that is not designed to process divergent threads. In additional examples, this may allow a parallel system, e.g., a SIMD system, to execute code that was originally designed for a non-parallel system without needing to recompile and/or rewrite the code to enable divergent thread handling.

In addition, the resume counter techniques of this disclosure may be able to exploit opportunities for additional parallelism beyond that which might be otherwise obtainable in certain types of stack-based software-triggered reactivation system. For example, the resume counter techniques of this disclosure may be able to identify all threads that are ready to execute code at a particular program counter value and ensure that all such threads are activated even if such threads are within different divergent thread groups. In contrast, a stack-based system may not necessarily reactivate all threads that are ready to execute code a particular program counter because the stack-based system may wait until a first divergent thread group finishes executing prior to executing a second divergent thread group. Therefore, the resume counter techniques of this disclosure may be able to provide further improvements in throughput by exploiting parallelism even among different divergent thread groups.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry such as discrete hardware that performs processing.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware, firmware, and/or software components, or integrated within common or separate hardware or software components.

The techniques described in this disclosure may also be stored, embodied or encoded in a computer-readable medium, such as a computer-readable storage medium that stores instructions. Instructions embedded or encoded in a computer-readable medium may cause one or more processors to perform the techniques described herein, e.g., when the instructions are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable storage media that is tangible.

Computer-readable media may include computer-readable storage media, which corresponds to a tangible storage medium, such as those listed above. Computer-readable media may also comprise communication media including any medium that facilitates transfer of a computer program from one place to another, e.g., according to a communication protocol. In this manner, the phrase "computer-readable media" generally may correspond to (1) tangible computer-readable storage media which is non-transitory, and (2) a non-tangible computer-readable communication medium such as a transitory signal or carrier wave.

Various aspects and examples have been described. However, modifications can be made to the structure or techniques of this disclosure without departing from the scope of the following claims.

The invention claimed is:

1. A method for controlling a processor comprising:
obtaining, with a control unit of the processor, a control flow instruction identified by a program counter value stored in a program counter register, the control flow instruction including a target value indicative of a target program counter value for the control flow instruction; and
selecting, with the control unit of the processor, one of the target program counter value and a minimum resume counter value as a value to load into the program counter register, the minimum resume counter value being indicative of a smallest resume counter value from a set of one or more resume counter values associated with one or more inactive threads, each of the one or more resume counter values being indicative of a program counter value at which a respective inactive thread should be activated, the minimum resume counter value being stored in a minimum resume counter register in the processor, the minimum resume counter register being updated when at least one of the resume counter values is set to a value.

2. The method of claim 1, wherein selecting the one of the target program counter value and the minimum resume counter value comprises:
determining whether the target program counter value is less than or equal to the minimum resume counter value;
selecting the target program counter value as the value to load into the program counter register in response to determining that the target program counter value is less than or equal to the minimum resume counter value; and
selecting the minimum resume counter value as the value to load into the program counter register in response to determining that the target program counter value is not less than or equal to the minimum resume counter value.

3. The method of claim 1, further comprising:
determining whether the control flow instruction is a forward jump instruction,
wherein selecting the one of the target program counter value and the minimum resume counter value comprises selecting the one of the target program counter value and the minimum resume counter value as the value to load into the program counter register in response to determining that the control flow instruction is a forward jump instruction.

4. The method of claim 3,
wherein determining whether the control flow instruction is a forward jump instruction comprises:
determining whether the control flow instruction is a jump instruction; and
determining whether the target program counter value for the control flow instruction is
greater than the program counter value that identifies the control flow instruction, and
wherein the method further comprises determining that the control flow instruction is a forward jump instruction in response to determining that the control flow instruction is a jump instruction and that the target program counter value for the control flow instruction is greater than the program counter value that identifies the control flow instruction.

5. The method of claim 1, further comprising:
deactivating one or more of a plurality of threads such that the plurality of threads includes one or more active threads and the one or more inactive threads;
determining whether the control flow instruction is a forward branch instruction; and
determining whether all of the one or more active threads satisfy a branch condition contained within the forward branch instruction,
wherein selecting the one of the target program counter value and the minimum resume counter value comprises selecting the one of the target program counter value and the minimum resume counter value as the value to load into the program counter register in response to determining that the control flow instruction is a forward branch instruction and that all active threads satisfy the branch condition.

6. The method of claim 5,
wherein determining whether the control flow instruction is a forward branch instruction comprises:
determining whether the control flow instruction is a branch instruction; and
determining whether the target program counter value for the control flow instruction is greater than the program counter value that identifies the control flow instruction, and
wherein the method further comprises determining that the control flow instruction is a forward branch instruction in response to determining that the control flow instruction is a branch instruction and that the target program counter value for the control flow instruction is greater than the program counter value that identifies the control flow instruction.

7. The method of claim 1, wherein the program counter value at which the respective inactive thread should be activated is one of a value indicative of a next sequential instruction following a divergent forward branch instruction that caused the inactive thread to be deactivated and a target program counter value of a divergent backward branch instruction that caused the inactive thread to be deactivated.

8. The method of claim 1, further comprising:
executing a plurality of threads of execution for a program using a plurality of processing elements, each of the processing elements being configured to process instructions of the program for a respective thread; and
deactivating one or more of the plurality of threads such that the plurality of threads includes one or more active threads and the one or more inactive threads.

9. The method of claim 8, wherein each of the one or more active threads is configured to process an instruction of the program identified by the program counter register for the plurality threads during a processing cycle, and each of the one or more inactive threads is configured to not process the instruction of the program during the processing cycle.

10. The method of claim 8, wherein deactivating the one or more of the plurality of threads comprises:
for each thread being deactivated, disabling a processing element configured to process instructions for the respective thread.

11. The method of claim 8, wherein deactivating the one or more of the plurality of threads comprises:
for each thread being deactivated, setting a respective resume counter value to a value indicative of a program counter value at which the respective thread should be reactivated; and
after setting one or more of the one or more resume counter values for all threads being deactivated, setting the minimum resume counter value to a value indicative of a smallest resume counter value from the set of one or more resume counter values.

12. The method of claim 11,
wherein the program counter value is a first program counter value,
wherein deactivating the one or more of the plurality of threads comprises deactivating threads that do not satisfy a branch condition in response to a divergence event resulting from an evaluation of a branch condition for a backward branch instruction identified by a second program counter value, and
wherein, for each thread being deactivated, setting the respective resume counter value comprises, for each thread that satisfies the branch condition, setting the respective resume counter to a value indicative of a next sequential instruction following the backward branch instruction identified by the second program counter value.

13. The method of claim 11,
wherein the program counter value is a first program counter value,
wherein deactivating the one or more of the plurality of threads comprises deactivating threads that satisfy a branch condition in response to a divergence event resulting from an evaluation of a branch condition for a forward branch instruction identified by a second program counter value, and
wherein, for each thread being deactivated, setting the respective resume counter value comprises, for each thread that satisfies the branch condition, setting the respective resume counter to a target program counter value for the forward branch instruction identified by the second program counter value.

14. The method of claim 1, further comprising:
loading the program counter register with the selected value.

15. The method of claim 1, wherein the program counter value is a first program counter value, and wherein the method further comprises:
loading a second program counter value into the program counter register;
for each inactive thread, determining whether a resume counter value for the respective inactive thread equals the second program counter value; and
for each inactive thread, activating the respective inactive thread in response to determining that the resume counter value for the respective inactive thread equals the second program counter value.

16. A system comprising:
a control unit for controlling a processor, the control unit configured to:
obtain a control flow instruction identified by a program counter value stored in a program counter register, the control flow instruction including a target value indicative of a target program counter value for the control flow instruction; and
select one of the target program counter value and a minimum resume counter value as a value to load into the program counter register, the minimum resume counter value being indicative of a smallest resume counter value from a set of one or more resume counter values associated with one or more inactive threads, each of the one or more resume counter values being indicative of a program counter value at which a respective inactive thread should be activated, the minimum resume counter value being stored in a minimum resume counter register in the processor, the minimum resume counter register being updated when at least one of the resume counter values is set to a value.

17. The system of claim 16, wherein the control unit is further configured to:
determine whether the target program counter value is less than or equal to the minimum resume counter value;
select the target program counter value as the value to load into the program counter register in response to determining that the target program counter value is less than or equal to the minimum resume counter value; and
select the minimum resume counter value as the value to load into the program counter register in response to determining that the target program counter value is not less than or equal to the minimum resume counter value.

18. The system of claim 16, wherein the control unit is further configured to:
determine whether the control flow instruction is a forward jump instruction; and
select the one of the target program counter value and the minimum resume counter value as the value to load into the program counter register in response to determining that the control flow instruction is a forward jump instruction.

19. The system of claim 18, wherein the control unit is further configured to:
determine whether the control flow instruction is a jump instruction;
determine whether the target program counter value for the control flow instruction is greater than the program counter value that identifies the control flow instruction; and
determine that the control flow instruction is a forward jump instruction in response to determining that the control flow instruction is a jump instruction and that the target program counter value for the control flow instruction is greater than the program counter value that identifies the control flow instruction.

20. The system of claim 16, wherein the control unit is further configured to:
deactivate one or more of a plurality of threads such that the plurality of threads includes one or more active threads and the one or more inactive threads;
determine whether the control flow instruction is a forward branch instruction;
determine whether all of the one or more active threads satisfy a branch condition contained within the forward branch instruction; and
select the one of the target program counter value and the minimum resume counter value as the value to load into the program counter register in response to determining that the control flow instruction is a forward branch instruction and that all active threads satisfy the branch condition.

21. The system of claim 20, wherein the control unit is further configured to:
determine whether the control flow instruction is a branch instruction;
determine whether the target program counter value for the control flow instruction is greater than the program counter value that identifies the control flow instruction; and
determine that the control flow instruction is a forward branch instruction in response to determining that the control flow instruction is a branch instruction and that the target program counter value for the control flow instruction is greater than the program counter value that identifies the control flow instruction.

22. The system of claim 16, wherein the program counter value at which the respective inactive thread should be activated is one of a value indicative of a next sequential instruction following a divergent forward branch instruction that caused the inactive thread to be deactivated and a target program counter value of a divergent backward branch instruction that caused the inactive thread to be deactivated.

23. The system of claim 16, further comprising:
a plurality of processing elements, wherein the control unit is configured to:
execute a plurality of threads of execution for a program using the plurality of processing elements, each of the processing elements being configured to process instructions of the program for a respective thread; and
deactivate one or more of the plurality of threads such that the plurality of threads includes one or more active threads and the one or more inactive threads.

24. The system of claim 23, wherein each of the one or more active threads is configured to process an instruction of the program identified by a program counter register for the plurality threads during a processing cycle, and each of the one or more inactive threads is configured to not process the instruction of the program during the processing cycle.

25. The system of claim 23, wherein the control unit is further configured to: for each thread being deactivated, disable a processing element configured to process instructions for the respective thread.

26. The system of claim 23, wherein the control unit is further configured to:
for each thread being deactivated, set a respective resume counter value to a value indicative of a program counter value at which the respective thread should be reactivated; and
after setting one or more of the one or more resume counter values for all threads being deactivated, set the minimum resume counter value to a value indicative of a smallest resume counter value from the set of one or more resume counter values.

27. The system of claim 26,
wherein the program counter value is a first program counter value, and wherein the control unit is further configured to:
  deactivate threads that do not satisfy a branch condition in response to a divergence event resulting from an evaluation of a branch condition for a backward branch instruction identified by a second program counter value; and
  for each thread that satisfies the branch condition, set the respective resume counter to a value indicative of a next sequential instruction following the backward branch instruction identified by the second program counter value.

28. The system of claim 26,
wherein the program counter value is a first program counter value, and
wherein the control unit is further configured to:
  deactivate threads that satisfy a branch condition in response to a divergence event resulting from an evaluation of a branch condition for a forward branch instruction identified by a second program counter value; and
  for each thread that satisfies the branch condition, set the respective resume counter to a target program counter value for the forward branch instruction identified by the second program counter value.

29. The system of claim 16, wherein the control unit is further configured to:
load the program counter register with the selected value.

30. The system of claim 16,
wherein the program counter value is a first program counter value, and
wherein the control unit is further configured to:
  load a second program counter value into the program counter register;
  for each inactive thread, determine whether a resume counter value for the respective inactive thread equals the second program counter value; and
  for each inactive thread, activate the respective inactive thread in response to determining that the resume counter value for the respective inactive thread equals the second program counter value.

31. An apparatus comprising:
means for obtaining a control flow instruction identified by a program counter value stored in a program counter register, the control flow instruction including a target value indicative of a target program counter value for the control flow instruction; and
means for selecting one of the target program counter value and a minimum resume counter value as a value to load into the program counter register, the minimum resume counter value being indicative of a smallest resume counter value from a set of one or more resume counter values associated with one or more inactive threads, each of the one or more resume counter values being indicative of a program counter value at which a respective inactive thread should be activated, the minimum resume counter value being stored in a minimum resume counter register in a processor, the minimum resume counter register being updated when at least one of the resume counter values is set to a value.

32. The apparatus of claim 31, wherein the means for selecting the one of the target program counter value and the minimum resume counter value comprises:
means for determining whether the target program counter value is less than or equal to the minimum resume counter value;
means for selecting the target program counter value as the value to load into the program counter register in response to determining that the target program counter value is less than or equal to the minimum resume counter value; and
means for selecting the minimum resume counter value as the value to load into the program counter register in response to determining that the target program counter value is not less than or equal to the minimum resume counter value.

33. The apparatus of claim 31, further comprising:
means for determining whether the control flow instruction is a forward jump instruction,
wherein the means for selecting the one of the target program counter value and the minimum resume counter value comprises means for selecting the one of the target program counter value and the minimum resume counter value as the value to load into the program counter register in response to determining that the control flow instruction is a forward jump instruction.

34. The apparatus of claim 31, further comprising:
means for deactivating one or more of a plurality of threads such that the plurality of threads includes one or more active threads and the one or more inactive threads;
means for determining whether the control flow instruction is a forward branch instruction; and
means for determining whether all of the one or more active threads satisfy a branch condition contained within the forward branch instruction,
wherein the means for selecting the one of the target program counter value and the minimum resume counter value comprises means for selecting the one of the target program counter value and the minimum resume counter value as the value to load into the program counter register in response to determining that the control flow instruction is a forward branch instruction and that all active threads satisfy the branch condition.

35. The apparatus of claim 31, further comprising:
means for executing a plurality of threads of execution for a program using a plurality of processing elements, each of the processing elements being configured to process instructions of the program for a respective thread; and
means for deactivating one or more of the plurality of threads such that the plurality of threads includes the one or more active threads and the one or more inactive threads.

36. A computer-readable medium comprising instructions that cause one or more processors to:
obtain a control flow instruction identified by a program counter value stored in a program counter register, the control flow instruction including a target value indicative of a target program counter value for the control flow instruction; and
select one of the target program counter value and a minimum resume counter value as a value to load into the program counter register, the minimum resume counter value being indicative of a smallest resume counter value from a set of one or more resume counter values associated with the one or more inactive threads, each of the one or more resume counter values being indicative of a program counter value at which a respective inactive thread should be activated, the minimum resume counter value being stored in a minimum resume counter register in the one or more processors, the minimum resume counter register being updated when at least one of the resume counter values is set to a value.

37. The computer-readable medium of claim 36, wherein the instructions that cause the one or more processors to select the one of the target program counter value and the minimum resume counter value comprise instructions that cause the one or more processors to:
- determine whether the target program counter value is less than or equal to the minimum resume counter value;
- select the target program counter value as the value to load into the program counter register in response to determining that the target program counter value is less than or equal to the minimum resume counter value; and
- select the minimum resume counter value as the value to load into the program counter register in response to determining that the target program counter value is not less than or equal to the minimum resume counter value.

38. The computer-readable medium of claim 36, further comprising instructions that cause the one or more processors to:
- determine whether the control flow instruction is a forward jump instruction,
- wherein the instructions that cause the one or more processors to select the one of the target program counter value and the minimum resume counter value comprise instructions that cause the one or more processors to select the one of the target program counter value and the minimum resume counter value as the value to load into the program counter register in response to determining that the control flow instruction is a forward jump instruction.

39. The computer-readable medium of claim 36, further comprising instructions that cause the one or more processors to:
- deactivate one or more of a plurality of threads such that the plurality of threads includes one or more active threads and the one or more inactive threads;
- determine whether the control flow instruction is a forward branch instruction;
- determine whether all of the one or more active threads satisfy a branch condition contained within the forward branch instruction,
- wherein the instructions that cause the one or more processors to select the one of the target program counter value and the minimum resume counter value comprise the instructions that cause the one or more processors to select the one of the target program counter value and the minimum resume counter value as the value to load into the program counter register in response to determining that the control flow instruction is a forward branch instruction and that all active threads satisfy the branch condition.

40. The computer-readable medium of claim 36, further comprising instructions that cause the one or more processors to:
- execute a plurality of threads of execution for a program using a plurality of processing elements, each of the processing elements being configured to process instructions of the program for a respective thread; and
- deactivate one or more of the plurality of threads such that the plurality of threads includes one or more active threads and the one or more inactive threads.

* * * * *